US012604337B2

(12) United States Patent
Gao et al.

(10) Patent No.: US 12,604,337 B2
(45) Date of Patent: Apr. 14, 2026

(54) COMMUNICATIONS METHOD AND APPARATUS

(71) Applicant: HUAWEI TECHNOLOGIES CO., LTD., Shenzhen (CN)

(72) Inventors: Lei Gao, Beijing (CN); Jian Wang, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 591 days.

(21) Appl. No.: 18/159,466

(22) Filed: Jan. 25, 2023

(65) Prior Publication Data

US 2023/0164827 A1 May 25, 2023

Related U.S. Application Data

(63) Continuation of application No. PCT/CN2020/105966, filed on Jul. 30, 2020.

(51) Int. Cl.
*H04W 72/566* (2023.01)
*H04W 72/0446* (2023.01)
*H04W 72/12* (2023.01)

(52) U.S. Cl.
CPC ..... *H04W 72/566* (2023.01); *H04W 72/0446* (2013.01); *H04W 72/12* (2013.01)

(58) Field of Classification Search
CPC ........... H04W 72/566; H04W 72/0446; H04W 72/12
See application file for complete search history.

(56) References Cited

U.S. PATENT DOCUMENTS

| | | | | |
|---|---|---|---|---|
| 10,531,464 | B2 * | 1/2020 | Ramamurthi | ..... H04W 72/0453 |
| 10,616,731 | B2 * | 4/2020 | Kim | ...................... H04L 5/0012 |
| 2015/0382324 | A1 * | 12/2015 | Sheng | ................... H04W 72/02 |
| | | | | 370/329 |
| 2017/0041902 | A1 * | 2/2017 | Sheng | ................... H04W 72/02 |
| 2017/0245295 | A1 * | 8/2017 | Jung | ................... H04W 72/569 |
| 2018/0110054 | A1 * | 4/2018 | Jung | ..................... H04W 72/51 |

(Continued)

FOREIGN PATENT DOCUMENTS

| | | |
|---|---|---|
| CN | 105992348 A | 10/2016 |
| CN | 109155728 A | 1/2019 |

(Continued)

OTHER PUBLICATIONS

3GPP TSG RAN WG1 #100bis, R1-2001746, "Remaining issues of mode 1 resource allocation for NR-V2X," OPPO, Apr. 20-30, 2020, 9 pages.

(Continued)

*Primary Examiner* — Jael M Ulysse
(74) *Attorney, Agent, or Firm* — Fish & Richardson P.C.

(57) ABSTRACT

This application provides communications methods and apparatuses. In an implementation, a first communications apparatus determines a second resource pool, wherein the first communications apparatus is a master node of a first communications domain and the first communications apparatus is used to schedule resource in the first resource pool of the first communications domain. The first communications apparatus further sends first configuration information for indicating the second resource pool.

8 Claims, 11 Drawing Sheets

(56) References Cited

U.S. PATENT DOCUMENTS

| | | | | |
|---|---|---|---|---|
| 2018/0332585 A1* | 11/2018 | Faurie | | H04W 4/70 |
| 2019/0028863 A1 | 1/2019 | Kim et al. | | |
| 2019/0103951 A1* | 4/2019 | Park | | H04W 72/0446 |
| 2020/0029306 A1* | 1/2020 | Chen | | H04B 7/0691 |
| 2020/0196312 A1* | 6/2020 | Faurie | | H04W 72/12 |
| 2020/0229205 A1* | 7/2020 | Bharadwaj | | H04L 5/0048 |
| 2021/0160822 A1* | 5/2021 | Hassan | | H04W 72/0453 |
| 2021/0392654 A1* | 12/2021 | Lin | | H04W 76/14 |
| 2022/0248417 A1* | 8/2022 | Yang | | H04W 72/30 |
| 2023/0127485 A1* | 4/2023 | Sun | | H04L 5/0053 |
| | | | | 370/329 |
| 2024/0080812 A1* | 3/2024 | Liu | | H04L 27/2605 |

FOREIGN PATENT DOCUMENTS

| | | | | |
|---|---|---|---|---|
| CN | 109565680 A | | 4/2019 | |
| CN | 110167072 A | | 8/2019 | |
| CN | 110383866 A | | 10/2019 | |
| CN | 110958096 A | | 4/2020 | |
| CN | 111194057 A | | 5/2020 | |
| CN | 111246432 A | | 6/2020 | |
| CN | 111439268 A | | 7/2020 | |
| CN | 110383866 B | * | 9/2022 | H04W 72/30 |

| | | | |
|---|---|---|---|
| WO | 2014002587 A1 | 1/2014 |
| WO | 2017027375 A1 | 2/2017 |
| WO | 2020164806 A1 | 8/2020 |

OTHER PUBLICATIONS

Office Action in Korean Appln. No. 10-2023-7005684, mailed on May 19, 2025, 10 pages (with English translation).

OPPO, "Discussion on mode 2 resource allocation in NR-V2X," 3GPP TSG-RAN WG1 Meeting #94bis, R1-1810977, Chengdu, China, Oct. 8-12, 2018, 5 pages.

Huawei et al., "Resource Allocation for Out-of-coverage UEs for D2D communication," 3GPP TSG RAN WG2 Meeting #85, R2-140224, Prague, Czech, Feb. 10-14, 2014, 3 pages.

Huawei, "(TP for V2X BL CR for 38.473) F1 impacts for V2X," 3GPP TSG-RAN3 Meeting #107bis-e, R3-202228, Apr. 20-30, 2020, 46 pages.

Extended European Search Report in European Appln No. 20946992. 3, dated Jul. 25, 2023, 8 pages.

Office Action in Japanese Appln. No. 2023-506065, mailed on Mar. 11, 2024, 9 pages (with English translation).

International Search Report and Written Opinion in International Appln. No. PCT/CN2020/105966, mailed on Apr. 29, 2021, 16 pages (with English translation).

* cited by examiner

Terminal
device 1

Terminal
device 2

Network device

Terminal
device

AP

Station

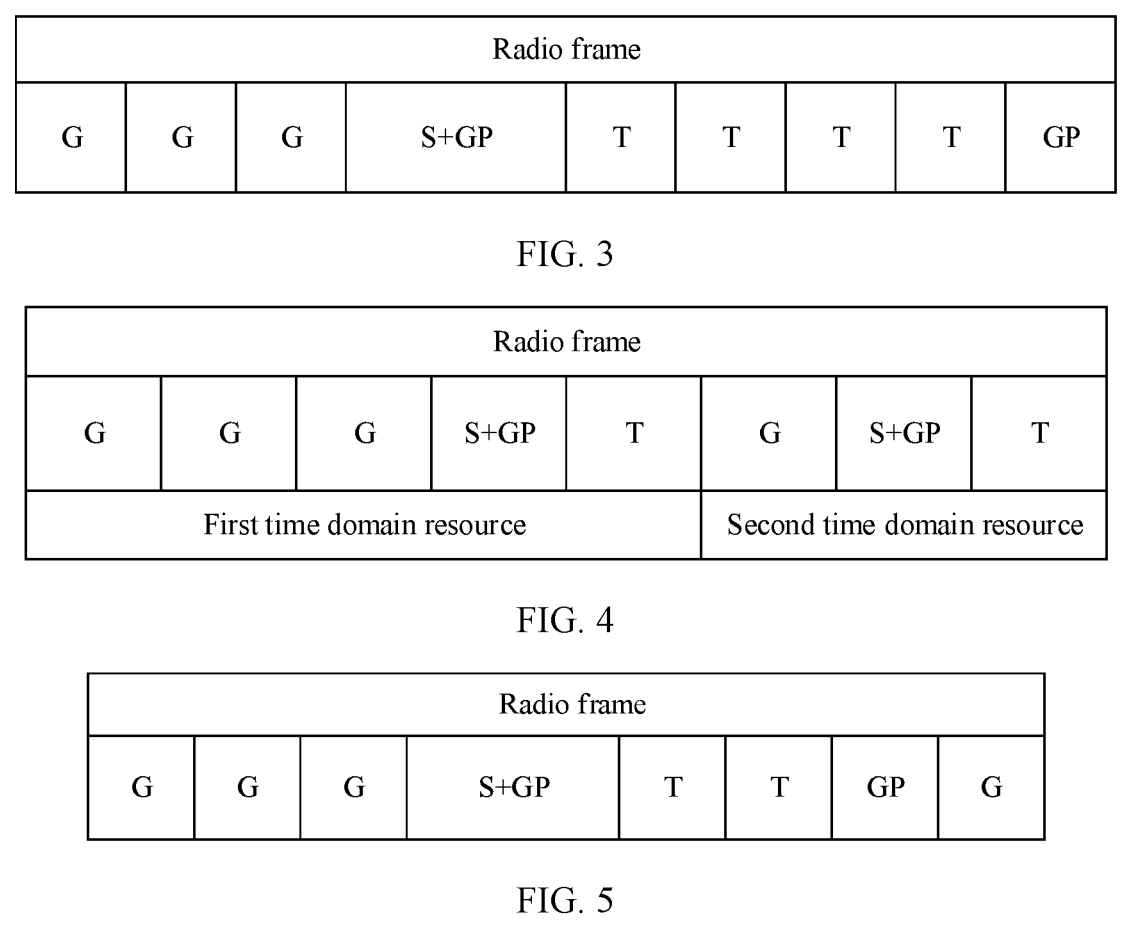

| Radio frame | | | | | | | | |
|---|---|---|---|---|---|---|---|---|
| G | G | G | S+GP | T | T | T | T | GP |

FIG. 3

| Radio frame | | | | | | | |
|---|---|---|---|---|---|---|---|
| G | G | G | S+GP | T | G | S+GP | T |
| First time domain resource | | | | | Second time domain resource | | |

FIG. 4

| Radio frame | | | | | | | |
|---|---|---|---|---|---|---|---|
| G | G | G | S+GP | T | T | GP | G |

| Tx | GP | — |
|----|----|----|
| GP | GP | — |
| Rx | GP | — |
| Rx | Rx | — |
| Rx | Rx | — |
| S+GP | S+GP | — |
| Tx | Tx | — |
| Tx | Tx | — |
| Tx | GP | — |
| GP | GP | — |
| Rx | GP | — |
| Rx | Rx | — |
| Rx | Rx | — |
| S+GP | S+GP | — |
| Tx | Tx | — |
| Tx | Tx | — |

| Rx | GP | — | — |
|----|----|----|----|
| S+ GP | GP | — | — |
| Tx | GP | — | — |
| Tx | Tx | — | — |
| Tx | Tx | — | — |
| S+GP | S+GP | — | — |
| Rx | Rx | — | — |
| Rx | Rx | — | — |
| Rx | GP | — | — |
| S+ GP | GP | — | — |
| Tx | GP | — | — |
| Tx | Tx | — | — |
| Tx | Tx | — | — |
| S+GP | S+GP | — | — |
| Rx | Rx | — | — |
| Rx | Rx | — | — |

FIG. 9

COMMUNICATIONS METHOD AND APPARATUS

CROSS-REFERENCE TO RELATED APPLICATIONS

This application is a continuation of International Application No. PCT/CN2020/105966, filed on Jul. 30, 2020, the disclosure of which is hereby incorporated by reference in its entirety.

TECHNICAL FIELD

This application relates to the field of mobile communications technologies, and in particular, to a communications method and apparatus.

BACKGROUND

Diversified in-vehicle applications lead to increasingly more in-vehicle communications nodes and more types of in-vehicle communications nodes, and impose a higher requirement on an in-vehicle communication capability. Compared with existing wired communication, in-vehicle wireless communication can be further used to reduce a quantity of harnesses, a length of the harness, and a weight of the harness in a vehicle, and corresponding installation or maintenance costs. This makes in-vehicle communications technologies gradually tend to be wireless.

Usually, there may be a plurality of communications domains in a vehicle. One communications domain includes one master node and at least one slave node. The master node schedules the slave node, so that the master node and the slave node transmit service data to each other. Information transmission occurs in each communications domain, and transmitted information includes, for example, data or control information. Therefore, a corresponding resource needs to be used in each communications domain to support communication. Currently, a resource is independently selected in each communications domain for transmission. Therefore, resources selected in different communications domains may conflict, and consequently transmission cannot be performed in some communications domains. Alternatively, resources selected in different communications domains are multiplexed in frequency domain. As a result, receiving processes of communications apparatuses included in some communications domains may be blocked by a receiving process of another communications apparatus in another communications domain, reducing information receiving quality.

SUMMARY

Embodiments of this application provide a communications method and apparatus, to improve information receiving quality.

According to a first aspect, a first communications method is provided. The method includes: A first communications apparatus determines a second resource pool, where the second resource pool is different from a first resource pool, and the first resource pool is managed by the first communications apparatus and used by the first communications apparatus to communicate with another communications apparatus. The first communications apparatus sends first configuration information, where the first configuration information is used to indicate the second resource pool.

The method may be performed by the first communications apparatus. The first communications apparatus may be a communications device or a communications apparatus, for example, a chip, that can support the communications device in implementing a function required in the method. For example, the first communications apparatus is a terminal apparatus, and the terminal apparatus may be a vehicle-mounted apparatus, or may be a non-vehicle-mounted apparatus. The terminal apparatus is a terminal device, or a chip that is disposed in the terminal device and that is configured to implement a function of the terminal device, or another component configured to implement a function of the terminal device.

In this embodiment of this application, the first communications apparatus may indicate the second resource pool, and the another communications apparatus can determine, based on the second resource pool, a resource pool to be used by the communications apparatus, to avoid a conflict between resources used by different communications apparatuses, and reduce mutual impact of communication processes of the different communications apparatuses.

For example, the second resource pool may include a resource other than a resource included in the first resource pool. In this case, the first resource pool is different from the second resource pool. Alternatively, the second resource pool may be a resource pool allocated by the first communications apparatus to a second communications apparatus, and the first resource pool is a resource pool used by the first communications apparatus. To avoid a resource conflict, the first resource pool may be different from the second resource pool. In this embodiment of this application, that the first resource pool is different from the second resource pool may mean that the first resource pool is completely different from the second resource pool, that is, a resource included in the first resource pool and a resource included in the second resource pool have no intersection. Alternatively, that the first resource pool is different from the second resource pool may mean that the first resource pool is not completely the same as the second resource pool, that is, a resource included in the first resource pool and a resource included in the second resource pool have an intersection, but the first resource pool further includes another resource in addition to the intersection, and/or the second resource pool further includes another resource in addition to the intersection.

In an optional implementation, the second resource pool is managed by the second communications apparatus and used by the second communications apparatus to communicate with another communications apparatus.

The first communications apparatus allocates a resource pool to another communications apparatus, where the allocated resource pool may be managed by the another communications apparatus and used by the another communications apparatus to perform communication, so that the first communications apparatus can uniformly allocate a resource pool to all communications apparatuses. In this case, the first communications apparatus may configure the resource pool when allocating the resource pool to all the communications apparatuses, to reduce as much as possible a probability that resources included in resource pools of different communications domains conflict with each other (the resource conflict herein may be a conflict in frequency domain, or may be a conflict in time domain, or may be a conflict in time domain and a conflict in frequency domain), and reduce as much as possible a probability that a receiving process of one communications apparatus is affected by another communications apparatus, so as to improve information receiving quality. For example, the second resource pool may be allocated by the first communications apparatus to the second communications apparatus, and the second resource pool may be managed by the second communications apparatus and used by the second communications apparatus to communicate with another communications apparatus. That the second resource pool is managed by the second communications apparatus may mean that the second communications apparatus may allocate a resource in the second resource pool to another communications apparatus, so that the second communications apparatus and the another communications apparatus can communicate with each other by using the allocated resource. The first communications apparatus uniformly allocates a resource pool to all communications apparatuses (or all communications domains), so that proper and effective use of a resource can be more easily implemented. In particular, in a scenario in which there are a plurality of communications domains, a resource can be more properly and effectively used. In addition, the first communications apparatus specifically allocates the second resource pool to the second communications apparatus (or a second communications domain in which the second communications apparatus is a master node), so that the second communications apparatus can directly obtain the second resource pool without excessive operations, and therefore a manner is simple and easily implemented.

In an optional implementation, the first resource pool includes a first time-frequency resource, and the second resource pool includes a second time-frequency resource; the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

Resources may be multiplexed in different communications domains in a frequency division manner. For example, resources may be multiplexed in a first communications domain and a second communications domain in a frequency division multiplexing manner. However, if a distance between devices included in two communications domains is short, a blocking phenomenon occurs when resources are multiplexed in a frequency division manner. To reduce a probability that a blocking phenomenon occurs in information receiving processes of the first communications domain and the second communications domain, in this embodiment of this application, the first resource pool and the second resource pool may be time-division multiplexed. In a time division multiplexing manner, transmit end apparatuses in the two communications domains do not send information at a same time point, and therefore receive end apparatuses in the two communications domains do not receive information at a same time point, so that blocking can be reduced. Further, optionally, to reduce a transmission latency, in this embodiment of this application, the first resource pool and the second resource pool may be time-division multiplexed in one time subunit (for example, the first time domain resource and the second time domain resource are located in the first time subunit), so that a transmission latency of a service is less than one time subunit, to meet a requirement for a service (for example, a noise reduction service) having a high latency requirement.

In an optional implementation, the first time subunit sequentially includes the first time domain resource and the second time domain resource in time domain.

The first time domain resource is a time domain resource used by the first communications apparatus, and the second time domain resource is a time domain resource used by the second communications apparatus. For example, the first communications domain may be a communications domain having a high priority in a vehicle. For example, the first communications domain is a CDC communications domain, and a priority of the CDC communications domain is high, or more or important services are performed in the CDC communications domain. In this case, the CDC communications domain occupies a former time domain resource, so that a service in the CDC communications domain can be preferentially performed, to meet a requirement of an important service.

In an optional implementation, the second resource pool includes a first resource subpool and a second resource subpool.

That the first communications apparatus sends first configuration information, where the first configuration information is used to indicate the second resource pool includes:

The first communications apparatus sends the first configuration information, where the first configuration information is used to indicate the first resource subpool and/or the second resource subpool, the first resource subpool is used by the second communications apparatus to transmit data to another communications apparatus, and the second resource subpool is used by the second communications apparatus to transmit signaling or a signal to another communications apparatus.

For example, the first configuration information may indicate the first resource subpool and the second resource subpool. The first resource subpool and the second resource subpool may be indicated by using the configuration information. In this manner, signaling overheads can be reduced. Alternatively, the first configuration information may indicate the first resource subpool, or indicate the second resource subpool, that is, the first configuration information may indicate one of the resource subpools. In this case, the other resource subpool may be indicated by using the other piece of configuration information. For example, the first communications apparatus may further send a piece of configuration information, for example, referred to as fourth configuration information. For example, the first configuration information indicates the first resource subpool, and the fourth configuration information indicates the second resource subpool, or the first configuration information indicates the second resource subpool, and the fourth configuration information indicates the first resource subpool. The first configuration information and the fourth configuration information may be carried in a same message, or may be carried in different messages. The first resource subpool and the second resource subpool are respectively configured by using the two pieces of configuration information, so that the configured resource pool can be more specific.

In an optional implementation, the first configuration information includes:

time domain information, frequency domain information, time domain information and frequency domain information, or time-frequency resource information of the first resource subpool in one time subunit, or time domain information, frequency domain information, time domain information and frequency domain information, or time-frequency resource information of the first resource subpool in one time subunit in one frequency domain unit; and/or time domain information of the second resource subpool, or time domain information of the second resource subpool in one time unit, or time domain information of the second resource subpool in one frequency domain unit, or time domain information of the second resource subpool in one frequency domain unit in one time unit.

If the first configuration information indicates the first resource subpool, the first configuration information may indicate information about one time subunit. If time-frequency domain information corresponding to different time subunits in the first resource subpool is different, the first communications apparatus may respectively indicate the time-frequency domain information by using different configuration information; or if time-frequency domain information corresponding to different time subunits in the first resource sub-pool is the same, the first communications apparatus needs to indicate only one of the time subunits, to reduce transmission overheads. Alternatively, the first configuration information may specifically include time domain information, frequency domain information, time domain information and frequency domain information, or time-frequency resource information of the first resource subpool in one time subunit in one frequency domain unit. To be specific, the first configuration information may indicate information about a time subunit in a frequency domain unit. If time-frequency domain information corresponding to different time subunits in the first resource subpool in the frequency domain unit is different, the first communications apparatus may respectively indicate the time-frequency domain information by using different configuration information; or if time-frequency domain information corresponding to time subunits in the first resource subpool in different frequency domain units is different, the first configuration information may respectively indicate the time-frequency domain information by using different configuration information.

Alternatively, if the first configuration information indicates the second resource subpool, the first configuration information may indicate overall time domain information of the second resource subpool. Alternatively, the first configuration information may indicate time domain information in one time unit. If time-frequency domain information corresponding to different time units in the second resource subpool is different, the first communications apparatus may respectively indicate the time-frequency domain information by using different configuration information; or if time-frequency domain information corresponding to different time units in the second resource subpool is the same, the first communications apparatus may indicate time-frequency domain information in one of the time units by using one piece of configuration information (for example, the first configuration information), so that transmission overheads can be reduced. Alternatively, the first configuration information may indicate time domain information in one frequency domain unit. If time-frequency domain information corresponding to different time units in the second resource subpool in different frequency domain units is different, the first communications apparatus may respectively indicate the time-frequency domain information by using different configuration information; or if time-frequency domain information corresponding to different time units in the second resource subpool in different frequency domain units is the same, the first communications apparatus may indicate time-frequency domain information in one time unit in one of the frequency domain units by using one piece of configuration information (for example, the first configuration information), so that transmission overhead can be reduced. Alternatively, the first configuration information may indicate time domain information in one time unit and in one frequency domain unit. If time domain information of second resource subpools in different time units in the frequency domain unit is different, the first configuration information may respectively indicate the time domain information by using different configuration information; or if time domain information of second resource subpools in different time units in the time unit is different, the first configuration information may respectively indicate the time domain information by using different configuration information; or if time domain information of second resource subpools in other frequency domain units is different, the first configuration information may respectively indicate the time domain information by using different configuration information; or if time domain information of second resource subpools in other time units is different, the first configuration information may respectively indicate the time domain information by using different configuration information; or if time domain information of second resource subpools in different time units in the frequency domain unit is the same, the first communications apparatus may indicate time-frequency domain information in one time unit in one of the frequency domain units by using one piece of configuration information (for example, the first configuration information), so that transmission overheads can be reduced.

In an optional implementation, the method further includes the following step:

The first communications apparatus sends second configuration information to a third communications apparatus, where the second configuration information is used to indicate a third resource pool, and the third resource pool is managed by the third communications apparatus and used by the third communications apparatus to communicate with another communications apparatus, where a frequency domain resource included in the third resource pool is different from a frequency domain resource included in the first resource pool, and/or a third time domain resource included in the third resource pool and the first time domain resource are located in different time units; or a frequency domain resource included in the third resource pool is different from a frequency domain resource included in the second resource pool, and/or a third time domain resource included in the third resource pool and the second time domain resource are located in different time units.

For example, the first communications apparatus is a master node in a communications domain (for example, referred to as a first communications domain) having a highest priority in a vehicle. The first communications apparatus may configure a resource pool for each of all or some communications domains other than the first communications domain in the vehicle for communication in these communications domains. In this case, in addition to configuring the second resource pool for a second communications domain (or the second communications apparatus), the first communications apparatus may further configure a resource pool for another communications domain (or a communications apparatus). For example, the first communications apparatus may further configure the third resource pool for the third communications apparatus for communication in a third communications domain.

For example, the frequency domain resource included in the third resource pool may be different from the frequency domain resource included in the second resource pool. For example, a frequency domain unit to which the frequency domain resource included in the third resource pool belongs is different from a frequency domain unit to which the frequency domain resource included in the second resource pool belongs. This may be understood as that the third resource pool and the second resource pool are frequency-division multiplexed. In this case, a location of a communications apparatus in a third communications domain or the communications apparatus in the second communications domain may be deployed, to reduce a possibility that the communications apparatus in the third communications domain and the communications apparatus in a fourth communications domain are blocked. Alternatively, a third time domain resource included in the third resource pool and the second time domain resource are located in different time units. This may be understood as that the third resource pool and the second resource pool are time-division multiplexed between time units. In a time division multiplexing manner, a possibility that the communications apparatus in the third communications domain and the communications apparatus in a fourth communications domain are blocked can be reduced. For example, all communications apparatuses included in the third communications domain are non-vehicle-mounted apparatuses. In this case, the second resource pool and the third resource pool are resource pools configured for two communications domains including non-vehicle-mounted apparatuses. To be specific, the resource pools configured for the two communications domains including the non-vehicle-mounted apparatuses may be frequency-division multiplexed, or may be multiplexed between time units.

For another example, the frequency domain resource included in the third resource pool may be different from the frequency domain resource included in the first resource pool. For example, a frequency domain unit to which the frequency domain resource included in the third resource pool belongs is different from a frequency domain unit to which the frequency domain resource included in the first resource pool belongs. This may be understood as that the third resource pool and the first resource pool are frequency-division multiplexed. In this case, a location of a communications apparatus in a third communications domain or the communications apparatus in the first communications domain may be deployed, to reduce a possibility that the communications apparatus in the third communications domain and the communications apparatus in the first information domain are blocked. Alternatively, a third time domain resource included in the third resource pool and the first time domain resource are located in different time units. This may be understood as that the third resource pool and the first resource pool are time-division multiplexed between time units. In a time division multiplexing manner, a possibility that the communications apparatus in the third communications domain and the communications apparatus in the first communications domain are blocked can be reduced. For example, all communications apparatuses included in the third communications domain are vehicle-mounted apparatuses. For example, the third communications domain is a communications domain 3 shown in FIG. 1A. In this case, it may be considered that resource pools of a communications domain having a highest priority and a communications domain including a vehicle-mounted apparatus may be frequency-division multiplexed, or may be multiplexed between time units.

In an optional implementation, the method further includes the following step:

The first communications apparatus sends third configuration information to a fourth communications apparatus, where the third configuration information is used to indicate a fourth resource pool, and the fourth resource pool is managed by the fourth communications apparatus and used by the fourth communications apparatus to communicate with another communications apparatus, where a frequency domain resource included in the fourth resource pool is different from the frequency domain resource included in the third resource pool, and/or a fourth time domain resource included in the fourth resource pool and the third time domain resource are located in different time units.

For example, the first communications apparatus is a master node in a communications domain (for example, referred to as a first communications domain) having a highest priority in a vehicle. The first communications apparatus may configure a resource pool for each of all or some communications domains other than the first communications domain in the vehicle for communication in these communications domains. In this case, in addition to configuring the second resource pool for a second communications domain (or the second communications apparatus), the first communications apparatus may further configure a resource pool for another communications domain (or a communications apparatus). For example, the first communications apparatus may further configure the fourth resource pool for the fourth communications apparatus for communication in a fourth communications domain.

For example, the frequency domain resource included in the fourth resource pool may be different from the frequency domain resource included in the third resource pool. For example, a frequency domain unit to which the frequency domain resource included in the third resource pool belongs is different from a frequency domain unit to which the frequency domain resource included in the fourth resource pool belongs. This may be understood as that the fourth resource pool and the third resource pool are frequency-division multiplexed. In this case, a location of a communications apparatus in a third communications domain or the communications apparatus in the fourth communications domain may be deployed, to reduce a possibility that the communications apparatus in the third communications domain and the communications apparatus in the fourth communications domain are blocked. Alternatively, a fourth time domain resource included in the fourth resource pool and the third time domain resource are located in different time units. This may be understood as that the fourth resource pool and the third resource pool are time-division multiplexed between time units. In a time division multiplexing manner, a possibility that the communications apparatus in the third communications domain and the communications apparatus in the fourth communications domain are blocked can be reduced. For example, all communications apparatuses included in the fourth communications domain are vehicle-mounted apparatuses (for example, the fourth communications domain is a communications domain in which a telematics box is a master node), and all communications apparatuses included in the third communications domain are also vehicle-mounted apparatuses. In this case, the fourth resource pool and the third resource pool are resource pools configured for two communications domains including vehicle-mounted apparatuses. To be specific, the resource pools configured for the two communications domains including the vehicle-mounted apparatuses may be frequency-division multiplexed, or may be multiplexed between time units.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In a current radio frame, a last GP occupies a last symbol of the radio frame, that is, in the current radio frame, there is no other symbol after the last GP. In this embodiment of this application, because resource pools of two communications domains need to be time-division multiplexed in one time subunit, a GP that originally occupies a last symbol of the time subunit may be moved to the front, so that the GP no longer occupies the last symbol of the time subunit. In this case, the last symbol of the time subunit can be further used for uplink transmission or downlink transmission.

In an Optional Implementation, the first time domain resource sequentially includes a first time domain sub-resource, the first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, the second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus.

It can be learned that, in this embodiment of this application, a GP that originally occupies a last symbol in a time subunit is moved to the front, and the time subunit may be divided into two parts between two GPs in the time subunit. The two parts respectively belong to the first time domain resource and the second time domain resource. The first time domain resource includes the first GP, and the first time domain resource includes both a symbol (the first time domain sub-resource) located before the first GP and a symbol (the second time domain sub-resource) located after the first GP. For example, the first time domain sub-resource may be used for uplink transmission and the second time domain sub-resource is used for downlink transmission, or the first time domain sub-resource may be used for downlink transmission and the second time domain sub-resource is used for uplink transmission, that is, based on the first GP, the first time domain resource can implement both uplink transmission and downlink transmission, to meet a communication requirement in the first communications domain. In addition, the first GP separates uplink and downlink transmission, and may be used by the apparatus in the first communications domain to perform receiving/sending conversion. Similarly, the second time domain resource includes the second GP, and the second time domain resource includes both a symbol (the third time domain sub-resource) located before the second GP and a symbol (the fourth time domain sub-resource) located after the second GP. For example, the third time domain sub-resource may be used for uplink transmission and the fourth time domain sub-resource is used for downlink transmission, or the third time domain sub-resource may be used for downlink transmission and the fourth time domain sub-resource is used for uplink transmission, that is, based on the second GP, the second time domain resource can implement both uplink transmission and downlink transmission, to meet a communication requirement in the second communications domain. In addition, the second GP separates uplink and downlink transmission, and may be used by the apparatus in the second communications domain to perform receiving/sending conversion.

In an optional implementation, transmission directions corresponding to the first time domain sub-resource and the third time domain sub-resource are the same, and/or transmission directions corresponding to the second time domain sub-resource and the fourth time domain sub-resource are the same.

That is, the transmission directions corresponding to the first time domain sub-resource and the third time domain sub-resource are the same (for example, both are uplink transmission or both are downlink transmission), or the transmission directions corresponding to the second time domain sub-resource and the fourth time domain sub-resource are the same (for example, both are uplink transmission or both are downlink transmission), or the transmission directions corresponding to the first time domain sub-resource and the third time domain sub-resource are the same, and the transmission directions corresponding to the second time domain sub-resource and the fourth time domain sub-resource are the same. In other words, transmission manners of the first time domain resource and the second time domain resource each may be uplink first and then downlink, or each may be downlink first and then uplink, so that scheduling is easier.

In an optional implementation, the method further includes the following step:

The first communications apparatus sends first information, where the first information includes at least one of length information of the first time domain sub-resource, length information of the second time domain sub-resource, length information of the third time domain sub-resource, or length information of the fourth time domain sub-resource.

The first communications apparatus sends the first information, so that another communications apparatus in the first communications domain can determine a division status of a time subunit, and therefore the another communications apparatus in the first communications domain can learn which time domain resources in the time subunit can be used to transmit information to the first communications apparatus.

In an optional implementation, the first resource pool further includes a second time subunit, and the second time subunit sequentially includes a fifth time domain resource, a third GP, a sixth time domain resource, a fourth GP, and a seventh time domain resource in time domain.

For example, the first communications domain is a CDC communications domain, that is, the first communications apparatus is a CDC. The CDC communications domain usually has a large service volume, and may require a large quantity of resources for service data transmission. Therefore, in an optional implementation, in this embodiment of this application, a resource pool used in the first communications domain may be further extended. It may be understood that the first resource pool can include more resources, so that a communication requirement in the first communications domain can be met. In addition, for example, the sixth time domain resource includes an extended resource. In this case, the sixth time domain resource originally includes boundaries of two resource pools (for example, if the extended resource is allocated to the second resource pool or another resource pool, the sixth time domain resource may include the boundaries of the two resource pools). Because transmission directions of the sixth time domain resource are the same, that is, a transmission direction of the extended resource included in the sixth time domain resource is the same as a transmission direction of a resource that originally belongs to the first resource pool and that is included in the sixth time domain resource, the first communications apparatus and another communications apparatus (for example, the second communications apparatus) do not need to perform receiving/sending conversion when crossing a boundary of a resource pool, to avoid a requirement for a GP generated during additional receiving/sending conversion.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

For example, both the fifth time domain resource and the seventh time domain resource are used for uplink transmission, and the sixth time domain resource is used for downlink transmission, or both the fifth time domain resource and the seventh time domain resource are used for downlink transmission, and the sixth time domain resource is used for uplink transmission. In this manner, both uplink transmission and downlink transmission can be implemented in the first communications domain in the second time subunit, and a GP exists between uplink and downlink transmission, so that the apparatus in the first communications domain performs receiving/sending conversion. In addition, for example, a third time subunit adjacent to the second time subunit in time domain further exists after the second time subunit. In this case, the third time subunit also includes three time domain resources, and transmission directions of the three time domain resources correspond to the transmission directions of the fifth time domain resource, the sixth time domain resource, and the seventh time domain resource. In this way, a transmission direction of a time domain resource that is ranked first in time domain in the three time domain resources is the same as the transmission direction of the seventh time domain resource, so that the apparatus in the first communications domain does not need to perform receiving/sending conversion when crossing a boundary of a time subunit, to avoid a requirement for a GP generated during receiving/sending conversion.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

GPs included in the first time subunit and the second time subunit may be aligned. That GPs in two time subunits are aligned means that time domain lengths of the GPs in the two time subunits are the same, and time domain boundaries of the GPs in the two time subunits are the same. For example, a GP included in the first time subunit and a GP included in the second time subunit may meet the following: The first GP included in the first time subunit and the third GP included in the second time subunit are aligned in time domain. Alternatively, the second GP included in the first time subunit and the fourth GP included in the second time subunit are aligned in time domain. Alternatively, the first GP included in the first time subunit and the third GP included in the second time subunit are aligned in time domain, and the second GP included in the first time subunit and the fourth GP included in the second time subunit are aligned in time domain. Alternatively, it is understood that the time domain resource included in the first time subunit and the time domain resource included in the second time subunit meet one or more of the following relationships: The length of the fifth time domain resource is the same as the length of the first time domain resource; the sum of the lengths of the second time domain sub-resource and the third time domain sub-resource is the same as the length of the sixth time domain resource; or the length of the fourth time domain sub-resource is the same as the length of the seventh time domain resource. For example, the time domain resource included in the first time subunit and the time domain resource included in the second time subunit may meet any one of the foregoing three relationships, or meet any two of the foregoing three relationships, or meet all of the foregoing three relationships. In this manner, symbol boundaries of a time subunit of a time division multiplexing structure and a time subunit of an extended resource structure are aligned, to reduce interference.

In an optional implementation, the second resource pool is a reserved resource pool.

The second resource pool may be allocated by the first communications apparatus to the second communications apparatus, or the second resource pool may be the reserved resource pool. For example, the reserved resource pool may be used in a communications domain to which a resource pool is not allocated, so that a conflict between a communication resource of the communications domain to which the resource pool is not allocated and a communication resource of the first communications domain can be avoided, mutual impact of communication processes of the two communications domains can be reduced or avoided, and communication quality can be improved. Alternatively, the second resource pool may not be specifically provided for the second communications domain. For example, the first communications apparatus may determine the second resource pool based on the first resource pool. The second resource pool may include another resource outside the first resource pool, or the second resource pool may include a resource that is unavailable to the first communications domain. For example, if master nodes in all or some communications domains in a vehicle may broadcast an unavailable resource (or an unavailable resource pool) for the communications domain, a master node that receives resources broadcast by a master node in another communications domain can select, based on the resources broadcast by the master node in the another communications domain, resources that can be used by the master node, for example, may select some or all resources from the resources as the resources to be used by the master node.

In an optional implementation, the method further includes the following step:

The first communications apparatus sends second information, where the second information is used to indicate the first resource pool or used to indicate an available resource in the first resource pool.

For example, if the second information indicates the first resource pool, the second information may directly indicate the first resource pool, or may indirectly indicate the first resource pool by indicating another resource pool or indicating a resource that does not belong to the first resource pool. For another example, the second information may alternatively indicate the available resource in the first resource pool. For example, the second information may indicate a union of a resource that does not belong to the first resource pool and a resource that has been occupied in the first resource pool for some reasons, that is, the second information indirectly indicates the available resource in the first resource pool. The resource occupied for some reasons includes, for example, one or more of the following: a resource occupied by a noise reduction service, a resource occupied by system signaling, or a resource occupied by a system signal. The noise reduction service is a stable service, and usually there is a noise reduction service in each time subunit. Therefore, the resource occupied by the noise reduction service is also fixed. In this case, the second information may indicate the resource. In this way, a resource other than the resource that has been occupied for some reasons in the first resource pool is the available resource in the first resource pool. After receiving the second information, a communications apparatus other than the first communications apparatus in the first communications domain may determine which resources in the first resource pool can be used to communicate with the first communications apparatus.

According to a second aspect, a second communications method is provided. The method includes: A second communications apparatus receives first configuration information from a first communications apparatus. The second communications apparatus determines a second resource pool based on the first configuration information, where the second resource pool is managed by the second communications apparatus and used by the second communications apparatus to communicate with another communications apparatus, the second resource pool is different from a first resource pool, and the first resource pool is managed by the first communications apparatus and used by the first communications apparatus to communicate with another communications apparatus.

The method may be performed by the second communications apparatus. The second communications apparatus may be a communications device or a communications apparatus, for example, a chip, that can support the communications device in implementing a function required in the method. For example, the second communications apparatus is a terminal apparatus, and the terminal apparatus may be a vehicle-mounted apparatus, or may be a non-vehicle-mounted apparatus. The terminal apparatus is a terminal device, or a chip that is disposed in the terminal device and that is configured to implement a function of the terminal device, or another component configured to implement a function of the terminal device.

In an optional implementation, the first resource pool includes a first time-frequency resource, and the second resource pool includes a second time-frequency resource;

the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

In an optional implementation, the first time subunit sequentially includes the first time domain resource and the second time domain resource in time domain.

In an optional implementation, the second resource pool includes a first resource subpool and a second resource subpool.

That the second communications apparatus determines a second resource pool based on the first configuration information includes:

The second communications apparatus determines the first resource subpool and/or the second resource subpool based on the first configuration information, where the first resource subpool is used by the second communications apparatus to transmit data to another communications apparatus, and the second resource subpool is used by the second communications apparatus to transmit signaling or a signal to another communications apparatus.

In an optional implementation, the first configuration information includes:

time domain information, frequency domain information, time-frequency information and frequency domain information, or time-frequency resource information of the first resource subpool in one time subunit, or time domain information, frequency domain information, time-frequency information and frequency domain information, or time-frequency resource information of the first resource subpool in one time subunit in one frequency domain unit; and/or time domain resource information of the second resource subpool, or time domain information of the second resource subpool in one time unit, or time domain information of the second resource subpool in one frequency domain unit, or time domain information of the second resource subpool in one frequency domain unit in one time unit.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In an Optional Implementation, the first time domain resource sequentially includes a first time domain sub-resource, the first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, the second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus.

In an optional implementation, transmission directions corresponding to the first time domain sub-resource and the third time domain sub-resource are the same, and/or transmission directions corresponding to the second time domain sub-resource and the fourth time domain sub-resource are the same.

In an optional implementation, the method further includes the following step:

The second communications apparatus sends third information, where the third information includes at least one of length information of the first time domain sub-resource, length information of the second time domain sub-resource, length information of the third time domain sub-resource, or length information of the fourth time domain sub-resource.

In an optional implementation, the first resource pool further includes a second time subunit, and the second time subunit sequentially includes a fifth time domain resource, a third GP, a sixth time domain resource, a fourth GP, and a seventh time domain resource in a front-to-back order in time domain.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

In an optional implementation, the second resource pool is a reserved resource pool.

In an optional implementation, the method further includes the following step:

The second communications apparatus sends fourth information, where the fourth information is used to indicate the second resource pool or used to indicate an available resource in the second resource pool.

For technical effects brought by the second aspect or the optional implementations, refer to descriptions of the technical effects brought by the first aspect or the corresponding implementations.

According to a third aspect, a third communications method is provided. The method includes: A third communications apparatus receives second configuration information from a first communications apparatus. The third communications apparatus determines a third resource pool based on the second configuration information, where the third resource pool is managed by the third communications apparatus and used by the third communications apparatus to communicate with another communications apparatus.

The method may be performed by the third communications apparatus. The third communications apparatus may be a communications device or a communications apparatus, for example, a chip, that can support the communications device in implementing a function required in the method. For example, the third communications apparatus is a terminal apparatus, and the terminal apparatus may be a vehicle-mounted apparatus, or may be a non-vehicle-mounted apparatus. The terminal apparatus is a terminal device, or a chip that is disposed in the terminal device and that is configured to implement a function of the terminal device, or another component configured to implement a function of the terminal device.

In an Optional Implementation, a frequency domain resource included in the third resource pool is different from a frequency domain resource included in a first resource pool, and/or a third time domain resource included in the third resource pool and a first time domain resource are located in different time units; or a frequency domain resource included in the third resource pool is different from a frequency domain resource included in a second resource pool, and/or a third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation, the first time domain resource sequentially includes a first time domain sub-resource, a first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, a second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus; and/or the third time domain resource sequentially includes a fifth time domain sub-resource, a fifth GP, and a sixth time domain sub-resource in time domain, where the fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus.

In an optional implementation, the method further includes the following step:

The third communications apparatus sends fifth information, where the fifth information includes at least one of length information of the first time domain sub-resource, length information of the second time domain sub-resource, length information of the fifth time domain sub-resource, or length information of the sixth time domain sub-resource, or the fifth information includes at least one of length information of the third time domain sub-resource, length information of the fourth time domain sub-resource, length information of the fifth time domain sub-resource, or length information of the sixth time domain sub-resource.

In an optional implementation, the method further includes the following step:

The third communications apparatus sends sixth information, where the sixth information is used to indicate the third resource pool or used to indicate an available resource in the third resource pool.

For technical effects brought by the third aspect or the optional implementations, refer to descriptions of the technical effects brought by the first aspect or the corresponding implementations.

According to a fourth aspect, a fourth communications method is provided. The method includes: A fourth communications apparatus receives third configuration information from a first communications apparatus. The fourth communications apparatus determines a fourth resource pool based on the third configuration information, where the fourth resource pool is managed by the fourth communications apparatus and used by the fourth communications apparatus to communicate with another communications apparatus.

The method may be performed by the fourth communications apparatus. The fourth communications apparatus may be a communications device or a communications apparatus, for example, a chip, that can support the communications device in implementing a function required in the method. For example, the fourth communications apparatus is a terminal apparatus, and the terminal apparatus may be a vehicle-mounted apparatus, or may be a non-vehicle-mounted apparatus. The terminal apparatus is a terminal device, or a chip that is disposed in the terminal device and that is configured to implement a function of the terminal device, or another component configured to implement a function of the terminal device.

In an Optional Implementation, a frequency domain resource included in the fourth resource pool is different from a frequency domain resource included in a third resource pool, and/or a fourth time domain resource included in the fourth resource pool and a third time domain resource are located in different time units.

The third resource pool is managed by a third communications apparatus and used by the third communications apparatus to communicate with another communications apparatus, and the third time domain resource belongs to the third resource pool.

In an Optional Implementation, the frequency domain resource included in the third resource pool is different from a frequency domain resource included in a first resource pool, and/or the third time domain resource included in the third resource pool and a first time domain resource are located in different time units; or the frequency domain resource included in the third resource pool is different from a frequency domain resource included in a second resource pool, and/or the third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation, the third time domain resource sequentially includes a fifth time domain sub-resource, a fifth GP, and a sixth time domain sub-resource in time domain, where the fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus; and/or the fourth time domain resource sequentially includes a seventh time domain sub-resource, a sixth GP, and an eighth time domain sub-resource in time domain, where the seventh time domain sub-resource is used to map a signal from the fourth communications apparatus, and the eighth time domain sub-resource is used to map a signal sent to the fourth communications apparatus, or the seventh time domain sub-resource is used to map a signal sent to the fourth communications apparatus, and the eighth time domain sub-resource is used to map a signal from the fourth communications apparatus.

In an optional implementation, the method further includes the following step:

The fourth communications apparatus sends seventh information, where the seventh information includes at least one of length information of the fifth time domain sub-resource, length information of the sixth time domain sub-resource, length information of the seventh time domain sub-resource, or length information of the eighth time domain sub-resource.

In an optional implementation, the method further includes the following step:

The fourth communications apparatus sends eighth information, where the eighth information is used to indicate the fourth resource pool or used to indicate an available resource in the fourth resource pool.

For technical effects brought by the fourth aspect or the optional implementations, refer to descriptions of the technical effects brought by the first aspect or the corresponding implementations.

According to a fifth aspect, a communications apparatus is provided. For example, the communications apparatus is the first communications apparatus described above. The first communications apparatus is configured to perform the method according to any one of the first aspect or the possible implementations. Specifically, the first communications apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the first communications apparatus is a communications device, or a chip or another component disposed in the communications device. For example, the communications device is a terminal device or a vehicle-mounted module. For example, the first communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). For example, if the first communications apparatus is the communications device, the transceiver is implemented as an antenna, a feeder, and a codec in the communications device. Alternatively, if the first communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. In a description process of the fifth aspect, the processing module and the transceiver module are still used as an example for description.

The processing module is configured to determine a second resource pool, where the second resource pool is different from a first resource pool, and the first resource pool is managed by the first communications apparatus and used by the first communications apparatus to communicate with another communications apparatus.

The transceiver module is configured to send first configuration information, where the first configuration information is used to indicate the second resource pool.

In an optional implementation, the second resource pool is managed by a second communications apparatus and used by the second communications apparatus to communicate with another communications apparatus.

In an optional implementation, the first resource pool includes a first time-frequency resource, and the second resource pool includes a second time-frequency resource; the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

In an optional implementation, the first time subunit sequentially includes the first time domain resource and the second time domain resource in time domain.

In an optional implementation, the second resource pool includes a first resource subpool and a second resource subpool.

The transceiver module is configured to send the first configuration information in the following manner, where the first configuration information is used to indicate the second resource pool:

sending the first configuration information, where the first configuration information is used to indicate the first resource subpool and/or the second resource subpool, the first resource subpool is used by the second communications apparatus to transmit data to another communications apparatus, and the second resource subpool is used by the second communications apparatus to transmit signaling or a signal to another communications apparatus.

In an Optional Implementation, the First Configuration Information Includes:

time domain information, frequency domain information, time-frequency information and frequency domain information, or time-frequency resource information of the first resource subpool in one time subunit, or time domain information, frequency domain information, time-frequency information and frequency domain information, or time-frequency resource information of the first resource subpool in one time subunit in one frequency domain unit; and/or time domain information of the second resource subpool, or time domain information of the second resource subpool in one time unit, or time domain information of the second resource subpool in one frequency domain unit, or time domain information of the second resource subpool in one frequency domain unit in one time unit.

In an optional implementation, the transceiver module is further configured to send second configuration information to a third communications apparatus, where the second configuration information is used to indicate a third resource pool, and the third resource pool is managed by the third communications apparatus and used by the third communications apparatus to communicate with another communications apparatus, where a frequency domain resource included in the third resource pool is different from a frequency domain resource included in the first resource pool, and/or a third time domain resource included in the third resource pool and the first time domain resource are located in different time units; or a frequency domain resource included in the third resource pool is different from a frequency domain resource included in the second resource pool, and/or a third time domain resource included in the third resource pool and the second time domain resource are located in different time units.

In an optional implementation, the transceiver module is further configured to send third configuration information to a fourth communications apparatus, where the third configuration information is used to indicate a fourth resource pool, and the fourth resource pool is managed by the fourth communications apparatus and used by the fourth communications apparatus to communicate with another communications apparatus, where a frequency domain resource included in the fourth resource pool is different from the frequency domain resource included in the third resource pool, and/or a fourth time domain resource included in the fourth resource pool and the third time domain resource are located in different time units.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In an Optional Implementation, the first time domain resource sequentially includes a first time domain sub-resource, the first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, the second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus.

In an optional implementation, transmission directions corresponding to the first time domain sub-resource and the third time domain sub-resource are the same, and/or transmission directions corresponding to the second time domain sub-resource and the fourth time domain sub-resource are the same.

In an optional implementation, the transceiver module is further configured to send first information, where the first information includes at least one of length information of the first time domain sub-resource, length information of the second time domain sub-resource, length information of the third time domain sub-resource, or length information of the fourth time domain sub-resource.

In an optional implementation, the first resource pool further includes a second time subunit, and the second time subunit sequentially includes a fifth time domain resource, a third GP, a sixth time domain resource, a fourth GP, and a seventh time domain resource in time domain.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

In an optional implementation, the second resource pool is a reserved resource pool.

In an optional implementation, the transceiver module is further configured to send second information, where the second information is used to indicate the first resource pool or used to indicate an available resource in the first resource pool.

For technical effects brought by the fifth aspect or the optional implementations, refer to descriptions of the technical effects brought by the first aspect or the corresponding implementations.

According to a sixth aspect, a communications apparatus is provided. For example, the communications apparatus is the second communications apparatus described above. The second communications apparatus is configured to perform the method according to any one of the second aspect or the possible implementations. Specifically, the second communications apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the second communications apparatus is a communications device, or a chip or another component disposed in the communications device. For example, the communications device is a network device (for example, an access network device), a terminal device, or a vehicle-mounted module. For example, the second communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). For example, if the second communications apparatus is the communications device, the transceiver is implemented as an antenna, a feeder, and a codec in the communications device. Alternatively, if the second communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. In a description process of the sixth aspect, the processing module and the transceiver module are still used as an example for description.

The transceiver module is configured to receive first configuration information from a first communications apparatus.

The processing module is configured to determine a second resource pool based on the first configuration information, where the second resource pool is managed by the second communications apparatus and used by the second communications apparatus to communicate with another communications apparatus, the second resource pool is different from a first resource pool, and the first resource pool is managed by the first communications apparatus and used by the first communications apparatus to communicate with another communications apparatus.

In an optional implementation, the first resource pool includes a first time-frequency resource, and the second resource pool includes a second time-frequency resource; the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

In an optional implementation, the first time subunit sequentially includes the first time domain resource and the second time domain resource in time domain.

In an optional implementation, the second resource pool includes a first resource subpool and a second resource subpool.

The processing module is configured to determine the second resource pool based on the first configuration information in the following manner:

determining the first resource subpool and/or the second resource subpool based on the first configuration information, where the first resource subpool is used by the second communications apparatus to transmit data to another communications apparatus, and the second resource subpool is used by the second communications apparatus to transmit signaling or a signal to another communications apparatus.

In an Optional Implementation, the First Configuration Information Includes:

time domain information, frequency domain information, time-frequency information and frequency domain information, or time-frequency resource information of the first resource subpool in one time subunit, or time domain information, frequency domain information, time-frequency information and frequency domain information, or time-frequency resource information of the first resource subpool in one time subunit in one frequency domain unit; and/or time domain resource information of the second resource subpool, or time domain information of the second resource subpool in one time unit, or time domain information of the second resource subpool in one frequency domain unit, or time domain information of the second resource subpool in one frequency domain unit in one time unit.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In an Optional Implementation, the first time domain resource sequentially includes a first time domain sub-resource, the first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, the second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus.

In an optional implementation, transmission directions corresponding to the first time domain sub-resource and the third time domain sub-resource are the same, and/or transmission directions corresponding to the second time domain sub-resource and the fourth time domain sub-resource are the same.

In an optional implementation, the transceiver module is further configured to send third information, where the third information includes at least one of length information of the first time domain sub-resource, length information of the second time domain sub-resource, length information of the third time domain sub-resource, or length information of the fourth time domain sub-resource.

In an optional implementation, the first resource pool further includes a second time subunit, and the second time subunit sequentially includes a fifth time domain resource, a third GP, a sixth time domain resource, a fourth GP, and a seventh time domain resource in a front-to-back order in time domain.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

In an optional implementation, the second resource pool is a reserved resource pool.

In an optional implementation, the transceiver module is further configured to send fourth information, where the fourth information is used to indicate the second resource pool or used to indicate an available resource in the second resource pool.

For technical effects brought by the sixth aspect or the optional implementations, refer to descriptions of the technical effects brought by the second aspect or the corresponding implementations.

According to a seventh aspect, a communications apparatus is provided. For example, the communications apparatus is the third communications apparatus described above. The third communications apparatus is configured to perform the method according to any one of the third aspect or the possible implementations. Specifically, the third communications apparatus may include modules configured to perform the method according to any one of the third aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the third communications apparatus is a communications device, or a chip or another component disposed in the communications device. For example, the communications device is a network device (for example, an access network device), a terminal device, or a vehicle-mounted module. For example, the third communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). For example, if the third communications apparatus is the communications device, the transceiver is implemented as an antenna, a feeder, and a codec in the communications device. Alternatively, if the third communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. In a description process of the seventh aspect, the processing module and the transceiver module are still used as an example for description.

The transceiver module is configured to receive second configuration information from a first communications apparatus.

The processing module is configured to determine a third resource pool based on the second configuration information, where the third resource pool is managed by the third communications apparatus and used by the third communications apparatus to communicate with another communications apparatus.

In an Optional Implementation, a frequency domain resource included in the third resource pool is different from a frequency domain resource included in a first resource pool, and/or a third time domain resource included in the third resource pool and a first time domain resource are located in different time units; or a frequency domain resource included in the third resource pool is different from a frequency domain resource included in a second resource pool, and/or a third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation, the first time domain resource sequentially includes a first time domain sub-resource, a first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, a second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus; and/or the third time domain resource sequentially includes a fifth time domain sub-resource, a fifth GP, and a sixth time domain sub-resource in time domain, where the fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus.

In an optional implementation, the transceiver module is further configured to send fifth information, where the fifth information includes at least one of length information of the first time domain sub-resource, length information of the second time domain sub-resource, length information of the fifth time domain sub-resource, or length information of the sixth time domain sub-resource, or the fifth information includes at least one of length information of the third time domain sub-resource, length information of the fourth time domain sub-resource, length information of the fifth time domain sub-resource, or length information of the sixth time domain sub-resource.

In an optional implementation, the transceiver module is further configured to send sixth information, where the sixth information is used to indicate the third resource pool or used to indicate an available resource in the third resource pool.

For technical effects brought by the seventh aspect or the optional implementations, refer to descriptions of the technical effects brought by the third aspect or the corresponding implementations.

According to an eighth aspect, a communications apparatus is provided. For example, the communications apparatus is the fourth communications apparatus described above. The fourth communications apparatus is configured to perform the method according to any one of the fourth aspect or the possible implementations. Specifically, the fourth communications apparatus may include modules configured to perform the method according to any one of the fourth aspect or the possible implementations, for example, include a processing module and a transceiver module. For example, the transceiver module may include a sending module and a receiving module. The sending module and the receiving module may be different functional modules, or may be a same functional module, but can implement different functions (the sending module is configured to implement a signal sending function, and the receiving module is configured to implement a signal receiving function). For example, the fourth communications apparatus is a communications device, or a chip or another component disposed in the communications device. For example, the communications device is a network device (for example, an access network device), a terminal device, or a vehicle-mounted module. For example, the fourth communications apparatus may be a vehicle-mounted module, or may be a chip or another component disposed in the vehicle-mounted module. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module, but can implement different functions (the transmitter is configured to implement a signal sending function, and the receiver is configured to implement a signal receiving function). For example, if the fourth communications apparatus is the communications device, the transceiver is implemented as an antenna, a feeder, and a codec in the communications device. Alternatively, if the fourth communications apparatus is the chip disposed in the communications device, the transceiver (or the transmitter and the receiver) is, for example, a communications interface (or an interface circuit) in the chip, and the communications interface is connected to a radio frequency transceiver component in the communications device, to implement information receiving and sending by using the radio frequency transceiver component. In a description process of the eighth aspect, the processing module and the transceiver module are still used as an example for description.

The transceiver module is configured to receive third configuration information from a first communications apparatus.

The processing module is configured to determine a fourth resource pool based on the third configuration information, where the fourth resource pool is managed by the fourth communications apparatus and used by the fourth communications apparatus to communicate with another communications apparatus.

In an Optional Implementation, a frequency domain resource included in the fourth resource pool is different from a frequency domain resource included in a third resource pool, and/or a fourth time domain resource included in the fourth resource pool and a third time domain resource are located in different time units.

The third resource pool is managed by a third communications apparatus and used by the third communications apparatus to communicate with another communications apparatus, and the third time domain resource belongs to the third resource pool.

In an Optional Implementation, the frequency domain resource included in the third resource pool is different from a frequency domain resource included in a first resource pool, and/or the third time domain resource included in the third resource pool and a first time domain resource are located in different time units; or the frequency domain resource included in the third resource pool is different from a frequency domain resource included in a second resource pool, and/or the third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation, the third time domain resource sequentially includes a fifth time domain sub-resource, a fifth GP, and a sixth time domain sub-resource in time domain, where the fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus; and/or the fourth time domain resource sequentially includes a seventh time domain sub-resource, a sixth GP, and an eighth time domain sub-resource in time domain, where the seventh time domain sub-resource is used to map a signal from the fourth communications apparatus, and the eighth time domain sub-resource is used to map a signal sent to the fourth communications apparatus, or the seventh time domain sub-resource is used to map a signal sent to the fourth communications apparatus, and the eighth time domain sub-resource is used to map a signal from the fourth communications apparatus.

In an optional implementation, the transceiver module is further configured to send seventh information, where the seventh information includes at least one of length information of the fifth time domain sub-resource, length information of the sixth time domain sub-resource, length information of the seventh time domain sub-resource, or length information of the eighth time domain sub-resource.

In an optional implementation, the transceiver module is further configured to send eighth information, where the eighth information is used to indicate the fourth resource pool or used to indicate an available resource in the fourth resource pool.

For technical effects brought by the eighth aspect or the optional implementations, refer to descriptions of the technical effects brought by the fourth aspect or the corresponding implementations.

According to a ninth aspect, a communications apparatus is provided. The communications apparatus is, for example, the first communications apparatus, the second communications apparatus, the third communications apparatus, or the fourth communications apparatus described above. The communications apparatus includes a processor and a communications interface (or an interface circuit). The communications interface may be configured to communicate with another apparatus or device. Optionally, the communications apparatus may further include a memory, configured to store computer instructions. The processor and the memory are coupled to each other, and are configured to implement the method according to the first aspect or the optional implementations, or configured to implement the method according to the second aspect or the optional implementations, or configured to implement the method according to the third aspect or the optional implementations, or configured to implement the method according to the fourth aspect or the optional implementations. Alternatively, the communications apparatus may not include a memory, and the memory may be located outside the communications apparatus. The processor, the memory, and the communications interface are coupled to each other, and are configured to implement the method according to the first aspect or the optional implementations, or configured to implement the method according to the second aspect or the optional implementations, or configured to implement the method according to the third aspect or the optional implementations, or configured to implement the method according to the fourth aspect or the optional implementations. For example, when the processor executes the computer instructions stored in the memory, the communications apparatus is enabled to perform the method according to any one of the first aspect or the optional implementations, or the communications apparatus is enabled to perform the method according to any one of the second aspect or the optional implementations, or the communications apparatus is enabled to perform the method according to any one of the third aspect or the optional implementations, or the communications apparatus is enabled to perform the method according to any one of the fourth aspect or the optional implementations. For example, the communications apparatus is a communications device, or a chip or another component disposed in the communications device. For example, the communications device is a terminal device or a vehicle-mounted module. For example, the communications apparatus may be a vehicle-mounted module, or may be a chip or another component disposed in the vehicle-mounted module.

If the communications apparatus is the communications device, the communications interface is implemented, for example, as a transceiver (or a transmitter and a receiver) in the communications device, and the transceiver is implemented, for example, as an antenna, a feeder, and a codec in the communications device. Alternatively, if the communications apparatus is the chip disposed in the communications device, the communications interface is, for example, an input/output interface such as an input/output pin of the chip, and the communications interface is connected to a radio frequency transceiver component in the communications device, to implement information receiving and sending by using the radio frequency transceiver component.

According to a tenth aspect, an embodiment of this application provides a chip. The chip includes a processor and a communications interface, the processor is configured to: invoke instructions from the communications interface and run the instructions, and when the processor executes the instructions, the chip is enabled to perform the method according to the first aspect, the second aspect, the third aspect, the fourth aspect, the implementations of the first aspect, the implementations of the second aspect, the implementations of the third aspect, or the implementations of the fourth aspect.

According to an eleventh aspect, an embodiment of this application further provides a computer-readable storage medium. The computer storage medium is configured to store a computer program, and when the computer program is run on a computer, the computer is enabled to perform the method according to the first aspect, the second aspect, the third aspect, the fourth aspect, the implementations of the first aspect, the implementations of the second aspect, the implementations of the third aspect, or the implementations of the fourth aspect.

According to a twelfth aspect, an embodiment of this application further provides a computer program product. The computer program product includes a computer program, and when the computer program is run on a computer, the computer is enabled to perform the method according to the first aspect, the second aspect, the third aspect, the fourth aspect, the implementations of the first aspect, the implementations of the second aspect, the implementations of the third aspect, or the implementations of the fourth aspect.

According to a thirteenth aspect, an embodiment of this application provides a communications system. The communications system includes the communications apparatus according to the fifth aspect, the communications apparatus according to the ninth aspect (which implements the method according to the first aspect or the optional implementations), or the chip according to the tenth aspect (which implements the method according to the first aspect or the optional implementations).

In an optional implementation, the communications system further includes the communications apparatus according to the sixth aspect, the communications apparatus according to the ninth aspect (which implements the method according to the second aspect or the optional implementations), or the chip according to the tenth aspect (which implements the method according to the second aspect or the optional implementations).

In an optional implementation, the communications system further includes the communications apparatus according to the seventh aspect, the communications apparatus according to the ninth aspect (which implements the method according to the third aspect or the optional implementations), or the chip according to the tenth aspect (which implements the method according to the third aspect or the optional implementations).

In an optional implementation, the communications system further includes the communications apparatus according to the eighth aspect, the communications apparatus according to the ninth aspect (which implements the method according to the fourth aspect or the optional implementations), or the chip according to the tenth aspect (which implements the method according to the fourth aspect or the optional implementations).

In embodiments of this application, the first communications apparatus may indicate the second resource pool, and the another communications apparatus can determine, based on the second resource pool, a resource pool to be used by the communications apparatus, to avoid a conflict between resources used by different communications apparatuses, and reduce mutual impact of communication processes of the different communications apparatuses.

BRIEF DESCRIPTION OF DRAWINGS

FIG. 3 is a schematic diagram of a structure of a radio frame when only one communications domain is considered;

FIG. 4 is a schematic diagram of a structure of a first time subunit according to an embodiment of this application;

FIG. 5 is a schematic diagram of a structure of a second time subunit according to an embodiment of this application;

FIG. 6 is a schematic diagram of resource pool allocation according to an embodiment of this application;

FIG. 7 is another schematic diagram of resource pool allocation according to an embodiment of this application;

FIG. 9 is a schematic diagram of a receiving/sending status of a communications apparatus corresponding to resource pool allocation according to an embodiment of this application;

DESCRIPTION OF EMBODIMENTS

Figure 1A:
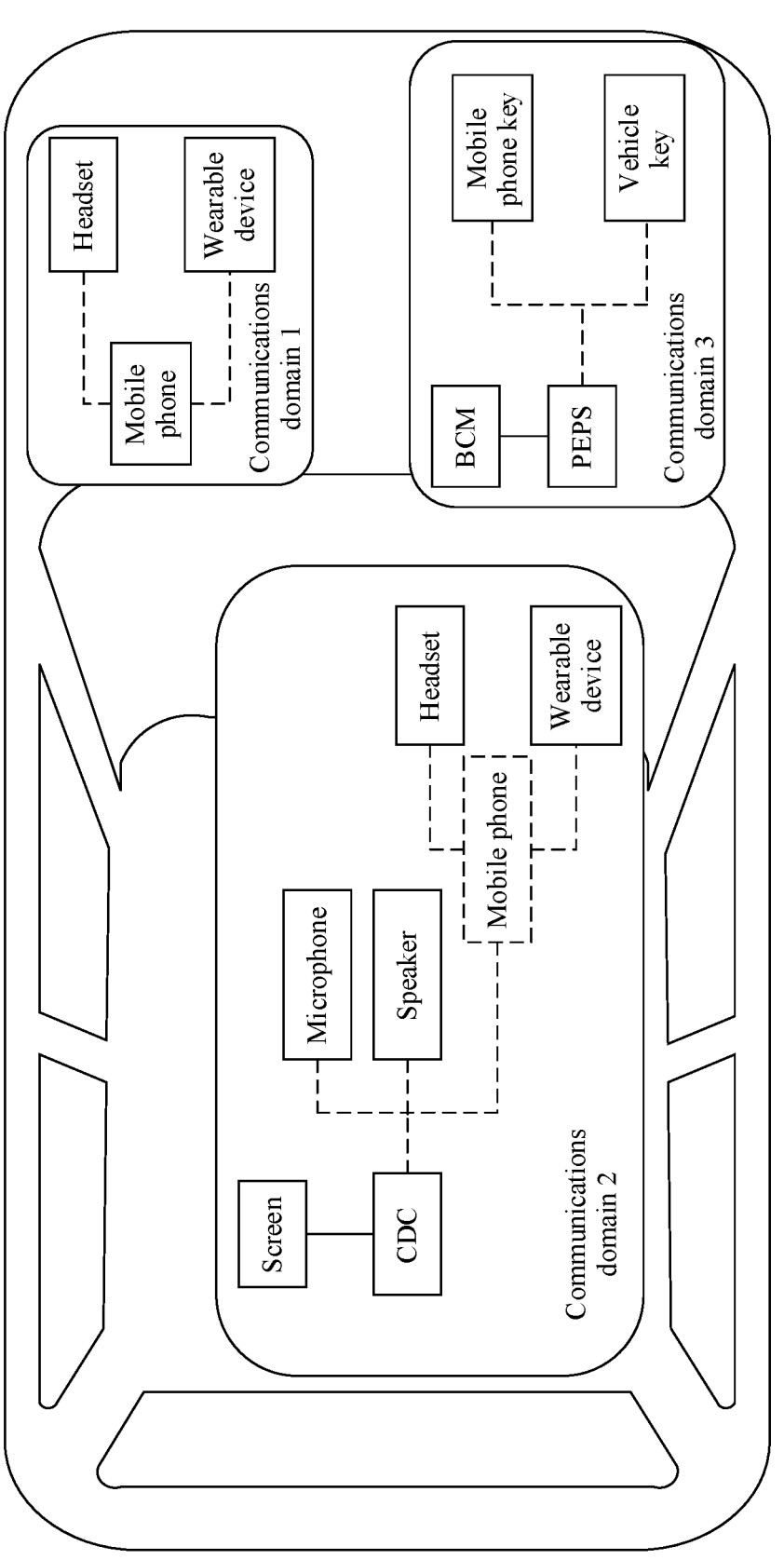
FIG. 1A is a schematic diagram of a topology relationship of an in-vehicle communication link.

In the specification, claims, and accompanying drawings of embodiments of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments of this application described herein can be implemented in an order other than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

For example, a communications apparatus in embodiments of this application may be a vehicle-mounted device such as a head unit, a vehicle-mounted speaker, or a vehicle-mounted microphone, or may be an electronic device such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a virtual reality device. For another example, the communications apparatus in embodiments of this application may alternatively be an intelligent terminal other than a vehicle that has a function that can be implemented by a first communications apparatus, a second communications apparatus, a third communications apparatus, or a fourth communications apparatus in embodiments of this application, or is disposed in the intelligent terminal other than the vehicle that has the function that can be implemented by the first communications apparatus, the second communications apparatus, the third communications apparatus, or the fourth communications apparatus in embodiments of this application, or is disposed in a component of the intelligent terminal. The intelligent terminal may be another terminal device such as an intelligent transportation device, a smart home device, or a robot. The communications apparatus includes but is not limited to an intelligent terminal or a controller in the intelligent terminal, a chip, another sensor such as a radar or a camera, another component, and the like. Alternatively, the communications apparatus in embodiments of this application may be a functional module, for example, a chip system, disposed in any one of the foregoing devices.

The following first describes some terms in embodiments of this application, to help a person skilled in the art have a better understanding.

(1) Cockpit domain controller (cockpit domain controller or control domain cockpit, CDC): The cockpit domain controller is briefly referred to as a head unit. In addition to conventional radio, music time-frequency playback, and navigation functions, the current head unit has cellular communication functions (3G, 4G, and the like), and can implement information communication between the human and a vehicle and between the vehicle and the outside world by using a controller area network (controller area network, CAN) bus (BUS) technology of the vehicle. This enhances user experience, services, and safety-related functions.

(2) Master node and slave node: Two types of nodes are logically classified into the master node and the slave node. The master node manages the slave node, has a resource allocation function, and is responsible for allocating resources to the slave node. The slave node communicates with the master node based on scheduling of the master node by using the resources allocated by the master node. The nodes may be various apparatuses. For example, the master node is a mobile phone, the slave node is a headset. The mobile phone establishes a communication connection to the headset to implement data exchange. The mobile phone manages the headset. The mobile phone has a resource allocation function, and may allocate resources to the headset.

(3) Communications domain: The communications domain is a system including a group of communications nodes that have a communication relationship and a communication connection relationship between the communications nodes. One apparatus or device may be in a plurality of communications domains. For example, when a mobile phone performs wireless communication with a headset, the mobile phone is in a communications domain a including the mobile phone and the headset. In the communications domain a, the mobile phone is a master node, and the headset is a slave node. Then, after the mobile phone detects a CDC and establishes a wireless connection to the CDC, the mobile phone is also in a communications domain b including the mobile phone and the CDC. In the communications domain b, the CDC is a master node, the mobile phone is a slave node, and the mobile phone follows scheduling of the CDC. The communications domain b may further include other slave nodes such as a vehicle-mounted speaker and a microphone.

(4) Terms: The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof means any combination of the following, including any combination of one or more of the following. For example, at least one of a, b, or c may indicate a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, but are not intended to limit sizes, content, sequences, time sequences, priorities, importance, or the like of the plurality of objects. For example, first configuration information and second configuration information are only names given for ease of description, and the two pieces of configuration information may be same configuration information, or may be different configuration information. Names such as "first" and "second" are not intended to indicate that the two pieces of configuration information are different in an amount, content, a sending sequence, a priority, importance, or the like.

The foregoing describes some noun concepts in embodiments of this application. The following describes technical features in embodiments of this application.

Diversified in-vehicle applications lead to increasingly more in-vehicle communications nodes and more types of in-vehicle communications nodes, and impose a higher requirement on an in-vehicle communication capability. Compared with existing wired communication, in-vehicle wireless communication can be further used to reduce a quantity of harnesses, a length of the harness, and a weight of the harness in a vehicle, and corresponding installation or maintenance costs. This makes in-vehicle communications technologies gradually tend to be wireless.

Usually, a topology relationship of an in-vehicle communication link is shown in FIG. 1A. It can be learned from FIG. 1A that there are a plurality of communications domains in a vehicle. One communications domain includes one master node and at least one slave node. The master node schedules the slave node, so that the master node and the slave node transmit service data to each other. For example, in FIG. 1A, a mobile phone, a headset, and a wearable device belong to a communications domain, for example, referred to as a communications domain 1, where the mobile phone is a master node, and the headset and the wearable device are slave nodes; a cockpit domain controller (cockpit domain controller, CDC), a display, a microphone, and a speaker belong to a communications domain, for example, referred to as a communications domain 2, where the CDC is a master node, and the display, the microphone, and the speaker are slave nodes; and a passive entry passive start (passive entry passive start, PEPS) system, a body control module (body control module, BCM), a mobile phone key, and a vehicle key belong to a communications domain, for example, referred to as a communications domain 3, where the PEPS system is a master node, and the BCM, the mobile phone key, and vehicle key are slave nodes. In addition, a master node in a communications domain may also be used as a slave node in another communications domain. For example, the mobile phone in the communications domain 1 may be used as a slave node in the communications domain 2. Alternatively, the communications domain may be defined from a perspective of a resource. For example, a resource that is allocated by a node and that is used by the node to communicate with another node may be referred to as a communications domain. In this case, the node is a master node in the communications domain, and the another node that communicates with the node by using the communications domain (resource) is a slave node in the communications domain.

Information transmitted between the master node and the slave node may include service data, signaling, and some signals (such as a synchronization signal or a reference signal). The service data may include a type such as service data corresponding to a noise reduction service or service data corresponding to a dynamic service, and the signaling may include a type such as physical layer signaling or higher layer signaling.

The noise reduction service is a common service that needs to be supported by vehicle-mounted communication, and the noise reduction service may be performed in the communications domain 2 shown in FIG. 1A. The noise reduction service includes data transmission from the slave node to the master node, for example, the microphone used for noise reduction collects noise data in an environment, and sends the noise data to the CDC; and the noise reduction service further includes data transmission from the master node to the slave node, for example, after receiving the noise data, the CDC may generate data whose amplitude is the same as that of the noise data and whose phase is opposite to that of the noise data, and send the data to the speaker, to implement noise reduction. A service volume of the noise reduction service ranges from several Mbps to dozens of Mbps, or even more. The noise reduction service accounts for a high proportion of a total service volume of vehicle-mounted communication, and needs to be transmitted by using a large quantity of resources. In addition, the noise reduction service further has the following features:

1. A single data packet is very small. For example, valid information may be only 16 bits (bit), 24 bits, or 32 bits.
2. A latency requirement is very high. For example, the latency requirement is approximately 20 microseconds (μs).
3. A period is stable. For example, the period is ¼8 kHz (approximately 20.83 μs).

As described above, there may be a plurality of communications domains in a vehicle. Information transmission is involved in each communications domain, and transmitted information includes, for example, data or control information. Therefore, a corresponding resource needs to be used in each communications domain to support communication. Currently, a resource is independently selected in each communications domain for transmission. Therefore, resources selected in different communications domains may conflict, and consequently transmission cannot be performed in some communications domains. Alternatively, resources selected in different communications domains are multiplexed in frequency domain. As a result, receiving processes of communications apparatuses included in some communications domains may be blocked by a receiving process of another communications apparatus in another communications domain, thereby reducing information receiving quality.

In view of this, the technical solutions in embodiments of this application are provided. In embodiments of this application, a first communications apparatus may indicate a second resource pool, and another communications apparatus can determine, based on the second resource pool, a resource pool to be used by the communications apparatus, to avoid a conflict between resources used by different communications apparatuses, and reduce mutual impact of communication processes of the different communications apparatuses.

A wireless communication scenario to which the technical solutions provided in embodiments of this application are applied may include wireless wide area communication, for example, communication between a plurality of base stations and a plurality of terminal devices, where the base station is used as a master node, and the terminal device is used as a slave node. In this case, the base station allocates resources to the terminal device, and the terminal device follows scheduling of the base station. Alternatively, the wireless communication scenario may include an in-vehicle wireless communication scenario, for example, communication between a CDC and each of a vehicle-mounted speaker, a vehicle-mounted microphone, and a mobile phone, and communication between the mobile phone and a wearable device such as a headset. Alternatively, the wireless communication scenario may include wireless local area communication, for example, communication between a plurality of access points (access point, AP) and a plurality of stations (station).

For example, if the technical solutions provided in embodiments of this application are applied to the in-vehicle wireless communication scenario, a network architecture shown in FIG. 1A may be a network architecture to which embodiments of this application are applied. If the technical solutions provided in embodiments of this application are applied to another wireless wide area communication or wireless local area communication scenario, the network architecture to which embodiments of this application are applied may change accordingly.

Figure 1B:
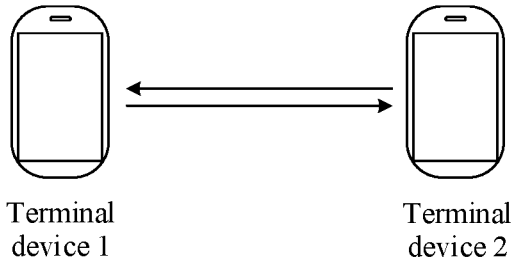
FIG. 1B to FIG. 1D are schematic diagrams of several application scenarios according to an embodiment of this application.

For another example, if the technical solutions provided in embodiments of this application are applied to a V2X communication scenario, FIG. 1B shows an application scenario according to an embodiment of this application. FIG. 1B includes a terminal device 1 and a terminal device 2. The terminal device 1 and the terminal device 2 may communicate with each other through a sidelink (sidelink, SL).

Figure 1C:
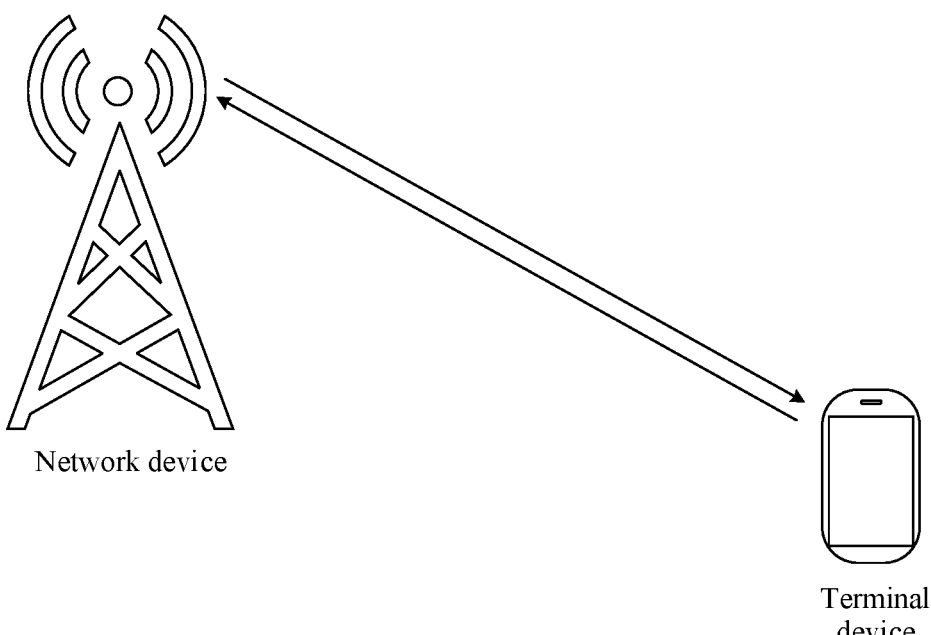

For another example, if the technical solutions provided in embodiments of this application are applied to communication on a Uu interface in an LTE system or an NR system, FIG. 1C shows an application scenario according to an embodiment of this application. FIG. 1C includes a network device and a terminal device. The network device and the terminal device may communicate with each other through the Uu interface.

Figure 1D:
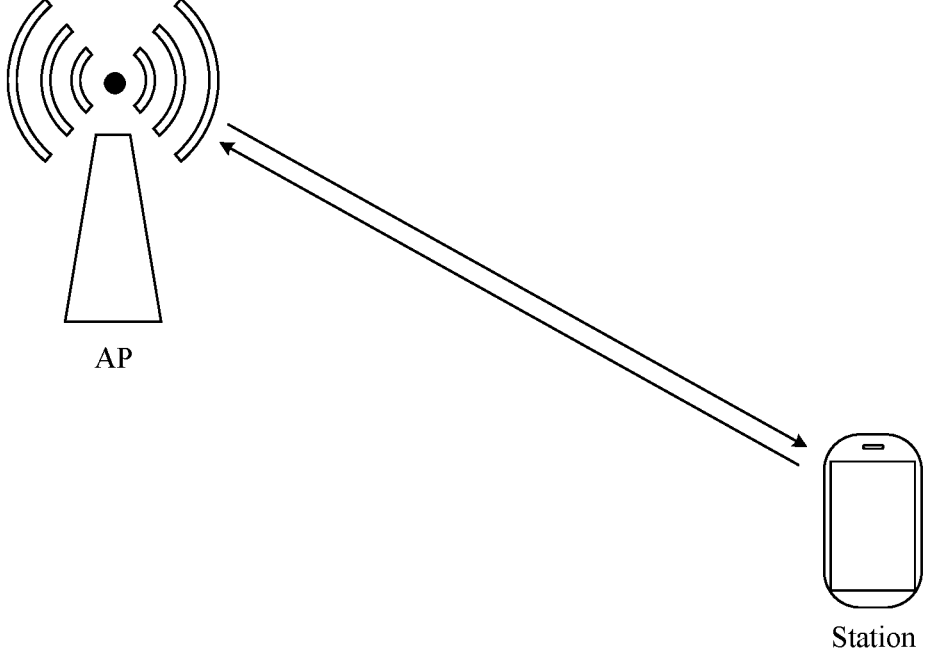

For another example, if the technical solutions provided in embodiments of this application are applied to a wireless fidelity (wireless fidelity, Wi-Fi) scenario, FIG. 1D shows an application scenario according to an embodiment of this application. FIG. 1D includes an access point (access point, AP) and a station (station). The station may access the AP through Wi-Fi. In FIG. 1D, for example, the station is a mobile phone.

In FIG. 1B and FIG. 1C, for example, the terminal device is a mobile phone. The terminal device in embodiments of this application is not limited thereto.

The following describes, with reference to the accompanying drawings, the technical solutions provided in embodiments of this application. It should be noted that, for a communications domain, a master node in the communications domain sends information (for example, data or control information) to a slave node in the communications domain, where the process is considered as a downlink transmission process; and the slave node in the communications domain sends information (for example, data or control information) to the master node in the communications domain, where the process is considered as an uplink transmission process. In addition, a master node in a communications domain having a highest priority sends information (for example, data or control information) to a master node in another communications domain, where the process may also be considered as a downlink transmission process (in this case, the master node in the another communications domain may be considered as joining the communications domain having the highest priority, and is used as a slave node in the communications domain), and the master node in the another communications domain sends information (for example, data or control information) to the master node in the communications domain having the highest priority, where the process may also be considered as an uplink transmission process (in this case, the master node in the another communications domain may also be considered as joining the communications domain having the highest priority, and is used as a slave node in the communications domain).

In addition, a "time subunit" in embodiments of this application is, for example, a radio frame (frame), a subframe (subframe), or a slot (slot). A "time unit" in embodiments of this application is, for example, a superframe (superframe), a half superframe, or a ⅓ superframe, or may be considered to include an integer quantity of radio frames. It may be understood that one time unit includes one or more time subunits. For example, one superframe may include 48 radio frames. A "frequency domain unit" in embodiments of this application is, for example, a component carrier (component carrier, CC), or may be a subcarrier group, a subband, a bandwidth part (bandwidth part, BWP) BWP, a frequency domain resource block (resource block, RB), or the like. In embodiments of this application, a "time domain symbol" is briefly referred to as a "symbol", and may be a minimum unit in time domain.

In addition, in the accompanying drawings provided in embodiments of this application, a symbol G indicates downlink transmission, and a symbol T indicates uplink transmission. This is merely an example. Alternatively, a symbol U indicates uplink transmission, and a symbol D indicates downlink transmission.

Figure 2:
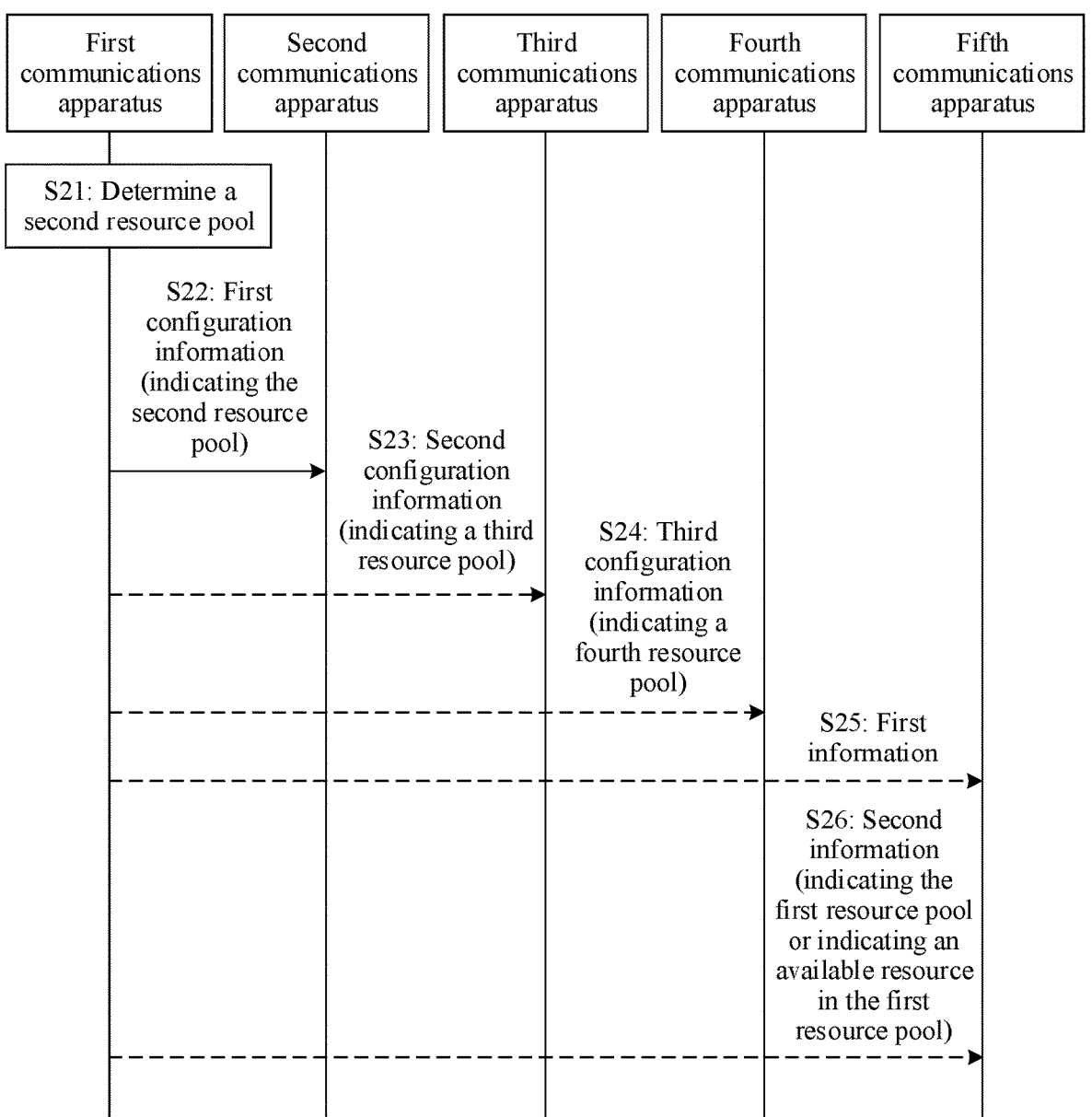
FIG. 2 is a flowchart of a communications method according to an embodiment of this application.

An embodiment of this application provides a communications method. FIG. 2 is a flowchart of the method. The method may be applied to the network architecture shown in any one of FIG. 1A to FIG. 1D.

For ease of description, in the following descriptions, for example, the method is performed by a first communications apparatus, a second communications apparatus, a third communications apparatus, and a fourth communications apparatus. If this embodiment of this application is applied to the network architecture shown in FIG. 1A, the first communications apparatus described below may be a master node in one communications domain shown in FIG. 1A. The communications domain is, for example, configured to manage another communications domain in a vehicle. In other words, the communications domain may be a communications domain having a highest priority in the vehicle. The communications domain is, for example, the communications domain 2 shown in FIG. 1A, or may be another communications domain. If the communications domain is the communications domain 2, the first communications apparatus is the CDC in the communications domain 2. Alternatively, the first communications apparatus may be a master node in another communications domain shown in FIG. 1A. Alternatively, the first communications apparatus may be a chip system disposed in any master node in any communications domain shown in FIG. 1A. The second communications apparatus, the third communications apparatus, and the fourth communications apparatus may be three master nodes in three communications domains shown in FIG. 1A other than the communications domain in which the first communications apparatus is located. Alternatively, if this embodiment of this application is applied to the network architecture shown in FIG. 1B, the first communications apparatus described below may be the terminal device 1 shown in FIG. 1B, the second communications apparatus may be the terminal device 2 shown in FIG. 1B, and the third communications apparatus and the fourth communications apparatus may be two other terminal devices that can communicate with the terminal device 1, and are not shown in FIG. 1B. Alternatively, if this embodiment of this application is applied to the network architecture shown in FIG. 1C, the first communications apparatus described below may be the network device shown in FIG. 1C, the second communications apparatus may be the terminal device shown in FIG. 1C, and the third communications apparatus and the fourth communications apparatus may be two other terminal devices that can communicate with the network device, and are not shown in FIG. 1C. Alternatively, if this embodiment of this application is applied to the network architecture shown in FIG. 1D, the first communications apparatus described below may be the AP shown in FIG. 1D, the second communications apparatus may be the station shown in FIG. 1D, and the third communications apparatus and the fourth communications apparatus may be two other stations that can communicate with the AP, and are not shown in FIG. 1D.

In the following description process, for example, this embodiment of this application is applied to the network architecture shown in FIG. 1A, and the first communications apparatus is a master node in a communications domain having a highest priority in a vehicle. For example, the communications domain having the highest priority is referred to as a first communications domain.

S21: The first communications apparatus determines a second resource pool.

For example, the second resource pool may be allocated by the first communications apparatus to the second communications apparatus, and the second resource pool may be managed by the second communications apparatus and used by the second communications apparatus to communicate with another communications apparatus. That the second resource pool is managed by the second communications apparatus may mean that the second communications apparatus may allocate a resource in the second resource pool to another communications apparatus, so that the second communications apparatus and the another communications apparatus can communicate with each other by using the allocated resource.

For example, this embodiment of this application is applied to the architecture shown in FIG. 1A. In this case, for example, the first communications apparatus is a master node in a communications domain having a highest priority (for example, referred to as a first communications domain) in a vehicle. For example, if the first communications domain is the communications domain 2 shown in FIG. 1A, the first communications apparatus may be the CDC. The second communications apparatus may be a master node in a communications domain other than the first communications domain in the vehicle. For example, the communications domain in which the second communications apparatus is located is referred to as a second communications domain, and the second communications domain is, for example, the communications domain 3 shown in FIG. 1A. In this case, the second resource pool may be used by the second communications apparatus to communicate with a communications apparatus other than the second communications apparatus in the second communications domain. The communications apparatus other than the second communications apparatus in the second communications domain that is described herein may include all or some communications apparatuses other than the second communications apparatus in the second communications domain. For example, if the second communications apparatus is a master node in the second communications domain, all communications apparatuses other than the second communications apparatus in the second communications domain are slave nodes in the second communications domain.

It may be understood that the first communications apparatus may configure a resource pool for each of all or some communications domains other than the first communications domain in the vehicle for communication in these communications domains. That is, in this embodiment of this application, the first communications apparatus allocates a resource pool to another communications apparatus (or a communications domain), so that the first communications apparatus can uniformly allocate a resource pool to all communications apparatuses. In this case, the first communications apparatus may configure the resource pool when allocating the resource pool to all the communications apparatuses, to reduce as much as possible a probability that resources included in resource pools of different communications domains conflict with each other, and reduce as much as possible a probability that a receiving process of one communications apparatus is affected by another communications apparatus, so as to improve information receiving quality.

In an optional implementation, the second resource pool may include a first resource subpool, or include a second resource subpool, or include a first resource subpool and a second resource subpool. The first resource subpool may be used by the second communications apparatus to transmit data to a communications apparatus other than the second communications apparatus in the second communications domain, and the second resource subpool may be used by the second communications apparatus to transmit a signal or signaling to a communications apparatus other than the second communications apparatus in the second communications domain. Alternatively, it is understood that the first resource subpool includes a resource used to perform data communication, and the second resource subpool includes a resource used to transmit control information. The first resource subpool and the second resource subpool may be two independent resource pools, or the first resource subpool and the second resource subpool may be two parts included in one resource pool (for example, the second resource pool).

For example, the signaling or the signal may include one or more of the following information sent by a master node in a communications domain: a synchronization signal, acknowledgment feedback information/negative acknowledgment feedback information, a broadcast message, a system message, physical layer control signaling, higher layer signaling, a demodulation reference signal, a phase tracking reference signal, a positioning reference signal, or a channel state information reference signal. For example, the signaling or the signal includes the synchronization signal sent by the master node in the communications domain, or the signaling or the signal includes the acknowledgment feedback information/negative acknowledgment feedback information and the synchronization signal that are sent by the master node in the communications domain, or the signaling or the signal includes the synchronization signal, the acknowledgment feedback information/negative acknowledgment feedback information, the broadcast message, the system message, the physical layer control signaling, the higher layer signaling, the demodulation reference signal, the phase tracking reference signal, the positioning reference signal, and the channel state information reference signal that are sent by the master node in the communications domain.

Alternatively, the signaling or the signal may include one or more of the following information received by a master node in a communications domain: access request signaling or an access request signal, scheduling request signaling or a scheduling request signal, acknowledgment feedback information/negative acknowledgment feedback information, channel feedback information, physical layer control signaling, higher layer signaling, a demodulation reference signal, a phase tracking reference signal, a positioning reference signal, or a channel sounding reference signal. For example, the signaling or the signal includes the access request signaling or signal received by the master node in the communications domain, or the signaling or the signal includes the scheduling request signaling or signal and the acknowledgment feedback information/negative acknowledgment feedback information that are received by the master node in the communications domain, or the signaling or the signal includes the access request signaling or signal, the scheduling request signaling or signal, the acknowledgment feedback information/negative acknowledgment feedback information, the channel feedback information, the physical layer control signaling, the higher layer signaling, the demodulation reference signal, the phase tracking reference signal, the positioning reference signal, and the channel sounding reference signals that are received by the master node in the communications domain.

Alternatively, the signaling or the signal may include one or more of the following information: a synchronization signal sent by a master node in a communications domain, acknowledgment feedback information/negative acknowledgment feedback information sent by a master node in a communications domain, a broadcast message sent by a master node in a communications domain, a system message sent by a master node in a communications domain, physical layer control signaling sent by a master node in a communications domain, higher layer signaling sent by a master node in a communications domain, a demodulation reference signal sent by a master node in a communications domain, a phase tracking reference signal sent by a master node in a communications domain, a positioning reference signal sent by a master node in a communications domain, a channel state information reference signal sent by a master node in a communications domain, access request signaling or an access request signal received by a master node in a communications domain, scheduling request signaling or a scheduling request signal received by a master node in a communications domain, acknowledgment feedback information/negative acknowledgment feedback information received by a master node in a communications domain, channel feedback information received by a master node in a communications domain, physical layer control signaling received by a master node in a communications domain, higher layer signaling received by a master node in a communications domain, a demodulation reference signal received by a master node in a communications domain, a phase tracking reference signal received by a master node in a communications domain, a positioning reference signal received by a master node in a communications domain, or a channel sounding reference signal received by a master node in a communications domain.

Alternatively, the second resource pool may be a reserved resource pool. For example, the reserved resource pool may be used in a communications domain to which a resource pool is not allocated, so that a conflict between a communication resource of the communications domain to which the resource pool is not allocated and a communication resource of the first communications domain can be avoided, mutual impact of communication processes of the two communications domains can be reduced or avoided, and communication quality can be improved. For example, some communications domains may have just joined a network in the vehicle, and the first communications apparatus may not know existence of the communications domain, or may not allocate a resource to the communications domain in a timely manner. In this case, a master node in the communications domain can also learn of the reserved resource pool, so that a resource in the reserved resource pool can be used for communication between the master node and each slave node in the communications domain. Optionally, the master node in the communications domain may also communicate with the first communications apparatus by using a resource in the reserved resource pool. For example, the master node in the communications domain may send a request message to the first communications apparatus by using a resource included in the reserved resource pool, to request the first communications apparatus to allocate a resource to the communications domain, so that the first communications apparatus can allocate the resource to the communications domain. For another example, the master node in the communications domain may send a message to the first communications apparatus by using a resource included in the reserved resource pool, to notify the first communications apparatus that the communications domain has joined the network in the vehicle, so that the first communications apparatus can allocate a resource to the communications domain.

Alternatively, the second resource pool may not be specifically provided for the second communications domain. For example, the first communications apparatus may determine the second resource pool based on the first resource pool. The second resource pool may include another resource outside the first resource pool. In other words, the second resource pool may include a resource that is unavailable to the first communications domain. The first resource pool is managed by the first communications apparatus, and the first resource pool may be used by the first communications apparatus to communicate with another communications apparatus. It may be understood that the first resource pool is a resource pool used in the first communications domain. For example, if master nodes in all or some communications domains in a vehicle may broadcast an unavailable resource (or an unavailable resource pool) for the communications domain, a master node that receives resources broadcast by a master node in another communications domain can select, based on the resources broadcast by the master node in the another communications domain, resources that can be used by the master node, for example, may select some or all resources from the resources as the resources to be used by the master node. Therefore, if the first communications apparatus broadcasts the second resource pool, after learning of the second resource pool, the master node in the another communications domain may obtain a resource pool of the communications domain based on the second resource pool. For example, if the second communications apparatus receives information about the second resource pool broadcast by the first communications apparatus, the second communications apparatus may obtain a resource pool of the second communications domain based on the second resource pool. For example, the second communications apparatus may select some or all resources from the second resource pool as the resource pool of the second communications domain. In the following description process, a solution in which the second resource pool is a resource pool specifically provided for the second communications domain (that is, the second resource pool is a resource pool configured by the first communications apparatus for the second communications domain) is mainly used as an example.

In addition to configuring a resource pool for another communications apparatus, the first communications apparatus may further configure a resource pool for the first communications apparatus. For example, a resource pool configured by the first communications apparatus for the first communications apparatus is referred to as the first resource pool. For example, this embodiment of this application is applied to the architecture shown in FIG. 1A. The first communications apparatus is a master node in the first communications domain. In this case, it may also be considered that the first resource pool is configured for the first communications domain, and the first resource pool may be used by the first communications apparatus to communicate with a communications apparatus other than the first communications apparatus in the first communications domain. The communications apparatus other than the first communications apparatus in the first communications domain that is described herein may include all or some communications apparatuses other than the first communications apparatus in the first communications domain. For example, if the first communications apparatus is a master node in the first communications domain, all communications apparatuses other than the first communications apparatus in the first communications domain are slave nodes in the first communications domain. In addition, the first resource pool may be further used by the first communications apparatus to communicate with a master node in a communications domain other than the first communications domain in the vehicle. For example, if the first communications apparatus needs to communicate with the second communications apparatus, a resource in the first resource pool may be used. In this case, it may be considered that the second communications apparatus joins the first communications domain, serves as a slave node in the first communications domain, and therefore communicates with the master node in the first communications domain by using the resource in the first resource pool.

The first resource pool may be completely different from the second resource pool. For example, the first resource pool and the second resource pool may have no intersection. Alternatively, the first resource pool may not be completely the same as the second resource pool. For example, the first resource pool and the second resource pool may have an intersection, but parts of the first resource pool and the second resource pool other than the intersection are different.

In an optional implementation, the first resource pool may include a third resource subpool, or include a fourth resource subpool, or include a third resource subpool and a fourth resource subpool. The third resource subpool may be used by the first communications apparatus to transmit data to a communications apparatus other than the first communications apparatus in the first communications domain, and the fourth resource subpool may be used by the first communications apparatus to transmit a signal or signaling to a communications apparatus other than the first communications apparatus in the first communications domain. Alternatively, it is understood that the third resource subpool includes a resource used to perform data communication, and the fourth resource subpool includes a resource used to transmit control information. The third resource subpool and the fourth resource subpool may be two independent resource pools, or the third resource subpool and the fourth resource subpool may be two parts included in one resource pool (for example, the first resource pool).

For example, all communications apparatuses included in the first communications domain are vehicle-mounted apparatuses (or referred to as pre-installed apparatuses). For example, the first communications domain is the communications domain 2 shown in FIG. 1A. The vehicle-mounted apparatus in embodiments of this application may include an apparatus whose location is fixed before a vehicle is delivered from a factory, for example, a CDC of the vehicle. A location of the CDC is fixed in the vehicle before the vehicle is delivered from the factory, and usually does not change. All communications apparatuses included in the second communications domain are, for example, non-vehicle-mounted apparatuses (or referred to as post-installed apparatuses). For example, the second communications domain is the communications domain 1 shown in FIG. 1A. The non-vehicle-mounted apparatus in embodiments of this application may include an apparatus whose location is variable in a vehicle, for example, an apparatus such as a mobile phone or a headset of a user. A location is not fixed and may change at any time. In addition, the non-vehicle-mounted apparatus in embodiments of this application may further include apparatuses installed in the vehicle after the vehicle is delivered from the factory, for example, some apparatuses installed when the vehicle is modified. Although locations of these apparatuses in the vehicle may also be fixed, in embodiments of this application, these apparatuses are also classified as non-vehicle-mounted apparatuses.

Currently, to save resources, resources may be multiplexed in different communications domains in a frequency division manner. For example, resources may be multiplexed in the first communications domain and the second communications domain in a frequency division multiplexing manner. However, if a distance between devices included in two communications domains is short, a blocking phenomenon occurs when resources are multiplexed in a frequency division manner. For example, a communications apparatus 1 in the first communications domain sends information 1 to a communications apparatus 2 in the first communications domain, and a communications apparatus 3 in the second communications domain sends information 2 to a communications apparatus 4 in the second communications domain. Although frequency domain resources for sending the two pieces of information are frequency-division multiplexed, a receiver of the communications apparatus may not be sufficiently flexible, and can perform receiving on only a high frequency band. For example, the information 1 is sent on a frequency band 1, the information 2 is sent on a frequency band 2, the communications apparatus 4 can perform receiving on only a frequency band 3, and the frequency band 3 includes the frequency band 1 and the frequency band 2. In this case, the communications apparatus 4 needs to receive the information 1 and the information 2, and then further identify which information is sent to the communications apparatus 4. If a distance between the communications apparatus 2 and the communications apparatus 4 is short, power of the information 1 is high, and power of the information 2 is low, receiving of the information 2 by the communications apparatus 4 is affected. For example, after the communications apparatus 4 receives the information 1 and the information 2, quantization precision of the information 2 may be too low because received power of the information 2 is too low. As a result, quantization noise is too high and a signal-to-noise ratio of the received information 2 is too low, or even a receiver of the communications apparatus 4 may be saturated because the power of the information 1 is too high. Consequently, no information can be received within a sending time period of the information 1. Receiving of the information is affected, that is, a blocking phenomenon occurs.

To reduce a probability that a blocking phenomenon occurs in information receiving processes in the first communications domain and the second communications domain, in this embodiment of this application, the first resource pool and the second resource pool may be time-division multiplexed. In a time division multiplexing manner, transmit end apparatuses in the two communications domains do not send information at a same time point, and therefore receive end apparatuses in the two communications domains do not receive information at a same time point, so that blocking can be reduced. Further, optionally, to reduce a transmission latency, in this embodiment of this application, the first resource pool and the second resource pool may be time-division multiplexed in one time subunit, so that a transmission latency of a service is less than one time subunit, to meet a requirement for a service (for example, a noise reduction service) having a high latency requirement.

For example, the first resource pool includes a first time-frequency resource, the first time-frequency resource includes a first time domain resource in time domain (for example, the first time-frequency resource includes only the first time domain resource in time domain and does not include another time domain resource, or the first time-frequency resource may further include another time domain resource in time domain in addition to the first time domain resource), and the first time-frequency resource includes a first frequency domain resource in frequency domain (for example, the first time-frequency resource includes only the first frequency domain resource in time domain and does not include another frequency domain resource, or the first time-frequency resource may further include another frequency domain resource in time domain in addition to the first frequency domain resource). In addition, the second resource pool may include a second time-frequency resource, the second time-frequency resource includes a second time domain resource in time domain (for example, the second time-frequency resource includes only the second time domain resource in time domain and does not include another time domain resource, or the second time-frequency resource may further include another time domain resource in time domain in addition to the second time domain resource), and the second time-frequency resource includes a first frequency domain resource in frequency domain (for example, the second time-frequency resource includes only the first frequency domain resource in time domain and does not include another frequency domain resource, or the second time-frequency resource may further include another frequency domain resource in time domain in addition to the first frequency domain resource). In other words, frequency domain resources included in the first time-frequency resource and the second time-frequency resource are the same. For example, the first time-frequency resource and the second time-frequency resource are located in one time subunit in time domain, for example, located in a first time subunit. In this way, the first time domain resource and the second time domain resource are time-division multiplexed in one time subunit. For example, the first time subunit may sequentially include the first time domain resource and the second time domain resource in time domain, or the first time subunit may sequentially include the second time domain resource and the first time domain resource in time domain.

In this way, if the first time domain resource is used to transmit information in the first communications domain, and the second time domain resource is used to transmit information in the second communications domain, because the first time domain resource and the second time domain resource are time-division multiplexed, a blocking phenomenon does not occur. In addition, because the first time domain resource and the second time domain resource are time-division multiplexed in the first time subunit, it can be ensured that both a latency of a service transmitted by using the first time domain resource and a latency of a service transmitted by using the second time domain resource are within a time subunit, so that a requirement for a service having a high latency requirement can be met.

The first time subunit may include two guard periods (guard period, GP), for example, referred to as a first GP and a second GP. The first GP is located before the second GP in time domain. Because the first time domain resource and the second time domain resource are time-division multiplexed in the first time subunit, the first GP may be considered as belonging to the first time domain resource, and the second GP may be considered as belonging to the second time domain resource. In addition, the second GP may not occupy a last symbol in the first time subunit. In other words, the first time subunit further includes one or more symbols after the second GP. Currently, only one communications domain is considered. For a structure of a designed radio frame, refer to FIG. 3. A symbol G is used to transmit downlink data, a symbol T is used to transmit uplink data, and a GP represents a guard period and is not used to transmit information. In addition, S+GP represents a symbol S and a GP. If the symbol S is used for downlink transmission, the symbol S is located on a side on which a symbol G on one of front and back sides of the GP is located (for example, in FIG. 3, if the symbol S is used for downlink transmission, the symbol S is located before the GP). Alternatively, if the symbol S is used for uplink transmission, the symbol S is located on a side on which a symbol T on one of front and back sides of the GP is located (for example, in FIG. 3, if the symbol S is used for uplink transmission, the symbol S is located after the GP). It can be learned that, in a current radio frame, a last GP occupies a last symbol of the radio frame. In other words, in the current radio frame, there is no other symbol after the last GP. In this embodiment of this application, because resource pools of two communications domains need to be time-division multiplexed in one time subunit, a GP that originally occupies a last symbol of the time subunit may be moved to the front, so that the GP no longer occupies the last symbol of the time subunit. In this case, the last symbol of the time subunit can be further used for uplink transmission or downlink transmission.

For example, the first time domain resource may include a first time domain sub-resource and a second time domain sub-resource, the first time domain sub-resource is located before and adjacent to the first GP in time domain, and the second time domain sub-resource is located after and adjacent to the first GP in time domain, that is, the first time domain resource sequentially includes the first time domain sub-resource, the first GP, and the second time domain sub-resource in time domain. The first time domain sub-resource may include one or more symbols, the second time domain sub-resource may include one or more symbols, and a time domain length of the first time domain sub-resource may be the same as or different from a time domain length of the second time domain sub-resource. Similarly, the second time domain resource may include a third time domain sub-resource and a fourth time domain sub-resource, the third time domain sub-resource is located before and adjacent to the second GP in time domain, and the fourth time domain sub-resource is located after and adjacent to the second GP in time domain, that is, the second time domain resource sequentially includes the third time domain sub-resource, the second GP, and the fourth time domain sub-resource in time domain. The third time domain sub-resource may include one or more symbols, the fourth time domain sub-resource may include one or more symbols, and a time domain length of the third time domain sub-resource may be the same as or different from a time domain length of the fourth time domain sub-resource.

The first time domain sub-resource is used to map a signal from the first communications apparatus (that is, the first time domain sub-resource is used for downlink transmission), and the second time sub-domain resource is used to map a signal sent to the first communications apparatus (that is, the second time domain sub-resource is used for uplink transmission). Alternatively, the first time domain sub-resource is used to map a signal sent to the first communications apparatus, and the second time domain sub-resource is used to map a signal from the first communications apparatus. The third time domain sub-resource is used to map a signal from the second communications apparatus (that is, the third time domain sub-resource is used for downlink transmission), and the fourth time domain sub-resource is used to map a signal sent to the second communications apparatus (that is, the fourth time domain sub-resource is used for downlink transmission). Alternatively, the third time domain sub-resource is used to map a signal sent to the second communications apparatus, and the fourth time domain sub-resource is used to map a signal from the second communications apparatus.

It can be learned that, in this embodiment of this application, a GP that originally occupies a last symbol in a time subunit is moved to the front, and the time subunit may be divided into two parts between two GPs in the time subunit. The two parts respectively belong to the first time domain resource and the second time domain resource. The first time domain resource includes the first GP, and (the first time domain resource includes both a symbol (the first time domain sub-resource) located before the first GP and a symbol (the second time domain sub-resource) located after the first GP. For example, the first time domain sub-resource may be used for uplink transmission and the second time domain sub-resource is used for downlink transmission, or the first time domain sub-resource may be used for downlink transmission and the second time domain sub-resource is used for uplink transmission, that is, based on the first GP, the first time domain resource can implement both uplink transmission and downlink transmission, to meet a communication requirement in the first communications domain. In addition, the first GP separates uplink and downlink transmission, and may be used by the apparatus in the first communications domain to perform receiving/sending conversion. Similarly, the second time domain resource includes the second GP, and the second time domain resource includes both a symbol (the third time domain sub-resource) located before the second GP and a symbol (the fourth time domain sub-resource) located after the second GP. For example, the third time domain sub-resource may be used for uplink transmission and the fourth time domain sub-resource is used for downlink transmission, or the third time domain sub-resource may be used for downlink transmission and the fourth time domain sub-resource is used for uplink transmission, that is, based on the second GP, the second time domain resource can implement both uplink transmission and downlink transmission, to meet a communication requirement in the second communications domain. In addition, the second GP separates uplink and downlink transmission, and may be used by the apparatus in the second communications domain to perform receiving/sending conversion.

Optionally, transmission directions corresponding to the first time domain sub-resource and the third time domain sub-resource are the same (for example, both are uplink transmission or both are downlink transmission), or transmission directions corresponding to the second time domain sub-resource and the fourth time domain sub-resource are the same (for example, both are uplink transmission or both are downlink transmission), or transmission directions corresponding to the first time domain sub-resource and the third time domain sub-resource are the same, and transmission directions corresponding to the second time domain sub-resource and the fourth time domain sub-resource are the same. In other words, transmission manners of the first time domain resource and the second time domain resource each may be uplink first and then downlink, or each may be downlink first and then uplink, so that scheduling is easier.

For example, FIG. 4 is a schematic diagram of a structure of a first time subunit according to an embodiment of this application. In FIG. 4, for example, a first time domain sub-resource is used for downlink transmission, a second time domain sub-resource is used for uplink transmission, a third time domain sub-resource is used for downlink transmission, a fourth time domain sub-resource is used for uplink transmission, and the first time subunit is a radio frame. S+GP in FIG. 4 represents a symbol S and a GP. In FIG. 4, three symbols G located before the $1^{st}$ GP and a symbol T that is located after the $1^{st}$ GP and that is adjacent to the $1^{st}$ GP all belong to the first time domain sub-resource, and the $1^{st}$ symbol S that is earlier in time domain also belongs to the first time domain sub-resource. One symbol G located before the $2^{nd}$ GP and a symbol T that is located after the $2^{nd}$ GP and that is adjacent to the $2^{nd}$ GP all belong to the second time domain sub-resource, and the $2^{nd}$ symbol S that is later in time domain also belongs to the second time domain sub-resource. S+GP represents a symbol S and a GP. If the symbol S is used for downlink transmission, the symbol S is located on a side on which a symbol G on one of front and back sides of the GP is located (for example, in FIG. 4, if the symbol S is used for downlink transmission, the symbol S is located before the GP). Alternatively, if the symbol S is used for uplink transmission, the symbol S is located on a side on which a symbol T on one of front and back sides of the GP is located (for example, in FIG. 4, if the symbol S is used for uplink transmission, the symbol S is located after the GP).

In this embodiment of this application, the symbol S may be used to transmit control signaling or a control signal. For example, when the symbol S is used to transmit downlink control signaling or a downlink control signal, the symbol S may also be referred to as an SD symbol, or when the symbol S is used to transmit uplink control signaling or an uplink control signal, the symbol S may also be referred to as an SU symbol. In FIG. 4, for example, the first time subunit includes a symbol S. Alternatively, a time subunit (for example, the first time subunit) in this embodiment of this application may not include a symbol S. In this case, the symbol S may be replaced with a symbol G and/or a symbol U. In addition, if the time subunit includes a symbol S, a quantity of symbols S, a location of the symbol S, and the like in FIG. 4 are examples. The quantity of symbols S included in the time subunit, the location of the symbol S included in the time subunit, or the like is not limited in this embodiment of this application.

For example, the first communications domain is the communications domain 2 shown in FIG. 1A, that is, the first communications apparatus is the CDC. The communications domain 2 usually has a large service volume, and may require a large quantity of resources for service data transmission. Therefore, in an optional implementation, in this embodiment of this application, a resource pool used in the first communications domain may be further extended. It may be understood that the first resource pool can include more resources, so that a communication requirement in the first communications domain can be met. For example, if the first resource pool and the second resource pool are time-division multiplexed in one time subunit, for one time subunit, some resources in the time subunit need to be allocated to the second resource pool. For example, the first resource pool further includes a second time subunit, and some resources in the second time subunit may be originally allocated to the second resource pool or another resource pool. However, in this embodiment of this application, the resources that may be originally allocated to the second resource pool or the another resource pool in the second time subunit may also be allocated to the first resource pool. For example, a resource that may be originally allocated to a communications domain including a non-vehicle-mounted apparatus in the second time subunit may be allocated to the first communications domain, that is, the resource that may be originally allocated to the communications domain including the non-vehicle-mounted apparatus may be extended to the first communications domain. The resource extended to the first communications domain may include a resource used to transmit data. For example, a corresponding resource in a time subunit in one or more frequency domain units may be extended to the first resource pool. For example, the first resource pool may be extended on all frequency domain units corresponding to the first resource pool, or the first resource pool may be extended on some frequency domain units corresponding to the first resource pool.

For example, the second time subunit may include a fifth time domain resource, a third GP, a sixth time domain resource, a fourth GP, and a seventh time domain resource. A sequence from front to back in time domain is as follows:

the fifth time domain resource→the third GP→the sixth time domain resource→the fourth GP→the seventh time domain resource. The fifth time domain resource may include one or more symbols, the sixth time domain resource may include one or more symbols, and the seventh time domain unit may include one or more symbols. It may be understood that lengths of the fifth time domain resource, the sixth time domain resource, and the seventh time domain resource are all greater than 0. For example, a transmission direction of the fifth time domain resource may be the same as a transmission direction of the seventh time domain resource, and the transmission direction of the fifth time domain resource may be opposite to a transmission direction of the sixth time domain resource. For example, both the fifth time domain resource and the seventh time domain resource are used for uplink transmission, and the sixth time domain resource is used for downlink transmission, or both the fifth time domain resource and the seventh time domain resource are used for downlink transmission, and the sixth time domain resource is used for uplink transmission. In this manner, both uplink transmission and downlink transmission can be implemented in the first communications domain in the second time subunit, and a GP exists between uplink and downlink transmission, so that the apparatus in the first communications domain performs receiving/sending conversion. In addition, for example, a third time subunit adjacent to the second time subunit in time domain further exists after the second time subunit. In this case, the third time subunit also includes three time domain resources, and transmission directions of the three time domain resources correspond to the transmission directions of the fifth time domain resource, the sixth time domain resource, and the seventh time domain resource. In this way, a transmission direction of a time domain resource that is ranked first in time domain in the three time domain resources is the same as the transmission direction of the seventh time domain resource, so that the apparatus in the first communications domain does not need to perform receiving/sending conversion when crossing a boundary of a time subunit, to avoid a requirement for a GP generated during receiving/sending conversion.

For example, FIG. 5 is a schematic diagram of a structure of a second time subunit according to an embodiment of this application. In FIG. 5, three symbols G located before the $1^{st}$ GP belong to a fifth time domain resource, two symbols T located between two GPs belong to a sixth time domain resource, and one symbol G located after the $2^{nd}$ GP belongs to a seventh time domain resource. S+GP represents a symbol S and a GP. If the symbol S is used for downlink transmission, the symbol S is located on a side on which a symbol G on one of front and back sides of the GP is located (for example, in FIG. 5, if the symbol S is used for downlink transmission, the symbol S is located before the GP, and in this case, the symbol S belongs to the fifth time domain resource). Alternatively, if the symbol S is used for uplink transmission, the symbol S is located on a side on which a symbol T on one of front and back sides of the GP is located (for example, in FIG. 5, if the symbol S is used for uplink transmission, the symbol S is located after the GP, and in this case, the symbol S belongs to the sixth time domain resource). For example, in FIG. 5, a symbol T that is located before the $2^{nd}$ GP and that is adjacent to the $2^{nd}$ GP and a symbol G located after the $2^{nd}$ GP are extended resources. Based on the example in FIG. 5, the sixth time domain resource includes the extended resource. In this case, the sixth time domain resource originally includes boundaries of two resource pools (for example, if the extended resource is allocated to the second resource pool or another resource pool, the sixth time domain resource may include the boundaries of the two resource pools). Because transmission directions of the sixth time domain resource are the same, that is, a transmission direction of the extended resource included in the sixth time domain resource is the same as a transmission direction of a resource that originally belongs to the first resource pool and that is included in the sixth time domain resource, the first communications apparatus and another communications apparatus (for example, the second communications apparatus) do not need to perform receiving/sending conversion when crossing a boundary of a resource pool, to avoid a requirement for a GP generated during additional receiving/sending conversion.

In addition, the extended resource included in the first resource pool occupies a resource in another resource pool. In this case, the extended resource and the resource in the another resource pool are frequency-division multiplexed, but are not time-division multiplexed. Therefore, a risk of blocking may exist. In view of this, the extended resource included in the first resource pool in this embodiment of this application may be used as much as possible to transmit a service that has a low latency requirement or a low reliability requirement, to reduce impact of a blocking phenomenon on service transmission.

In this embodiment of this application, one time subunit may include only two GPs, so that GP overheads can be reduced.

In this embodiment of this application, structures of time subunits in different time units in a same frequency domain unit corresponding to the first resource pool may be different. For example, time subunits in some time units are in a time division multiplexing structure, and time subunits in some time units are in an extended resource structure. In this way, resources included in the first resource pool are more abundant, and a plurality of requirements can be met.

Alternatively, in this embodiment of this application, structures of time subunits in different frequency domain units may be different. For example, time subunits in some frequency domain units are of a time division multiplexing structure, and time subunits in some frequency domain units are of an extended resource structure. For example, a first frequency domain unit and a second frequency domain unit may be different frequency domain units. In this case, a first time subunit and a second time subunit may belong to different time units, or may belong to a same time unit.

In the foregoing manner, configuration of the first resource pool in this embodiment of this application can be more flexible.

In addition, in an optional implementation, GPs included in the first time subunit and the second time subunit may be aligned. That GPs in two time subunits are aligned means that time domain lengths of the GPs in the two time subunits are the same, and time domain boundaries of the GPs in the two time subunits are the same. For example, a GP included in the first time subunit and a GP included in the second time subunit may meet the following: The first GP included in the first time subunit and the third GP included in the second time subunit are aligned in time domain. Alternatively, the second GP included in the first time subunit and the fourth GP included in the second time subunit are aligned in time domain. Alternatively, the first GP included in the first time subunit and the third GP included in the second time subunit are aligned in time domain, and the second GP included in the first time subunit and the fourth GP included in the second time subunit are aligned in time domain. Alternatively, it is understood that a time domain resource included in the first time subunit and a time domain resource included in the second time subunit meet one or more of the following relationships: A length of the fifth time domain resource is the same as a length of the first time domain resource; a sum of the lengths of the second time domain sub-resource and the third time domain sub-resource is the same as a length of the sixth time domain resource; or a length of the fourth time domain sub-resource is the same as a length of the seventh time domain resource. For example, the time domain resource included in the first time subunit and the time domain resource included in the second time subunit may meet any one of the foregoing three relationships, or meet any two of the foregoing three relationships, or meet all of the foregoing three relationships. In this manner, symbol boundaries of a time subunit of a time division multiplexing structure and a time subunit of an extended resource structure are aligned, to reduce interference.

S22: The first communications apparatus sends first configuration information, where the first configuration information may indicate the second resource pool, or it is understood that the first configuration information includes information about the second resource pool.

For example, if the second resource pool is a resource pool configured by the first communications apparatus for the second communications apparatus, S22 may be as follows: The first communications apparatus sends the first configuration information to the second communications apparatus, and correspondingly, the second communications apparatus receives the first configuration information from the first communications apparatus. In S22 in FIG. 2, for example, the first communications apparatus sends the first configuration information to the second communications apparatus. In this case, the second communications apparatus receives the first configuration information.

Alternatively, the second resource pool may not be specifically provided for the second communications apparatus. For example, the second resource pool includes another resource outside the first resource pool, or the second resource pool includes a resource that is unavailable to the first communications domain. In this case, S22 may be as follows: The first communications apparatus broadcasts the first configuration information. For example, the first configuration information is broadcast outside the first communications domain. Correspondingly, a master node in a communications domain other than the first communications domain in a vehicle may receive the first configuration information from the first communications apparatus. For example, if the second communications apparatus is a master node in the second communications domain in the vehicle, the second communications apparatus can also receive the first configuration information. In FIG. 2, for example, the second communications apparatus receives the first configuration information.

Alternatively, the second resource pool is a reserved resource pool. In this case, S22 may be as follows: The first communications apparatus broadcasts the first configuration information. For example, the first configuration information is broadcast outside the first communications domain. Correspondingly, a master node in a communications domain other than the first communications domain in a vehicle may receive the first configuration information from the first communications apparatus. For example, if the second communications apparatus is a master node in the second communications domain in the vehicle, the second communications apparatus can also receive the first configuration information. In FIG. 2, for example, the second communications apparatus receives the first configuration information.

The first configuration information indicates the reserved resource pool, and an indication manner is, for example, that the second configuration information includes information about a frequency domain resource corresponding to the reserved resource pool, and includes information about a time domain resource corresponding to the reserved resource pool. The information about the frequency domain resource corresponding to the reserved resource pool includes, for example, information about a CC to which the reserved resource pool belongs. The information about the time domain resource corresponding to the reserved resource pool includes, for example, information about a time unit to which the reserved resource pool belongs. In an optional implementation, the time domain resource included in the reserved resource pool may be a time domain resource that is in a time unit and that is originally to be allocated to a communications domain including a non-vehicle-mounted apparatus. A service volume of the non-vehicle-mounted apparatus may be smaller than a service volume of a vehicle-mounted apparatus. Therefore, the reserved resource pool occupies a resource of the non-vehicle-mounted apparatus, so that impact on a service can be reduced, and resources can be more fully used. It may be understood that the first communications apparatus may allocate some time domain resources in some or all time subunits in one or more frequency domain units to the reserved resource pool.

The second communications apparatus can determine the second resource pool based on the first configuration information. If the second resource pool is a resource pool configured by the first communications apparatus for the second communications apparatus, the second communications apparatus may directly use the second resource pool. Alternatively, if the second resource pool is not specifically provided for the second communications apparatus, for example, the second resource pool includes another resource outside the first resource pool, the second communications apparatus may determine a resource pool available to the second communications apparatus (or the second communications domain) based on the second resource pool. For example, the second communications apparatus may select some or all resources in the second resource pool as resources to be used by the second communications apparatus. Alternatively, the second resource pool is a reserved resource pool. In this case, if the second communications apparatus has not obtained a resource pool that can be used in the second communications domain, the second communications apparatus may communicate with the first communications apparatus by using the reserved resource pool.

For example, the first communications apparatus may send the first configuration information by using a resource included in the first resource pool.

As described above, the second resource pool may include a first resource subpool and a second resource subpool. In this case, the first configuration information may indicate the first resource subpool, or indicate the second resource subpool, or indicate the first resource subpool and the second resource subpool. For example, the second resource pool does not include the first resource subpool and the second resource subpool, but is used as a whole, or although the second resource pool includes the first resource subpool and the second resource subpool, the first resource subpool and the second resource subpool are two parts included in the second resource pool. In this case, the first configuration information indicates the first resource subpool and the second resource subpool. The first resource subpool and the second resource subpool may be indicated by using the configuration information. In this manner, signaling overheads can be reduced.

Alternatively, if the second resource pool includes the first resource subpool and the second resource subpool, and the first resource subpool and the second resource subpool are two independent resource pools, the first configuration information may indicate the first resource subpool, or indicate the second resource subpool, or indicate the first resource subpool and the second resource subpool. If the first configuration information indicates only one resource subpool, for example, indicates the first resource subpool or the second resource subpool, the first communications apparatus may further send another piece of configuration information, for example, referred to as fourth configuration information, where the fourth configuration information may indicate the other resource subpool. For example, the first configuration information indicates the first resource subpool, and the fourth configuration information indicates the second resource subpool, or the first configuration information indicates the second resource subpool, and the fourth configuration information indicates the first resource subpool. The first configuration information and the fourth configuration information may be carried in a same message, or may be carried in different messages. If the first configuration information and the fourth configuration information are carried in the different messages, the first configuration information and the fourth configuration information may be simultaneously sent, or the first communications apparatus may first send the first configuration information and then send the fourth configuration information, or the first communications apparatus may first send the fourth configuration information and then send the first configuration information. The first resource subpool and the second resource subpool are respectively configured by using the two pieces of configuration information, so that the configured resource pool can be more specific. For example, the first configuration information may be carried in physical layer signaling or higher layer signaling, and the fourth configuration information may also be carried in the physical layer signaling or the higher layer signaling. For example, signaling used to carry the first configuration information and signaling used to carry the fourth configuration information are of a same type, for example, both are physical layer signaling or both are higher layer signaling. Alternatively, signaling used to carry the first configuration information and signaling used to carry the fourth configuration information are of different types. For example, the first configuration information is carried in physical layer signaling, and the fourth configuration information is carried in higher layer signaling, or the first configuration information is carried in higher layer signaling, and the fourth configuration information is carried in physical layer signaling. The physical layer signaling is, for example, downlink control information (downlink control information, DCI), and the higher layer signaling is, for example, a media access control (media access control, MAC) control element (control element, CE) or radio resource control (radio resource control, RRC) signaling.

For example, the first configuration information is used to indicate the first resource subpool. In this case, the first configuration information may specifically include time domain information, frequency domain information, time domain information and frequency domain information, or time-frequency resource information of the first resource subpool in one time subunit (for example, a time-frequency resource is divided into a plurality of time-frequency resource blocks, and one or more of the time-frequency resource blocks may be indicated in a bitmap (bitmap) manner or another indication manner, that is, the time-frequency resource information is indicated). To be specific, the first configuration information may indicate information about one time subunit. If time-frequency domain information corresponding to different time subunits in the first resource subpool is different, the first communications apparatus may respectively indicate the time-frequency domain information by using different configuration information; or if time-frequency domain information corresponding to different time subunits in the first resource sub-pool is the same, the first communications apparatus needs to indicate only one of the time subunits, to reduce transmission overheads. Alternatively, the first configuration information may specifically include time domain information, frequency domain information, time domain information and frequency domain information, or time-frequency resource information of the first resource subpool in one time subunit in one frequency domain unit. To be specific, the first configuration information may indicate information about a time subunit in a frequency domain unit. If time-frequency domain information corresponding to different time subunits in the first resource subpool in the frequency domain unit is different, the first communications apparatus may respectively indicate the time-frequency domain information by using different configuration information; or if time-frequency domain information corresponding to time subunits in the first resource subpool in different frequency domain units is different, the first configuration information may respectively indicate the time-frequency domain information by using different configuration information.

For another example, if the first configuration information is used to indicate the second resource subpool, the first configuration information may specifically include time domain information of the second resource subpool, or include time domain information of the second resource subpool in one time unit, or include time domain information of the second resource subpool in one frequency domain unit, or include time domain information of the second resource subpool in one frequency domain unit in one time unit. To be specific, the first configuration information may indicate overall time domain information of the second resource subpool. Alternatively, the first configuration information may indicate time domain information in one time unit. If time-frequency domain information corresponding to different time units in the second resource subpool is different, the first communications apparatus may respectively indicate the time-frequency domain information by using different configuration information; or if time-frequency domain information corresponding to different time units in the second resource subpool is the same, the first communications apparatus may indicate time-frequency domain information in one of the time units by using one piece of configuration information (for example, the first configuration information), so that transmission overheads can be reduced. Alternatively, the first configuration information may indicate time domain information in one frequency domain unit. If time-frequency domain information corresponding to different time units in the second resource subpool in different frequency domain units is different, the first communications apparatus may respectively indicate the time-frequency domain information by using different configuration information; or if time-frequency domain information corresponding to different time units in the second resource subpool in different frequency domain units is the same, the first communications apparatus may indicate time-frequency domain information in one time unit in one of the frequency domain units by using one piece of configuration information (for example, the first configuration information), so that transmission overhead can be reduced. Alternatively, the first configuration information may indicate time domain information in one time unit and in one frequency domain unit. If time domain information of second resource subpools in different time units in the frequency domain unit is different, the first configuration information may respectively indicate the time domain information by using different configuration information; or if time domain information of second resource subpools in different time units in the time unit is different, the first configuration information may respectively indicate the time domain information by using different configuration information; or if time domain information of second resource subpools in other frequency domain units is different, the first configuration information may respectively indicate the time domain information by using different configuration information; or if time domain information of second resource subpools in other time units is different, the first configuration information may respectively indicate the time domain information by using different configuration information; or if time domain information of second resource subpools in different time units in the frequency domain unit is the same, the first communications apparatus may indicate time-frequency domain information in one time unit in one of the frequency domain units by using one piece of configuration information (for example, the first configuration information), so that transmission overheads can be reduced.

S23: The first communications apparatus sends second configuration information to a third communications apparatus, and correspondingly, the third communications apparatus receives the second configuration information from the first communications apparatus, where the second configuration information may indicate a third resource pool, or it is understood that the second configuration information includes information about a third resource pool. The third communications apparatus can determine the third resource pool based on the second configuration information.

Actually, an implementation of the second configuration information is similar to an implementation of the first configuration information, or an implementation of the third resource pool is similar to an implementation of the first resource pool, that is, the third resource pool may be specifically configured for the third communications apparatus; or the third resource pool may include another resource outside the first resource pool, or may include another resource outside the first resource pool and the second resource pool. In this case, the first communications apparatus sends the second configuration information in a broadcast manner. After receiving the second configuration information, the third communications apparatus may obtain, based on the third resource pool, a resource pool to be used by the third communications apparatus. For example, the third communications apparatus may select some or all resources from the third resource pool as resources to be used by the third communications apparatus.

In this embodiment of this application, for example, the third resource pool is a resource pool specifically configured for the third communications apparatus. The third resource pool may be managed by the third communications apparatus, and may be used by the third communications apparatus to communicate with another communications apparatus. That the third resource pool is managed by the third communications apparatus may mean that the third communications apparatus may allocate a resource in the third resource pool to another communications apparatus, so that the third communications apparatus and the another communications apparatus can communicate with each other by using the allocated resource. As described above, the first communications apparatus may further configure a resource pool for each of all or some communications domains other than the first communications domain in the vehicle for communication in these communications domains. For example, in addition to the first communications domain and the second communications domain, the vehicle further includes a third communications domain. In this case, in addition to configuring the second resource pool for the second communications domain, the first communications apparatus may further configure a resource pool for the third communications domain, where the resource pool may be the third resource pool. For example, the third communications apparatus is a master node in the third communications domain in the vehicle, and the third resource pool may be a resource pool configured for the third communications domain for use. In this case, the third resource pool may be used by the third communications apparatus to communicate with a communications apparatus other than the third communications apparatus in the third communications domain, and that the third communications apparatus allocates a resource in the third resource pool to another communications apparatus may mean that the third communications apparatus allocates the resource in the third resource pool to a communications apparatus other than the third communications apparatus in the third communications domain. The communications apparatus other than the third communications apparatus in the third communications domain that is described herein may include all or some communications apparatuses other than the third communications apparatus in the third communications domain. For example, if the third communications apparatus is a master node in the third communications domain, all communications apparatuses other than the third communications apparatus in the third communications domain are slave nodes in the third communications domain.

For example, the first communications apparatus may send the second configuration information by using a resource included in the first resource pool. Similarly, the third resource pool may also include a resource subpool (for example, referred to as a fifth resource subpool) used for data transmission and a resource subpool (for example, referred to as a sixth resource subpool) used for control information transmission. For a manner in which the first communications apparatus indicates the fifth resource subpool or the sixth resource subpool, refer to the foregoing descriptions of the manner in which the first communications apparatus indicates the first resource subpool or the second resource subpool.

For example, a frequency domain resource included in the third resource pool may be different from a frequency domain resource included in the second resource pool. For example, a frequency domain unit to which the frequency domain resource included in the third resource pool belongs is different from a frequency domain unit to which the frequency domain resource included in the second resource pool belongs. This may be understood as that the third resource pool and the second resource pool are frequency-division multiplexed. Alternatively, a third time domain resource included in the third resource pool and the second time domain resource are located in different time units. This may be understood as that the third resource pool and the second resource pool are time-division multiplexed between time units. For example, all communications apparatuses included in the third communications domain are non-vehicle-mounted apparatuses. In this case, the second resource pool and the third resource pool are resource pools configured for two communications domains including non-vehicle-mounted apparatuses. To be specific, the resource pools configured for the two communications domains including the non-vehicle-mounted apparatuses may be frequency-division multiplexed, or may be multiplexed between time units.

For another example, a frequency domain resource included in the third resource pool may be different from a frequency domain resource included in the first resource pool. For example, a frequency domain unit to which the frequency domain resource included in the third resource pool belongs is different from a frequency domain unit to which the frequency domain resource included in the first resource pool belongs. This may be understood as that the third resource pool and the first resource pool are frequency-division multiplexed. Alternatively, a third time domain resource included in the third resource pool and the first time domain resource are located in different time units. This may be understood as that the third resource pool and the first resource pool are time-division multiplexed between time units. For example, all communications apparatuses included in the third communications domain are vehicle-mounted apparatuses. For example, the third communications domain is the communications domain 3 shown in FIG. 1A. In this case, it may be considered that resource pools of a communications domain having a highest priority and a communications domain including a vehicle-mounted apparatus may be frequency-division multiplexed, or may be multiplexed between time units. If the third resource pool and the first resource pool are frequency-division multiplexed, in an optional implementation, locations of a communications apparatus (or an antenna of the communications apparatus) in the third communications domain and a communications apparatus (or an antenna of the communications apparatus) in the first communications domain may be deployed before a vehicle is delivered from a factory, so that a distance between the communications apparatus (or the antenna of the communications apparatus) in the third communications domain and the communications apparatus (or the antenna of the communications apparatus) in the first communications domain is long. For example, based on deployment, a minimum distance between the communications apparatus (or the antenna of the communications apparatus) in the third communications domain and the communications apparatus (or the antenna of the communications apparatus) in the first communications domain may be greater than a first distance. The first distance may be specified in a protocol, or may be determined based on experience. For example, if a distance between two communications apparatuses is greater than the first distance, a probability that a blocking phenomenon occurs when the two communications apparatuses transmit information is low. Therefore, the distance between the communications apparatus (or the antenna of the communications apparatus) in the third communications domain and the communications apparatus (or the antenna of the communications apparatus) in the first communications domain is long, so that a probability that a blocking phenomenon occurs can be reduced. The third communications domain may include one or more communications apparatuses, and the first communications domain may also include one or more communications apparatuses. There are corresponding distances between all the communications apparatuses in the third communications domain and all the communications apparatuses in the first communications domain, where a distance with a smallest value in the distances is the minimum distance between the communications apparatus (or the antenna of the communications apparatus) in the third communications domain and the communications apparatus (or the antenna of the communications apparatus) in the first communications domain.

The first communications apparatus may first perform S22 and then perform S23, or may first perform S23 and then perform S22, or may simultaneously perform S22 and S23. S23 is optional, and is represented by a dashed line in FIG. 2.

S24: The first communications apparatus sends third configuration information to the fourth communications apparatus, and correspondingly, the fourth communications apparatus receives the third configuration information from the first communications apparatus, where the third configuration information may indicate a fourth resource pool, or it is understood that the third configuration information includes information about a fourth resource pool. The fourth communications apparatus can determine the fourth resource pool based on the third configuration information.

Actually, an implementation of the third configuration information is similar to an implementation of the first configuration information, or an implementation of the fourth resource pool is similar to an implementation of the first resource pool, that is, the third resource pool may be specifically configured for the fourth communications apparatus; or the fourth resource pool may include another resource outside the first resource pool, or may include another resource outside the first resource pool, the second resource pool, and the third resource pool. In this case, the first communications apparatus sends the third configuration information in a broadcast manner. After receiving the third configuration information, the fourth communications apparatus may obtain, based on the fourth resource pool, a resource pool to be used by the fourth communications apparatus. For example, the fourth communications apparatus may select some or all resources from the fourth resource pool as resources to be used by the fourth communications apparatus.

In this embodiment of this application, for example, the fourth resource pool is a resource pool specifically configured for the fourth communications apparatus. The fourth resource pool may be managed by the fourth communications apparatus, and may be used by the fourth communications apparatus to communicate with another communications apparatus. That the fourth resource pool is managed by the fourth communications apparatus may mean that the fourth communications apparatus may allocate a resource in the fourth resource pool to another communications apparatus, so that the fourth communications apparatus and the another communications apparatus can communicate with each other by using the allocated resource. As described above, the first communications apparatus may further configure a resource pool for each of all or some communications domains other than the first communications domain in the vehicle for communication in these communications domains. For example, in addition to the first communications domain, the second communications domain, and the third communications domain, the vehicle further includes a fourth communications domain. In this case, in addition to configuring the second resource pool for the second communications domain and the third communications domain, the first communications apparatus may further configure a resource pool for the fourth communications domain, where the resource pool may be the fourth resource pool. For example, the fourth communications apparatus is a master node in the fourth communications domain in the vehicle, and the fourth resource pool may be a resource pool configured for the fourth communications domain for use. In this case, the fourth resource pool may be used by the fourth communications apparatus to communicate with a communications apparatus other than the fourth communications apparatus in the fourth communications domain, and that the fourth communications apparatus allocates a resource in the fourth resource pool to another communications apparatus may mean that the fourth communications apparatus allocates the resource in the fourth resource pool to a communications apparatus other than the fourth communications apparatus in the fourth communications domain. The communications apparatus other than the fourth communications apparatus in the fourth communications domain that is described herein may include all or some communications apparatuses other than the fourth communications apparatus in the fourth communications domain. For example, if the fourth communications apparatus is a master node in the fourth communications domain, all communications apparatuses other than the fourth communications apparatus in the fourth communications domain are slave nodes in the fourth communications domain.

For example, the first communications apparatus may send the third configuration information by using a resource included in the first resource pool. Similarly, the fourth resource pool may also include a resource subpool (for example, referred to as a seventh resource subpool) used for data transmission and a resource subpool (for example, referred to as an eighth resource subpool) used for control information transmission. For a manner in which the first communications apparatus indicates the seventh resource subpool or the eighth resource subpool, refer to the foregoing descriptions of the manner in which the first communications apparatus indicates the first resource subpool or the second resource subpool.

For example, a frequency domain resource included in the fourth resource pool may be different from a frequency domain resource included in the third resource pool. For example, a frequency domain unit to which the frequency domain resource included in the third resource pool belongs is different from a frequency domain unit to which the frequency domain resource included in the fourth resource pool belongs. This may be understood as that the fourth resource pool and the third resource pool are frequency-division multiplexed. Alternatively, a fourth time domain resource included in the fourth resource pool and the third time domain resource are located in different time units. This may be understood as that the fourth resource pool and the third resource pool are time-division multiplexed between time units. For example, all communications apparatuses included in the fourth communications domain are vehicle-mounted apparatuses (for example, the fourth communications domain is a communications domain in which a telematics box (telematics box, T-Box) is a master node), and all communications apparatuses included in the third communications domain are also vehicle-mounted apparatuses. In this case, the fourth resource pool and the third resource pool are resource pools configured for two communications domains including vehicle-mounted apparatuses. To be specific, the resource pools configured for the two communications domains including the vehicle-mounted apparatuses may be frequency-division multiplexed, or may be multiplexed between time units.

If the third resource pool and the fourth resource pool are time-division multiplexed, because the third resource pool and the fourth resource pool are separated in terms of time, a probability that a blocking phenomenon occurs can be reduced.

If the third resource pool and the fourth resource pool are frequency-division multiplexed, in an optional implementation, locations of a communications apparatus (or an antenna of the communications apparatus) in the third communications domain and a communications apparatus (or an antenna of the communications apparatus) in the fourth communications domain may be deployed before a vehicle is delivered from a factory, so that a distance between the communications apparatus (or the antenna of the communications apparatus) in the third communications domain and the communications apparatus (or the antenna of the communications apparatus) in the fourth communications domain is long. For example, based on deployment, a minimum distance between the communications apparatus (or the antenna of the communications apparatus) in the third communications domain and the communications apparatus (or the antenna of the communications apparatus) in the fourth communications domain may be greater than a second distance. The second distance may be specified in a protocol, or may be determined based on experience. For example, if a distance between two communications apparatuses is greater than the second distance, a probability that a blocking phenomenon occurs when the two communications apparatuses transmit information is low. The first distance may be the same as or different from the second distance. Therefore, the distance between the communications apparatus (or the antenna of the communications apparatus) in the third communications domain and the communications apparatus (or the antenna of the communications apparatus) in the fourth communications domain is long, so that a probability that a blocking phenomenon occurs can be reduced. The third communications domain may include one or more communications apparatuses, and the fourth communications domain may also include one or more communications apparatuses. There are corresponding distances between all the communications apparatuses in the third communications domain and all the communications apparatuses in the fourth communications domain, where a distance with a smallest value in the distances is the minimum distance between the communications apparatus (or the antenna of the communications apparatus) in the third communications domain and the communications apparatus (or the antenna of the communications apparatus) in the fourth communications domain.

Figure 6:
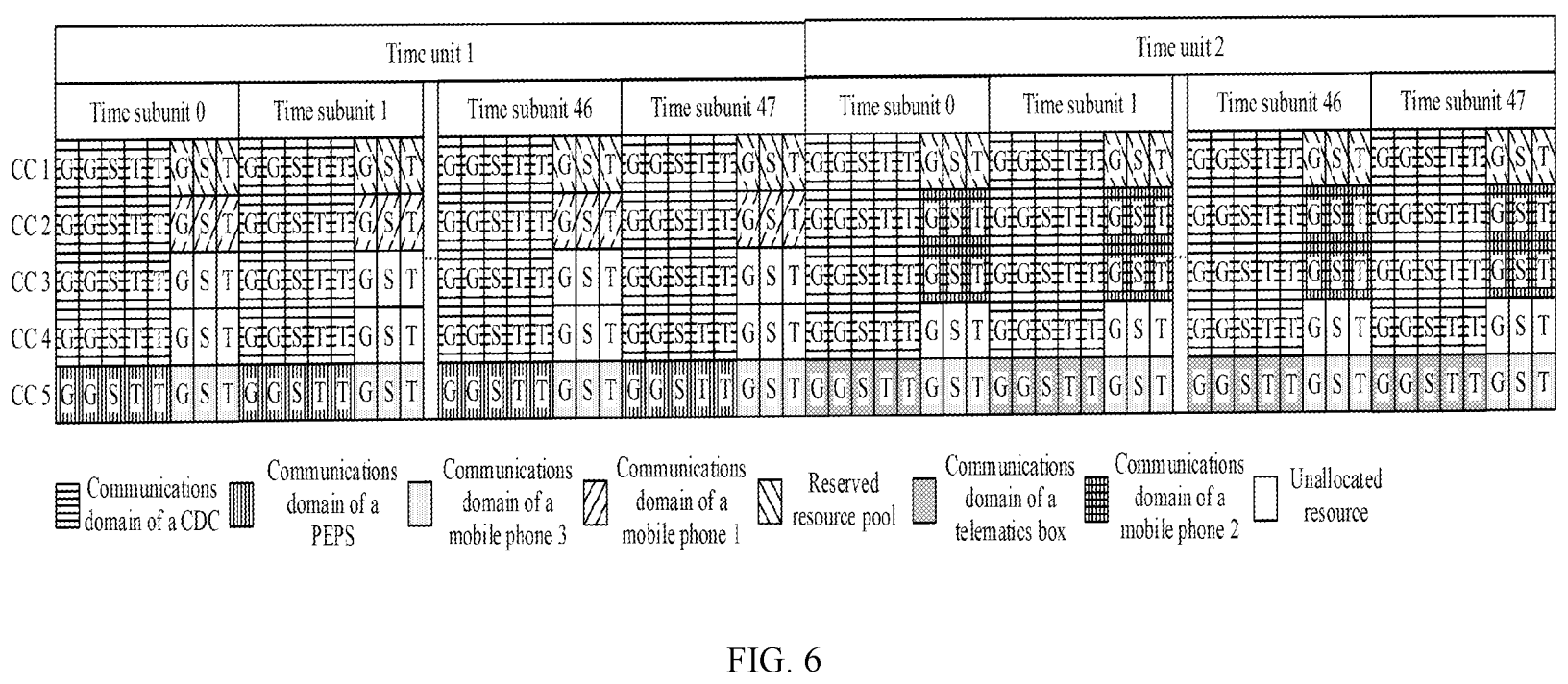

For example, FIG. 6 is a schematic diagram of resource pool allocation. FIG. 6 shows structures of two time units. In FIG. 6, for example, a time unit is a superframe and a time subunit is a radio frame. One superframe includes one or more radio frames. In FIG. 6, for example, one superframe includes 48 radio frames. FIG. 6 shows cases on five carriers. The five carriers are respectively a CC 1 to a CC 5. For example, bandwidths of the five carriers each are 20 MHz. In FIG. 6, a box marked with horizontal lines represents a resource included in a resource pool corresponding to a communications domain of a CDC (that is, a communications domain in which the CDC is a master node). For example, if the communications domain of the CDC is a first communications domain, the box marked with the horizontal lines represents a resource included in a first resource pool; a box marked with "\" represents a resource included in a reserved resource pool; a box marked with "/" represents a resource included in a resource pool corresponding to a communications domain of a mobile phone 1 (that is, a communications domain in which the mobile phone 1 is a master node); a box marked with vertical lines represents a resource included in a resource pool corresponding to a communications domain of a PEPS (that is, a communications domain in which the PEPS is a master node); a box marked with dots represents a resource included in a resource pool corresponding to a communications domain of a mobile phone 3 (that is, a communications domain in which the mobile phone 3 is a master node); a box with a fence pattern marked with horizontal lines and vertical lines represents a resource included in a resource pool corresponding to a communications domain of a mobile phone 2 (that is, a communications domain in which the mobile phone 2 is a master node); a box with a lattice pattern marked with "\" and "/" represents a resource included in a resource pool corresponding to a communications domain of a T-Box (that is, a communications domain in which the T-Box is a master node); and a blank box represents an unallocated resource. For example, some time domain resources included in a time subunit may be originally allocated to a communications domain including a non-vehicle-mounted apparatus, but the first communications apparatus may not allocate the time domain resources to any communications domain, and temporarily does not allocate the time domain resources. If another communications apparatus joins the network in the vehicle in the future, the first communications apparatus may allocate these time domain resources to the newly-joined communications apparatus, to avoid a case in which no resources can be allocated to the newly-joined communications apparatus.

It can be learned from FIG. 6 that the resource pool corresponding to the communications domain of the CDC and the resource pool corresponding to the communications domain of the mobile phone 1 (that is, the first resource pool and a resource pool corresponding to a communications domain including a non-vehicle-mounted communications apparatus) are time-division multiplexed in a time subunit; the resource pool corresponding to the communications domain of the CDC and the reserved resource pool are also time-division multiplexed in a time subunit; the resource pool corresponding to the communications domain of the CDC and the resource pool corresponding to the communications domain of the PEPS (that is, the first resource pool and a resource pool corresponding to a communications domain including a vehicle-mounted communications apparatus) are frequency-division multiplexed; the resource pool corresponding to the communications domain of the CDC and the resource pool corresponding to the communications domain of the mobile phone 3 are frequency-division multiplexed; the resource pool corresponding to the communications domain of the PEPS and the resource pool corresponding to the communications domain of the mobile phone 3 (that is, a resource pool corresponding to a communications domain including a vehicle-mounted communications apparatus and a resource pool corresponding to a communications domain including a non-vehicle-mounted communications apparatus) are time-division multiplexed in a time subunit; the resource pool corresponding to the communications domain of the CDC and the resource pool corresponding to the communications domain of the mobile phone 2 are time-division multiplexed in a time subunit; and the like. The foregoing relationships meet the foregoing descriptions.

Figure 7:
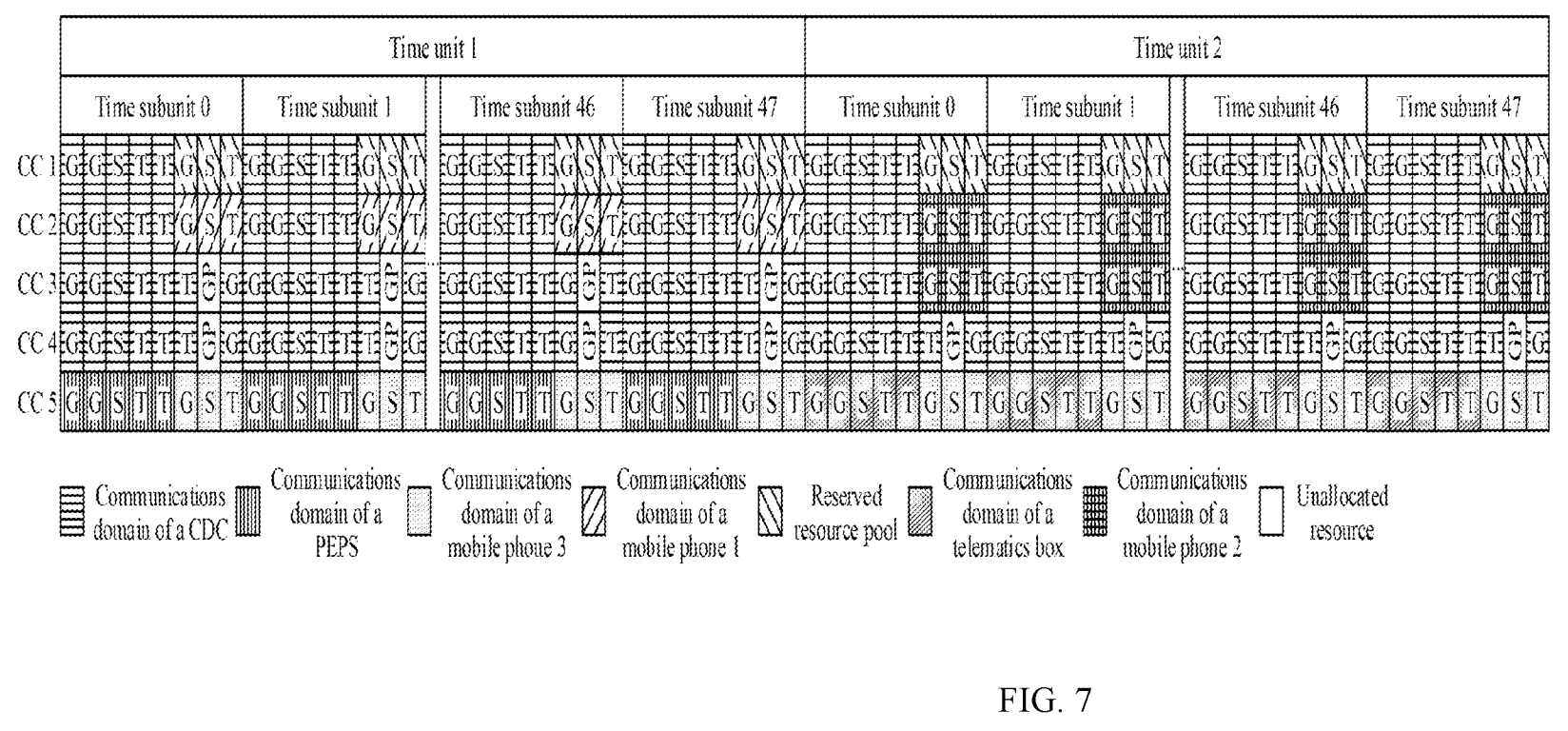

For another example, FIG. 7 is another schematic diagram of resource pool allocation. FIG. 7 shows structures of two time units. In FIG. 7, for example, a time unit is a superframe and a time subunit is a radio frame. One superframe includes one or more radio frames. In FIG. 7, for example, one superframe includes 48 radio frames. FIG. 7 shows cases on five carriers. In FIG. 7, a box marked with horizontal lines represents a resource included in a resource pool corresponding to a communications domain of a CDC (that is, a communications domain in which the CDC is a master node). For example, if the communications domain of the CDC is a first communications domain, the box marked with the horizontal lines represents a resource included in a first resource pool; a box marked with "\" represents a resource included in a reserved resource pool; a box marked with "/" represents a resource included in a resource pool corresponding to a communications domain of a mobile phone 1 (that is, a communications domain in which the mobile phone 1 is a master node); a box marked with vertical lines represents a resource included in a resource pool corresponding to a communications domain of a PEPS (that is, a communications domain in which the PEPS is a master node); a box marked with dots represents a resource included in a resource pool corresponding to a communications domain of a mobile phone 3 (that is, a communications domain in which the mobile phone 3 is a master node); a box with a fence pattern marked with horizontal lines and vertical lines represents a resource included in a resource pool corresponding to a communications domain of a mobile phone 2 (that is, a communications domain in which the mobile phone 2 is a master node); a box with a lattice pattern marked with "\" and "/" represents a resource included in a resource pool corresponding to a communications domain of a T-Box (that is, a communications domain in which the T-Box is a master node); and a blank box represents an unallocated resource. For example, some time domain resources included in a time subunit may be originally allocated to a communications domain including a non-vehicle-mounted apparatus, but the first communications apparatus may not allocate the time domain resources to any communications domain, and temporarily does not allocate the time domain resources. If another communications apparatus joins the network in the vehicle in the future, the first communications apparatus may allocate these time domain resources to the newly-joined communications apparatus, to avoid a case in which no resources can be allocated to the newly-joined communications apparatus. A difference between FIG. 7 and FIG. 6 lies in that in FIG. 7, an extended CDC domain resource pool exists in a time unit 1 corresponding to a CC 3, and an extended CDC domain resource pool also exists in each of a time unit 1 and a time unit 2 corresponding to a CC 4, but in FIG. 6, an extended CDC domain resource pool does not exist.

It can be learned from FIG. 7 that a GP included in a time subunit of an extended CDC domain resource pool and a GP included in a time subunit of a time division multiplexing structure are aligned in time domain.

In FIG. 6 and FIG. 7, a symbol S indicates S+GP. S+GP represents a symbol S and a GP. If the symbol S is used for downlink transmission, the symbol S is located on a side on which a symbol G on one of front and back sides of the GP is located (for example, in FIG. 4, if the symbol S is used for downlink transmission, the symbol S is located before the GP). Alternatively, if the symbol S is used for uplink transmission, the symbol S is located on a side on which a symbol T on one of front and back sides of the GP is located (for example, in FIG. 4, if the symbol S is used for uplink transmission, the symbol S is located after the GP). The symbol G indicates downlink transmission, and the symbol T indicates uplink transmission. In addition, in FIG. 6 or FIG. 7, a quantity of symbols included before and after the 1$^{st}$ GP in one time subunit may be different from a quantity of symbols included before and after the 1$^{st}$ GP in one time subunit in FIG. 4 or FIG. 5. This indicates that in this embodiment of this application, a length of each time domain resource or each time domain sub-resource included in one time subunit is not limited. It should be noted that, in FIG. 6 or FIG. 7, there is only one symbol S in symbols adjacent to the GP. This is merely an example. In actual application, there may also be another quantity of symbols S. In addition, locations of symbols S in the accompanying drawings in embodiments of this application are also examples, and symbols S in other time subunits may be at other locations.

Figure 8:
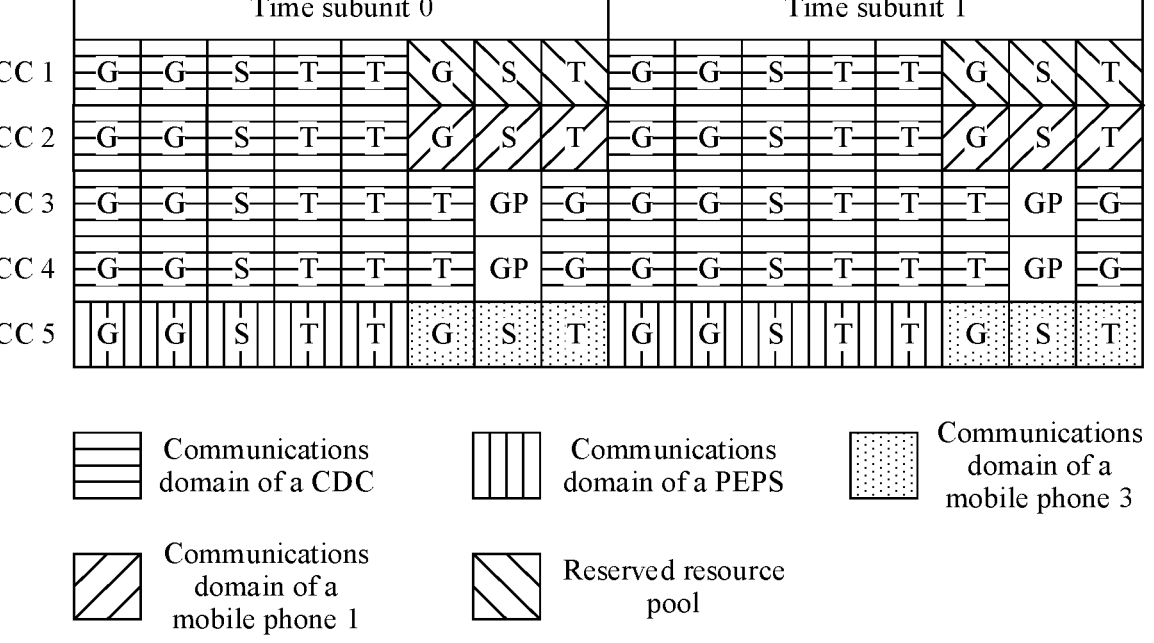
FIG. 8 is still another schematic diagram of resource pool allocation according to an embodiment of this application.

In addition, for details, refer to FIG. 8 and FIG. 9. FIG. 8 is an enlarged schematic diagram of structures of a time subunit 0 and a time subunit 1 that are included in the time unit 1 shown in FIG. 7. FIG. 9 is a schematic diagram indicating whether a communications apparatus corresponding to the structures of the time subunit 0 and the time subunit 1 shown in FIG. 7 performs a sending operation or a receiving operation. In FIG. 9, Tx indicates that the communications apparatus performs a sending operation on the symbol, and Rx indicates that the communications apparatus performs a receiving operation on the symbol. In FIG. 9, S+GP indicates that the communications apparatus may perform a receiving operation and perform neither a receiving operation nor a sending operation (that is, may first perform the receiving operation and then perform neither the receiving operation nor the sending operation, or may first perform neither the receiving operation nor the sending operation and then perform the receiving operation), or S+GP indicates that the communications apparatus may perform a sending operation and perform neither a receiving operation nor a sending operation (that is, may first perform the sending operation and then perform neither the receiving operation nor the sending operation, or may first perform neither the receiving operation nor the sending operation and then perform the sending operation), or S+GP indicates that the communications apparatus performs neither a receiving operation nor a sending operation. The first row in FIG. 9 indicates a receiving/sending status of the CDC on the CC 3 and the CC 4. The second row in FIG. 9 indicates a receiving/sending status of the CDC on the CC 1 and the CC 2. The third row in FIG. 9 indicates a receiving/sending status of the CDC on the CC 5. The CDC does not use the CC 5, and therefore the CDC does not perform a receiving/sending operation on the CC 5. The third row is represented by "-" in FIG. 9. The fourth row in FIG. 9 indicates a receiving/sending status of the mobile phone 1 on the CC 2. For example, if the foregoing third communications domain may include a non-vehicle-mounted apparatus, the communications domain of the mobile phone 1 may be the third communications domain, and the mobile phone 1 may be a master node (that is, the third communications apparatus) in the third communications domain. The fifth row in FIG. 9 indicates a receiving/sending status of the mobile phone 1 on the CC 1, the CC 3, or the CC 4 if the mobile phone 1 communicates with the CDC. In the first half part of the time subunit, the mobile phone 1 may join the communications domain of the CDC, serve as a slave node in the communications domain of the CDC, and communicate with the CDC. Therefore, the mobile phone 1 may also perform a corresponding receiving operation or sending operation in the first half part of the time subunit. The sixth row in FIG. 9 indicates a receiving/sending status of the mobile phone 1 on the CC 1, the CC 3, or the CC 4 if the mobile phone 1 does not communicate with the CDC. In this case, the mobile phone 1 uses none of the CC 1, the CC 3, and the CC 4, and therefore the mobile phone 1 performs a receiving/sending operation on none of the CC 1, the CC 3, and the CC 4. The sixth row is represented by "-" in FIG. 9. The sixth row in FIG. 9 indicates a receiving/sending status of the mobile phone 1 on the CC 5. The mobile phone 1 does not use the CC 5, and therefore the mobile phone 1 does not perform a receiving/sending operation on the CC 5. The seventh row is represented by "-" in FIG. 9. If the mobile phone 1 does not communicate with the CDC, both the fourth row and the fifth row in FIG. 9 may be represented by "-", that is, in this case, the mobile phone 1 uses none of the CC 1 to the CC 5.

In FIG. 9, a dashed-line box represents a boundary of a resource pool, and a solid-line box represents a boundary of a radio frame. It can be learned that for a communications apparatus such as the CDC or the mobile phone 1, receiving and sending directions before and after the boundary of the resource pool are the same, that is, are both receiving directions or sending directions, and receiving and sending directions before and after the boundary of the radio frame are also the same, that is, are both receiving directions or sending directions, so that the communications apparatus does not need to perform receiving/sending conversion when crossing the boundary of the resource pool or the boundary of the time subunit, to avoid a requirement for a GP generated during receiving/sending conversion.

An execution sequence of S22, S23, and S24 may be as follows: S22→S23→S24, or S23→S22→S24, or S23→S24→S22, or S22→S24→S23, or S24→S22→S23, or S24→S23→S22, or any two of the three steps may be simultaneously performed, or all the three steps are simultaneously performed. S24 is also optional, and is represented by a dashed line in FIG. 2.

S25: The first communications apparatus sends first information. For example, the first communications apparatus may send the first information in a broadcast manner, and all or some communications apparatuses other than the first communications apparatus in the first communications domain may receive the first information from the first communications apparatus. An example in which a fifth communications apparatus in the first communications domain receives the first information is used in FIG. 2.

The first information may include one or more of the following: length information of the first time domain sub-resource, length information of the second time domain sub-resource, length information of the third time domain sub-resource, or length information of the fourth time domain sub-resource. For example, the first information includes the length information of the first time domain sub-resource and the length information of the second time domain sub-resource, or the first information includes the length information of the first time domain sub-resource and the length information of the third time domain sub-resource, or the first information includes the length information of the third time domain sub-resource and the length information of the fourth time domain sub-resource, or the like. The first communications apparatus sends the first information, so that another communications apparatus in the first communications domain can determine a division status of a time subunit, and therefore the another communications apparatus in the first communications domain can learn which time domain resources in the time subunit can be used to transmit information to the first communications apparatus.

The first communications apparatus may send the first information. Further, for example, a master node (for example, the second communications apparatus) in the second communications domain may send third information in a broadcast manner, and all or some communications apparatuses other than the second communications apparatus in the second communications domain can receive the third information from the second communications apparatus. The third information may include one or more of the following: length information of the first time domain sub-resource, length information of the second time domain sub-resource, length information of the third time domain sub-resource, or length information of the fourth time domain sub-resource.

For another example, a master node (for example, the third communications apparatus) in the third communications domain may send fifth information in a broadcast manner, and all or some communications apparatuses other than the third communications apparatus in the third communications domain can receive the fifth information from the third communications apparatus. If a frequency domain resource included in the third resource pool is different from a frequency domain resource included in the second resource pool, or a third time domain resource included in the third resource pool and the second time domain resource are located in different time units, the fifth information may include one or more of the following: length information of the third time domain sub-resource, length information of the fourth time domain sub-resource, length information of the fifth time domain sub-resource, or length information of the sixth time domain sub-resource. Alternatively, if a frequency domain resource included in the third resource pool is different from a frequency domain resource included in the first resource pool, or a third time domain resource included in the third resource pool and the first time domain resource are located in different time units, the fifth information may include one or more of the following: length information of the first time domain sub-resource, length information of the second time domain sub-resource, length information of the fifth time domain sub-resource, or length information of the sixth time domain sub-resource.

The third time domain resource sequentially includes the fifth time domain sub-resource, a fifth GP, and the sixth time domain sub-resource in time domain. The fifth time domain sub-resource may include one or more symbols, the sixth time domain sub-resource may include one or more symbols, and a time domain length of the fifth time domain sub-resource may be the same as or different from a time domain length of the sixth time domain sub-resource. The fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus. For more descriptions of the content included in the third time domain resource, refer to the foregoing descriptions of the content included in the first time domain resource. Composition manners are similar.

For another example, a master node (for example, the fourth communications apparatus) in the fourth communications domain may send seventh information in a broadcast manner, and all or some communications apparatuses other than the fourth communications apparatus in the fourth communications domain can receive the seventh information from the fourth communications apparatus. The fourth time domain resource sequentially includes a seventh time domain sub-resource, a sixth GP, and an eighth time domain sub-resource in time domain. The seventh information may include one or more of the following: length information of the fifth time domain sub-resource, length information of the sixth time domain sub-resource, length information of the seventh time domain sub-resource, or length information of the eighth time domain sub-resource. The seventh time domain sub-resource may include one or more symbols, the eighth time domain sub-resource may include one or more symbols, and a time domain length of the seventh time domain sub-resource may be the same as or different from a time domain length of the eighth time domain sub-resource. The seventh time domain sub-resource is used to map a signal from the fourth communications apparatus, and the eighth time domain sub-resource is used to map a signal sent to the fourth communications apparatus, or the seventh time domain sub-resource is used to map a signal sent to the fourth communications apparatus, and the eighth time domain sub-resource is used to map a signal from the fourth communications apparatus. For more descriptions of the content included in the fourth time domain resource, refer to the foregoing descriptions of the content included in the first time domain resource. Composition manners are similar.

S26: The first communications apparatus sends second information. For example, the first communications apparatus may send the second information in a broadcast manner, and all or some communications apparatuses other than the first communications apparatus in the first communications domain may receive the second information from the first communications apparatus. An example in which a fifth communications apparatus in the first communications domain receives the second information is still used in FIG. 2.

The second information may indicate the first resource pool or indicate an available resource in the first resource pool. For example, if the second information indicates the first resource pool, the second information may directly indicate the first resource pool, or may indirectly indicate the first resource pool by indicating another resource pool or indicating a resource that does not belong to the first resource pool. For another example, the second information may alternatively indicate the available resource in the first resource pool. For example, the second information may indicate a union of a resource that does not belong to the first resource pool and a resource that has been occupied in the first resource pool for some reasons, that is, the second information indirectly indicates the available resource in the first resource pool. The resource occupied for some reasons includes, for example, one or more of the following: a resource occupied by a noise reduction service, a resource occupied by system signaling, or a resource occupied by a system signal. The noise reduction service is a stable service, and usually there is a noise reduction service in each time subunit. Therefore, the resource occupied by the noise reduction service is also fixed. In this case, the second information may indicate the resource. In this way, a resource other than the resource that has been occupied for some reasons in the first resource pool is the available resource in the first resource pool. After receiving the second information, a communications apparatus other than the first communications apparatus in the first communications domain may determine which resources in the first resource pool can be used to communicate with the first communications apparatus.

The first communications apparatus may send the second information. Further, for example, a master node (for example, the second communications apparatus) in the second communications domain may send fourth information in a broadcast manner, and all or some communications apparatuses other than the second communications apparatus in the second communications domain can receive the fourth information from the second communications apparatus. The fourth information may indicate a second resource pool or indicate an available resource in a second resource pool. An indication manner of the fourth information is similar to an indication manner of the second information. Details are not described again.

For another example, a master node (for example, the third communications apparatus) in the third communications domain may send sixth information in a broadcast manner, and all or some communications apparatuses other than the third communications apparatus in the third communications domain can receive the sixth information from the third communications apparatus. The fourth information may indicate a third resource pool or indicate an available resource in a third resource pool. An indication manner of the sixth information is similar to an indication manner of the second information. Details are not described again.

For another example, a master node (for example, the fourth communications apparatus) in the fourth communications domain may send eighth information in a broadcast manner, and all or some communications apparatuses other than the fourth communications apparatus in the fourth communications domain can receive the eighth information from the fourth communications apparatus. The eighth information may indicate a fourth resource pool or indicate an available resource in a fourth resource pool. An indication manner of the eighth information is similar to an indication manner of the second information. Details are not described again.

Both S25 and S26 are optional, and are represented by dashed lines in FIG. 2.

In this embodiment of this application, the first communications apparatus manages the another communications apparatus, or the first communications apparatus allocates a resource pool to the another communications apparatus, so that the first communications apparatus can uniformly allocate a resource pool to all communications apparatuses. In this case, the first communications apparatus may configure the resource pool when allocating the resource pool to all the communications apparatuses, to reduce as much as possible a probability that resources included in resource pools of different communications domains conflict with each other, and reduce as much as possible a probability that a receiving process of one communications apparatus is affected by another communications apparatus, so as to improve information receiving quality.

In addition, the resource pools of the different communications domains may be further time-division multiplexed, so that blocking can be reduced. Further, optionally, to reduce a transmission latency, in this embodiment of this application, different resource pools may be time-division multiplexed in one time subunit, so that a transmission latency of a service is less than one time subunit, to meet a requirement for a service (for example, a noise reduction service) having a high latency requirement.

The foregoing describes in detail the methods provided in embodiments of this application. The following describes in detail communications apparatuses provided in embodiments of this application. It should be understood that descriptions of the embodiments of the communications device correspond to the descriptions of the method embodiments. Therefore, for content that is not described in detail, refer to the foregoing method embodiments. For brevity, details are not described herein again.

In embodiments of this application, the communications module may be divided into functional modules. For example, each functional module may be obtained through division based on each corresponding function, or two or more functions may be integrated into one functional module. The integrated module may be implemented in a form of hardware, or may be implemented in a form of a software functional module. It should be noted that, in embodiments of this application, division into modules is an example and is merely logical function division, and may be other division in an actual implementation.

Figure 10:
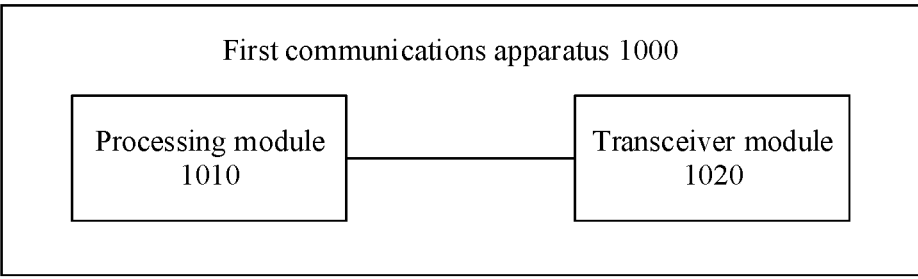
FIG. 10 is a schematic diagram of a structure of a first communications apparatus according to an embodiment of this application.

For example, when the functional modules of the first communications apparatus are obtained through division in an integrated manner, FIG. 10 is a possible schematic diagram of a structure of a first communications apparatus 1000 related to the foregoing embodiments of this application. The first communications apparatus 1000 may include a transceiver module 1020 and a processing module 1010. The processing module 1010 may be configured to perform all operations except the sending operation and the receiving operation that are performed by the first communications apparatus in the foregoing method embodiments, and/or is configured to support another process of the technology described in this specification. The transceiver module 1020 may be configured to perform all receiving operations and/or sending operations performed by the first communications apparatus in the foregoing method embodiments, and/or is configured to support another process of the technology described in this specification. The transceiver module may alternatively be replaced by a transmission module, or the transceiver module may include a sending module and a receiving module that are independent of each other, and may be configured to support another process of the technology described in this specification.

The processing module 1010 is configured to determine a second resource pool, where the second resource pool is different from a first resource pool, and the first resource pool is managed by the first communications apparatus 1000 and used by the first communications apparatus 1000 to communicate with another communications apparatus.

The transceiver module 1020 is configured to send first configuration information, where the first configuration information is used to indicate the second resource pool.

In an optional implementation, the second resource pool is managed by a second communications apparatus and used by the second communications apparatus to communicate with another communications apparatus.

In an optional implementation, the first resource pool includes a first time-frequency resource, and the second resource pool includes a second time-frequency resource; the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

In an optional implementation, the first time subunit sequentially includes the first time domain resource and the second time domain resource in time domain.

In an optional implementation, the second resource pool includes a first resource subpool and a second resource subpool.

The transceiver module 1020 is configured to send the first configuration information in the following manner, where the first configuration information is used to indicate the second resource pool:

sending the first configuration information, where the first configuration information is used to indicate the first resource subpool and/or the second resource subpool, the first resource subpool is used by the second communications apparatus to transmit data to another communications apparatus, and the second resource subpool is used by the second communications apparatus to transmit signaling or a signal to another communications apparatus.

In an Optional Implementation, the First Configuration Information Includes:

time domain information, frequency domain information, time domain information and frequency domain information, or time-frequency resource information of the first resource subpool in one time subunit, or time domain information, frequency domain information, time domain information and frequency domain information, or time-frequency resource information of the first resource subpool in one time subunit in one frequency domain unit; and/or time domain information of the second resource subpool, or time domain information of the second resource subpool in one time unit, or time domain information of the second resource subpool in one frequency domain unit, or time domain information of the second resource subpool in one frequency domain unit in one time unit.

In an optional implementation, the transceiver module 1020 is further configured to send second configuration information to a third communications apparatus, where the second configuration information is used to indicate a third resource pool, and the third resource pool is managed by the third communications apparatus and used by the third communications apparatus to communicate with another communications apparatus, where a frequency domain resource included in the third resource pool is different from a frequency domain resource included in the first resource pool, and/or a third time domain resource included in the third resource pool and the first time domain resource are located in different time units; or a frequency domain resource included in the third resource pool is different from a frequency domain resource included in the second resource pool, and/or a third time domain resource included in the third resource pool and the second time domain resource are located in different time units.

In an optional implementation, the transceiver module 1020 is further configured to send third configuration information to a fourth communications apparatus, where the third configuration information is used to indicate a fourth resource pool, and the fourth resource pool is managed by the fourth communications apparatus and used by the fourth communications apparatus to communicate with another communications apparatus, where a frequency domain resource included in the fourth resource pool is different from the frequency domain resource included in the third resource pool, and/or a fourth time domain resource included in the fourth resource pool and the third time domain resource are located in different time units.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In an Optional Implementation, the first time domain resource sequentially includes a first time domain sub-resource, the first GP, and a second time domain sub-resource in time domain, where the first time domain sub-resource is used to map a signal from the first communications apparatus 1000, and the second time domain sub-resource is used to map a signal sent to the first communications apparatus 1000, or the first time domain sub-resource is used to map a signal sent to the first communications apparatus 1000, and the second time domain sub-resource is used to map a signal from the first communications apparatus 1000; and/or the second time domain resource sequentially includes a third time domain sub-resource, the second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus.

In an optional implementation, transmission directions corresponding to the first time domain sub-resource and the third time domain sub-resource are the same, and/or transmission directions corresponding to the second time domain sub-resource and the fourth time domain sub-resource are the same.

In an optional implementation, the transceiver module 1020 is further configured to send first information, where the first information includes at least one of length information of the first time domain sub-resource, length information of the second time domain sub-resource, length information of the third time domain sub-resource, or length information of the fourth time domain sub-resource.

In an optional implementation, the first resource pool further includes a second time subunit, and the second time subunit sequentially includes a fifth time domain resource, a third GP, a sixth time domain resource, a fourth GP, and a seventh time domain resource in time domain.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

In an optional implementation, the second resource pool is a reserved resource pool.

In an optional implementation, the transceiver module 1020 is further configured to send second information, where the second information is used to indicate the first resource pool or used to indicate an available resource in the first resource pool.

Figure 11:
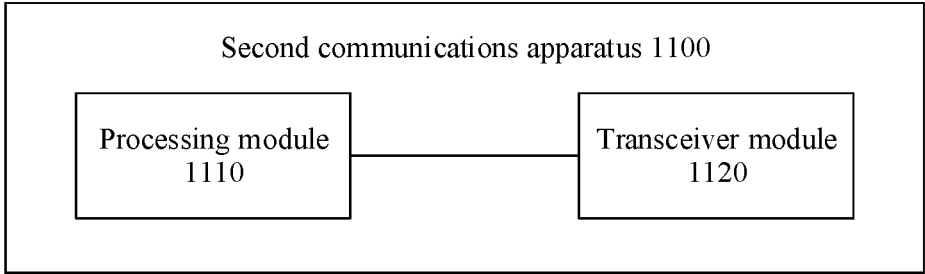
FIG. 11 is a schematic diagram of a structure of a second communications apparatus according to an embodiment of this application.

FIG. 11 is a possible schematic diagram of a structure of a second communications apparatus 1500 related to the foregoing embodiments of this application. The second communications apparatus 1500 may include a transceiver module 1120 and a processing module 1110. The processing module 1110 may be configured to perform all operations except the sending operation and the receiving operation that are performed by the second communications apparatus in the foregoing method embodiments, and/or is configured to support another process of the technology described in this specification. The transceiver module 1120 may be configured to perform all receiving operations and/or sending operations performed by the second communications apparatus in the foregoing method embodiments, and/or is configured to support another process of the technology described in this specification. The transceiver module may alternatively be replaced by a transmission module, or the transceiver module may include a sending module and a receiving module that are independent of each other, and may be configured to support another process of the technology described in this specification.

The transceiver module 1120 is configured to receive first configuration information from a first communications apparatus.

The processing module 1110 is configured to determine a second resource pool based on the first configuration information, where the second resource pool is managed by the second communications apparatus 1500 and used by the second communications apparatus 1500 to communicate with another communications apparatus, the second resource pool is different from a first resource pool, and the first resource pool is managed by the first communications apparatus and used by the first communications apparatus to communicate with another communications apparatus.

In an optional implementation, the first resource pool includes a first time-frequency resource, and the second resource pool includes a second time-frequency resource; the first time-frequency resource includes a first time domain resource in time domain, and the first time-frequency resource includes a first frequency domain resource in frequency domain; the second time-frequency resource includes a second time domain resource in time domain, and the second time-frequency resource includes the first frequency domain resource in frequency domain; and the first time domain resource and the second time domain resource are located in a first time subunit, and the first time domain resource and the second time domain resource are different.

In an optional implementation, the first time subunit sequentially includes the first time domain resource and the second time domain resource in time domain.

In an optional implementation, the second resource pool includes a first resource subpool and a second resource subpool.

The processing module 1110 is configured to determine the second resource pool based on the first configuration information in the following manner:

determining the first resource subpool and/or the second resource subpool based on the first configuration information, where the first resource subpool is used by the second communications apparatus 1500 to transmit data to another communications apparatus, and the second resource subpool is used by the second communications apparatus 1500 to transmit signaling or a signal to another communications apparatus.

In an Optional Implementation, the First Configuration Information Includes:

time domain information, frequency domain information, time domain information and frequency domain information, or time-frequency resource information of the first resource subpool in one time subunit, or time domain information, frequency domain information, time domain information and frequency domain information, or time-frequency resource information of the first resource subpool in one time subunit in one frequency domain unit; and/or time domain resource information of the second resource subpool, or time domain information of the second resource subpool in one time unit, or time domain information of the second resource subpool in one frequency domain unit, or time domain information of the second resource subpool in one frequency domain unit in one time unit.

In an optional implementation, the first time subunit includes a first GP and a second GP located after the first GP in time domain, the first GP belongs to the first time domain resource, the second GP belongs to the second time domain resource, and the first time subunit further includes at least one symbol after the second GP.

In an Optional Implementation, the first time domain resource sequentially includes a first time domain sub-resource, the first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, the second GP, and a fourth time domain sub-resource in time domain, where the third time domain sub-resource is used to map a signal from the second communications apparatus 1500, and the fourth time domain sub-resource is used to map a signal sent to the second communications apparatus 1500, or the third time domain sub-resource is used to map a signal sent to the second communications apparatus 1500, and the fourth time domain sub-resource is used to map a signal from the second communications apparatus 1500.

In an optional implementation, transmission directions corresponding to the first time domain sub-resource and the third time domain sub-resource are the same, and/or transmission directions corresponding to the second time domain sub-resource and the fourth time domain sub-resource are the same.

In an optional implementation, the transceiver module 1120 is further configured to send third information, where the third information includes at least one of length information of the first time domain sub-resource, length information of the second time domain sub-resource, length information of the third time domain sub-resource, or length information of the fourth time domain sub-resource.

In an optional implementation, the first resource pool further includes a second time subunit, and the second time subunit sequentially includes a fifth time domain resource, a third GP, a sixth time domain resource, a fourth GP, and a seventh time domain resource in a front-to-back order in time domain.

In an optional implementation, a transmission direction corresponding to the fifth time domain resource is the same as a transmission direction corresponding to the seventh time domain resource, and the transmission direction corresponding to the fifth time domain resource is opposite to a transmission direction corresponding to the sixth time domain resource.

In an optional implementation, the first time domain resource sequentially includes the first time domain sub-resource, the first GP, and the second time domain sub-resource in time domain, and the second time domain resource sequentially includes the third time domain sub-resource, the second GP, and the fourth time domain sub-resource in time domain.

A time domain resource included in the first time subunit and a time domain resource included in the second time subunit meet one or more of the following relationships:

a length of the fifth time domain resource is the same as a length of the first time domain sub-resource;

a sum of lengths of the second time domain sub-resource and the third time domain sub-resource is the same as a length of the sixth time domain resource; or a length of the fourth time domain sub-resource is the same as a length of the seventh time domain resource.

In an optional implementation, the second resource pool is a reserved resource pool.

In an optional implementation, the transceiver module 1120 is further configured to send fourth information, where the fourth information is used to indicate the second resource pool or used to indicate an available resource in the second resource pool.

Figure 12:
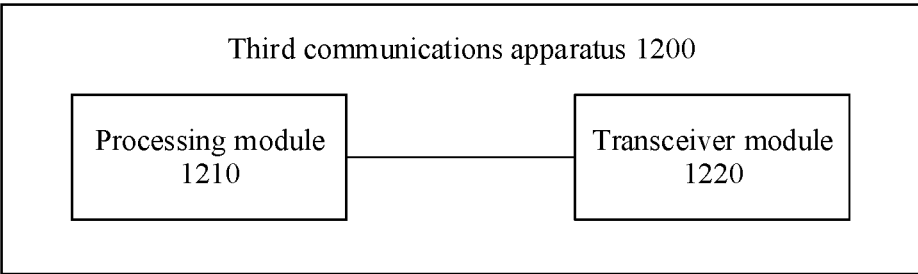
FIG. 12 is a schematic diagram of a structure of a third communications apparatus according to an embodiment of this application.

FIG. 12 is a possible schematic diagram of a structure of a third communications apparatus 1200 related to the foregoing embodiments of this application. The third communications apparatus 1200 may include a transceiver module 1220 and a processing module 1210. The processing module 1210 may be configured to perform all operations except the sending operation and the receiving operation that are performed by the third communications apparatus in the foregoing method embodiments, and/or is configured to support another process of the technology described in this specification. The transceiver module 1220 may be configured to perform all receiving operations and/or sending operations performed by the third communications apparatus in the foregoing method embodiments, and/or is configured to support another process of the technology described in this specification. The transceiver module may alternatively be replaced by a transmission module, or the transceiver module may include a sending module and a receiving module that are independent of each other, and may be configured to support another process of the technology described in this specification.

The transceiver module 1220 is configured to receive second configuration information from a first communications apparatus.

The processing module 1210 is configured to determine a third resource pool based on the second configuration information, where the third resource pool is managed by the third communications apparatus 1200 and used by the third communications apparatus 1200 to communicate with another communications apparatus.

In an Optional Implementation, a frequency domain resource included in the third resource pool is different from a frequency domain resource included in a first resource pool, and/or a third time domain resource included in the third resource pool and a first time domain resource are located in different time units; or a frequency domain resource included in the third resource pool is different from a frequency domain resource included in a second resource pool, and/or a third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation, the first time domain resource sequentially includes a first time domain sub-resource, a first GP, and a second time domain sub-resource in time domain, where the first time domain sub-resource is used to map a signal from the first communications apparatus, and the second time domain sub-resource is used to map a signal sent to the first communications apparatus, or the first time domain sub-resource is used to map a signal sent to the first communications apparatus, and the second time domain sub-resource is used to map a signal from the first communications apparatus; and/or the second time domain resource sequentially includes a third time domain sub-resource, a second GP, and a fourth time domain sub-resource in time domain, where the third time domain sub-resource is used to map a signal from the second communications apparatus, and the fourth time domain sub-resource is used to map a signal sent to the second communications apparatus, or the third time domain sub-resource is used to map a signal sent to the second communications apparatus, and the fourth time domain sub-resource is used to map a signal from the second communications apparatus; and/or the third time domain resource sequentially includes a fifth time domain sub-resource, a fifth GP, and a sixth time domain sub-resource in time domain, where the fifth time domain sub-resource is used to map a signal from the third communications apparatus 1200, and the sixth time domain sub-resource is used to map a signal sent to the third communications apparatus 1200, or the fifth time domain sub-resource is used to map a signal sent to the third communications apparatus 1200, and the sixth time domain sub-resource is used to map a signal from the third communications apparatus 1200.

In an optional implementation, the transceiver module 1220 is further configured to send fifth information, where the fifth information includes at least one of length information of the first time domain sub-resource, length information of the second time domain sub-resource, length information of the fifth time domain sub-resource, or length information of the sixth time domain sub-resource, or the fifth information includes at least one of length information of the third time domain sub-resource, length information of the fourth time domain sub-resource, length information of the fifth time domain sub-resource, or length information of the sixth time domain sub-resource.

In an optional implementation, the transceiver module 1220 is further configured to send sixth information, where the sixth information is used to indicate the third resource pool or used to indicate an available resource in the third resource pool.

Figure 13:
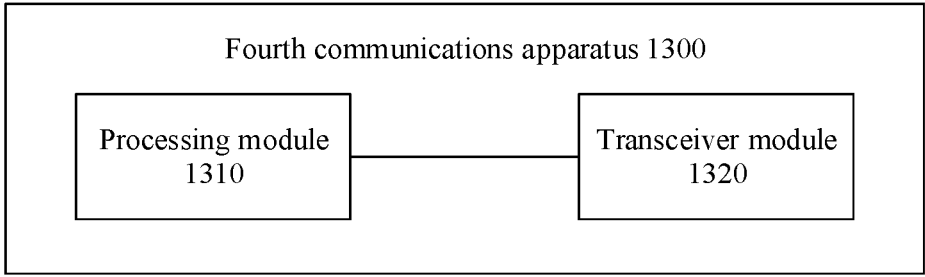
FIG. 13 is a schematic diagram of a structure of a fourth communications apparatus according to an embodiment of this application.

FIG. 13 is a possible schematic diagram of a structure of a fourth communications apparatus 1300 related to the foregoing embodiments of this application. The fourth communications apparatus 1300 may include a transceiver module 1320 and a processing module 1310. The processing module 1310 may be configured to perform all operations except the sending operation and the receiving operation that are performed by the fourth communications apparatus in the foregoing method embodiments, and/or is configured to support another process of the technology described in this specification. The transceiver module 1320 may be configured to perform all receiving operations and/or sending operations performed by the fourth communications apparatus in the foregoing method embodiments, and/or is configured to support another process of the technology described in this specification. The transceiver module may alternatively be replaced by a transmission module, or the transceiver module may include a sending module and a receiving module that are independent of each other, and may be configured to support another process of the technology described in this specification.

The transceiver module 1320 is configured to receive third configuration information from a first communications apparatus.

The processing module 1310 is configured to determine a fourth resource pool based on the third configuration information, where the fourth resource pool is managed by the fourth communications apparatus 1300 and used by the fourth communications apparatus 1300 to communicate with another communications apparatus.

In an Optional Implementation,
  a frequency domain resource included in the fourth resource pool is different from a frequency domain resource included in a third resource pool, and/or a fourth time domain resource included in the fourth resource pool and a third time domain resource are located in different time units.

The third resource pool is managed by a third communications apparatus and used by the third communications apparatus to communicate with another communications apparatus, and the third time domain resource belongs to the third resource pool.

In an Optional Implementation,
  the frequency domain resource included in the third resource pool is different from a frequency domain resource included in a first resource pool, and/or the third time domain resource included in the third resource pool and a first time domain resource are located in different time units; or
  the frequency domain resource included in the third resource pool is different from a frequency domain resource included in a second resource pool, and/or the third time domain resource included in the third resource pool and a second time domain resource are located in different time units.

The first resource pool is managed by the first communications apparatus and used by the first communications apparatus to communicate with another communications apparatus, and the first time domain resource belongs to a first time-frequency resource included in the first resource pool; the second resource pool is managed by a second communications apparatus and used by the second communications apparatus to communicate with another communications apparatus, and the second time domain resource belongs to a second time-frequency resource included in the second resource pool; the first time-frequency resource includes a first frequency domain resource in frequency domain, and the second time-frequency resource includes the first frequency domain resource in frequency domain; and the first time domain resource and the second time domain resource are located in a first time subunit, and the first time domain resource and the second time domain resource are different.

In an Optional Implementation,
  the third time domain resource sequentially includes a fifth time domain sub-resource, a fifth GP, and a sixth time domain sub-resource in time domain, where the fifth time domain sub-resource is used to map a signal from the third communications apparatus, and the sixth time domain sub-resource is used to map a signal sent to the third communications apparatus, or the fifth time domain sub-resource is used to map a signal sent to the third communications apparatus, and the sixth time domain sub-resource is used to map a signal from the third communications apparatus; and/or
  the fourth time domain resource sequentially includes a seventh time domain sub-resource, a sixth GP, and an eighth time domain sub-resource in time domain, where the seventh time domain sub-resource is used to map a signal from the fourth communications apparatus 1300, and the eighth time domain sub-resource is used to map a signal sent to the fourth communications apparatus 1300, or the seventh time domain sub-resource is used to map a signal sent to the fourth communications apparatus 1300, and the eighth time domain sub-resource is used to map a signal from the fourth communications apparatus 1300.

In an optional implementation, the transceiver module 1320 is further configured to send seventh information, where
  the seventh information includes at least one of length information of the fifth time domain sub-resource, length information of the sixth time domain sub-resource, length information of the seventh time domain sub-resource, or length information of the eighth time domain sub-resource.

In an optional implementation, the transceiver module 1320 is configured to send eighth information, where the eighth information is used to indicate the fourth resource pool or used to indicate an available resource in the fourth resource pool.

Figure 14:
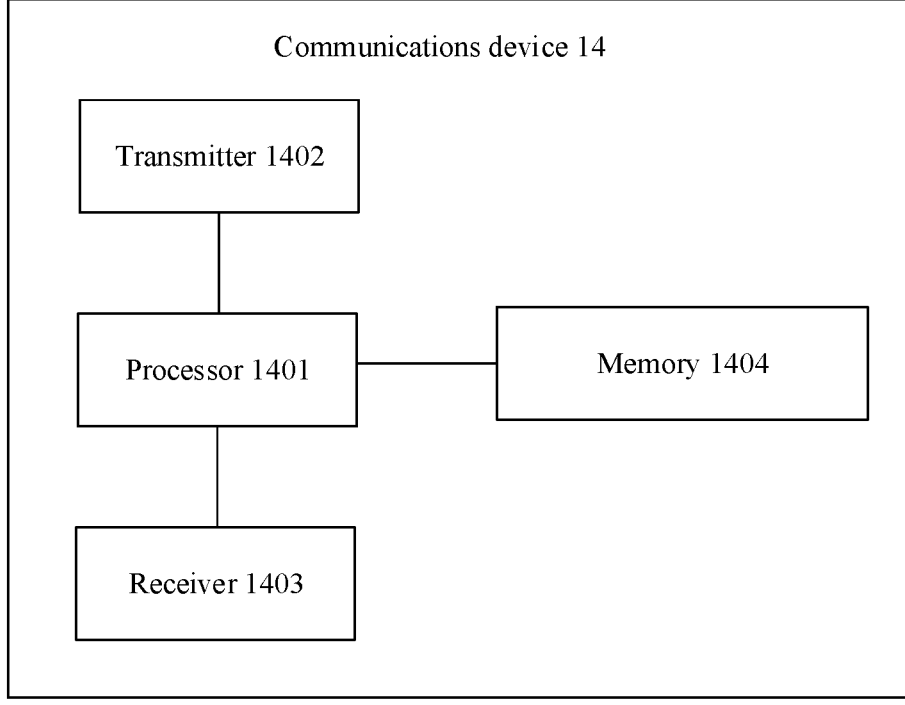
FIG. 14 is a schematic diagram of a structure of a communications device according to an embodiment of this application.

FIG. 14 is another possible schematic diagram of a structure of a first communications apparatus, a second communications apparatus, a third communications apparatus, or a fourth communications apparatus according to an embodiment of this application. The communications device 14 may include at least one processor 1401 and a transceiver. A function of the processor 1401 may correspond to the processing module 1010, the processing module 1110, the processing module 1210, or the processing module 1310, and a function of the transceiver may correspond to the transceiver module 1020, the transceiver module 1120, the transceiver module 1220, or the transceiver module 1320. Details are not described herein again. For example, the transceiver may include a transmitter 1402 and a receiver 1403. The transmitter 1402 and the receiver 1403 may be a same functional component (the functional component may also be referred to as a transceiver), and the functional component can implement both a sending function and a receiving function. Alternatively, the transmitter 1402 and the receiver 1403 may be different functional components, and the two functional components respectively implement a sending function and a receiving function. Optionally, the communications device 14 may further include a memory 1404, configured to store program instructions and/or data, to be read by the at least one processor 1401.

Figure 15:
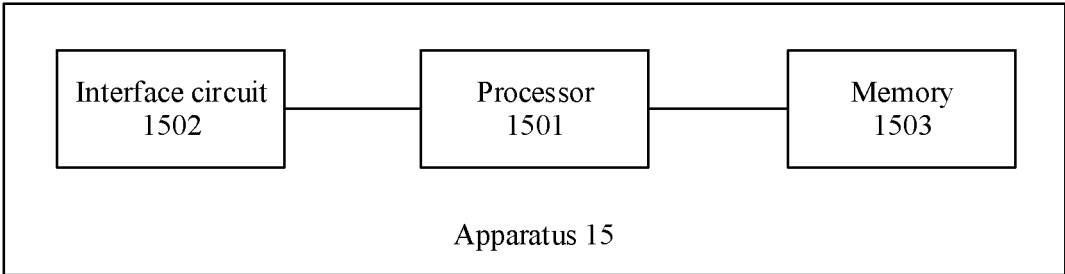
FIG. 15 is a schematic diagram of a structure of an apparatus according to an embodiment of this application.

FIG. 15 is a schematic diagram of a structure of an apparatus 15 according to an embodiment of this application. The apparatus 15 shown in FIG. 15 may be a first communications apparatus, a second communications apparatus, a third communications apparatus, or a fourth communications apparatus, or may be a chip or a circuit that can complete a function of the first communications apparatus, the second communications apparatus, the third communications apparatus, or the fourth communications apparatus. For example, the chip or the circuit may be disposed in the first communications apparatus, the second communications apparatus, the third communications apparatus, or the fourth communications apparatus. The apparatus 15 shown in FIG. 15 may include at least one processor 1501 and an interface circuit 1502. The processor 1501 implements the steps in the method provided in the foregoing embodiments. Optionally, the apparatus 15 may further include a memory 1503, and the memory 1503 may be configured to store instructions. The processor 1501 executes the instructions stored in the memory 1503, so that the apparatus 15 implements the steps in the method provided in the foregoing method embodiments.

Further, the processor 1501, the interface circuit 1502, and the memory 1503 may communicate with each other through an internal connection channel, to transfer control signals and/or data signals. The memory 1503 is configured to store a computer program. The processor 1501 may invoke the computer program from the memory 1503 and run the computer program, to control the interface circuit 1502 to receive a signal or send a signal, or the processor 1501 invokes the computer program from the memory 1503 and runs the computer program through the interface circuit 1502, to complete the steps performed by the first communications apparatus, the second communications apparatus, the third communications apparatus, or the fourth communications apparatus in the method provided in the foregoing embodiments. The memory 1503 may be integrated into the processor 1501, or may be separated from the processor 1501.

Optionally, if the apparatus 15 is a device, the interface circuit 1502 may include a receiver and a transmitter. The receiver and the transmitter may be a same component or different components. When the receiver and the transmitter are the same component, the component may be referred to as a transceiver.

Optionally, if the apparatus 15 is a chip or a circuit, the interface circuit 1502 may include an input interface and an output interface. The input interface and the output interface may be a same interface or different interfaces.

Optionally, if the apparatus 15 is the chip or the circuit, the apparatus 15 may not include the memory 1503. The processor 1501 may read instructions (a program or code) in a memory outside the chip or the circuit, to implement the steps performed by the first communications apparatus, the second communications apparatus, the third communications apparatus, or the fourth communications apparatus in the method provided in the foregoing embodiments.

Optionally, if the apparatus 15 is the chip or the circuit, the apparatus 15 may include a resistor, a capacitor, or another corresponding functional component, and the processor 1501 or the interface circuit 1502 may be implemented by using a corresponding functional component.

In an implementation, a function of the interface circuit 1502 may be considered to be implemented by using a transceiver circuit or a transceiver-dedicated chip. It may be considered that the processor 1501 is implemented by using a dedicated processing chip, a processing circuit, a processor, or a general-purpose chip.

In another implementation, it may be considered that a general-purpose computer is used to implement the first communications apparatus, the second communications apparatus, the third communications apparatus, or the fourth communications apparatus provided in embodiments of this application. To be specific, program code for implementing functions of the processor 1501 and the interface circuit 1502 is stored in the memory 1503, and the processor 1501 implements the functions of the processor 1501 and the interface circuit 1502 by executing the program code stored in the memory 1503.

Functions and actions of the modules or the units in the apparatus 15 listed above are merely examples for description, and the functional units in the apparatus 15 may be configured to perform actions or processing processes performed by the first communications apparatus, the second communications apparatus, the third communications apparatus, or the fourth communications apparatus in the foregoing method embodiments. To avoid repetition, detailed descriptions are omitted herein.

An embodiment of this application further provides a communications system, applied to unmanned driving or intelligent driving. The communications system includes at least one first communications apparatus, at least one second communications apparatus, at least one third communications apparatus, or at least one fourth communications apparatus mentioned in the foregoing embodiments of this application. The at least one communications apparatus in the communications system may be integrated into an entire system or a device, or the at least one communications apparatus in the communications system may be independently disposed as an element or an apparatus.

In still another optional manner, when software is used to implement the first communications apparatus, the second communications apparatus, the third communications apparatus, or the fourth communications apparatus, all or some of the communications apparatuses may be implemented in a form of a computer program product. The computer program product includes one or more computer instructions. When the computer program instructions are loaded and executed on a computer, the procedures or functions according to embodiments of this application are completely or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It should be noted that the first communications apparatus, the second communications apparatus, the third communications apparatus, or the fourth communications apparatus configured to perform the communications method provided in embodiments of this application may include one or more processors. The one or more processors may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor. Alternatively, if the first communications apparatus, the second communications apparatus, the third communications apparatus, or the fourth communications apparatus is a processing apparatus, the processing apparatus may be a CPU, a general-purpose processor, a DSP, an ASIC, an FPGA, another programmable logic device, a transistor logic device, a hardware component, or any combination thereof. The processor may implement or execute various example logical blocks, modules, and circuits described with reference to content disclosed in this application. The processing apparatus may be a combination of processors implementing a computing function, for example, a combination of one or more microprocessors, or a combination of a DSP and a microprocessor.

Method or algorithm steps described with reference to embodiments of this application may be implemented by hardware, or may be implemented by a processor executing software instructions. The software instructions may include a corresponding software module, and the software module may be stored in a random access memory (random access memory, RAM), a flash memory, a read-only memory (read-only memory, ROM), an erasable programmable read-only memory (erasable programmable read-only memory, EPROM), an electrically erasable programmable read-only memory (electrically erasable programmable read-only memory, EEPROM), a register, a hard disk, a removable hard disk, a compact disc read-only memory (compact disc read-only memory, CD-ROM), or any other form of storage medium well known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in the first apparatus. Certainly, the processor and the storage medium may alternatively exist in the first communications apparatus, the second communications apparatus, the third communications apparatus, or the fourth communications apparatus as discrete components.

It may be understood that FIG. 10 to FIG. 15 show only simplified designs of the first communications apparatus, the second communications apparatus, the third communications apparatus, or the fourth communications apparatus. In actual application, the first communications apparatus, the second communications apparatus, the third communications apparatus, or the fourth communications apparatus may include any quantity of transmitters, receivers, processors, controllers, memories, or other elements that may exist.

Based on the foregoing descriptions of the implementations, a person skilled in the art may clearly understand that, for the purpose of convenient and brief description, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual coupling or direct coupling or communication connection may be implemented through some interfaces. The indirect coupling or communication connection between the apparatuses or units may be implemented in electrical, mechanical, or another form.

The units described as separate parts may or may not be physically separate, and parts displayed as units may be one or more physical units, and may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of embodiments of this application, but are not intended to limit the protection scope of embodiments of this application. Any variation or replacement within the technical scope disclosed in this application shall fall within the protection scope of embodiments of this application. Therefore, the protection scope of embodiments of this application shall be subject to the protection scope of the claims.

What is claimed is:

1. A communications method, comprising:

determining, by a first communications apparatus for scheduling resource in a first resource pool of a first communications domain, a second resource pool, wherein the first communications apparatus is a master node of the first communications domain; and sending, by the first communications apparatus, first configuration information for indicating the second resource pool, wherein the second resource pool comprises a first resource subpool and a second resource subpool, wherein the first configuration information indicates the first resource subpool or the second resource subpool, the first resource subpool is used by a second communications apparatus to transmit data to another communications apparatus, and the second resource subpool is used by the second communications apparatus to transmit signaling or a signal to another communications apparatus, wherein the second communications apparatus is a master node of a second communications domain for scheduling resource in the second resource pool of the second communications domain, and wherein a priority of the first communication domain is higher than a priority of the second communication domain.

2. The method according to claim 1, wherein the first configuration information comprises one or more of:

(1) at least one of time domain information, frequency domain information or time-frequency resource information of the first resource subpool in one time subunit;

(2) at least one of time domain information, frequency domain information, or time-frequency resource information of the first resource subpool in one time subunit in one frequency domain unit;

(3) time domain information of the second resource subpool;

(4) time domain information of the second resource subpool in one time unit;

(5) time domain information of the second resource subpool in one frequency domain unit; or (6) time domain information of the second resource subpool in one frequency domain unit in one time unit.

3. A communications method, comprising:

receiving, by a second communications apparatus for scheduling resource in a second resource pool of a second communications domain, first configuration information from a first communications apparatus for scheduling resource in a first resource pool of a first communications domain; and determining, by the second communications apparatus, the second resource pool based on the first configuration information, wherein the second communications apparatus is a master node of the second communications domain, wherein a priority of the first communication domain is higher than a priority of the second communication domain, and wherein the second resource pool comprises a first resource subpool for the second communications apparatus to transmit data to another communications apparatus and a second resource subpool for the second communications apparatus to transmit signaling or a signal to another communications apparatus, and wherein determining the second resource pool comprises determining the first resource subpool or the second resource subpool.

4. The method according to claim 3, wherein the first configuration information comprises one or more of:

(1) at least one of time domain information, frequency domain information or time-frequency resource information of the first resource subpool in one time subunit;

(2) at least one of time domain information, frequency domain information, or time-frequency resource information of the first resource subpool in one time subunit in one frequency domain unit;

(3) time domain information of the second resource subpool;

(4) time domain information of the second resource subpool in one time unit;

(5) time domain information of the second resource subpool in one frequency domain unit; or (6) time domain information of the second resource subpool in one frequency domain unit in one time unit.

5. An apparatus, comprising:

at least one processor;

one or more memories coupled to the at least one processor and storing instructions for execution by the at least one processor to cause the apparatus to:

determine a second resource pool, wherein the apparatus is a master node of a first communications domain for scheduling resource in a first resource pool of the first communications domain; and send first configuration information for indicating the second resource pool, wherein the second resource pool comprises a first resource subpool and a second resource subpool, wherein the first configuration information indicates the first resource subpool or the second resource subpool, the first resource subpool is used by a second communications apparatus to transmit data to another communications apparatus, and the second resource subpool is used by the second communications apparatus to transmit signaling or a signal to another communications apparatus, wherein the second communications apparatus is a master node of a second communications domain for scheduling resource in the second resource pool of the second communications domain, and wherein a priority of the first communication domain is higher than a priority of the second communication domain.

6. The apparatus according to claim 5, wherein the first configuration information comprises one or more of:

(1) at least one of time domain information, frequency domain information or time-frequency resource information of the first resource subpool in one time subunit;

(2) at least one of time domain information, frequency domain information, or time-frequency resource information of the first resource subpool in one time subunit in one frequency domain unit;

(3) time domain information of the second resource subpool;

(4) time domain information of the second resource subpool in one time unit;

(5) time domain information of the second resource subpool in one frequency domain unit; or (6) time domain information of the second resource subpool in one frequency domain unit in one time unit.

7. An apparatus, comprising:

at least one processor;

one or more memories coupled to the at least one processor and storing instructions for execution by the at least one processor to cause the apparatus to:

receive first configuration information from a first communications apparatus for scheduling resource in a first resource pool of a first communications domain; and determine a second resource pool based on the first configuration information, wherein the apparatus is a master node of a second communications domain for scheduling resource in a second resource pool of a second communications domain, wherein a priority of the first communication domain is higher than a priority of the second communication domain, and wherein the second resource pool comprises a first resource subpool for the communications apparatus to transmit data to another communications apparatus and a second resource subpool for the communications apparatus to transmit signaling or a signal to another communications apparatus, and wherein determining the second resource pool comprises determining the first resource subpool or the second resource subpool.

8. The apparatus according to claim 7, wherein the first configuration information comprises one or more of:

(1) at least one of time domain information, frequency domain information or time-frequency resource information of the first resource subpool in one time subunit;

(2) at least one of time domain information, frequency domain information, or time-frequency resource information of the first resource subpool in one time subunit in one frequency domain unit;

(3) time domain information of the second resource subpool;

(4) time domain information of the second resource subpool in one time unit;

(5) time domain information of the second resource subpool in one frequency domain unit; or (6) time domain information of the second resource subpool in one frequency domain unit in one time unit.

* * * * *